(12) United States Patent
Okuyama et al.

(10) Patent No.: US 6,942,345 B2
(45) Date of Patent: Sep. 13, 2005

(54) PROJECTION TYPE IMAGE DISPLAY APPARATUS AND IMAGE DISPLAY SYSTEM

(75) Inventors: Atsushi Okuyama, Saitama (JP); Keiji Otaka, Kanagawa (JP); Hiroyuki Kodama, Tochigi (JP); Masayuki Abe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 10/305,502

(22) Filed: Nov. 27, 2002

(65) Prior Publication Data

US 2003/0098955 A1 May 29, 2003

(30) Foreign Application Priority Data

Nov. 27, 2001 (JP) ........................................ 2001-361587
Nov. 27, 2001 (JP) ........................................ 2001-361588
Nov. 27, 2001 (JP) ........................................ 2001-361590

(51) Int. Cl.$^7$ ........................... G03B 21/00; G03B 21/14
(52) U.S. Cl. ........................................... 353/20; 353/33
(58) Field of Search .............................. 353/20, 31, 33, 353/34, 37, 81

(56) References Cited

U.S. PATENT DOCUMENTS 6,262,851 B1 * 7/2001 Marshall ...................... 353/33
6,331,060 B1 * 12/2001 Yamamoto et al. ........... 353/31
6,478,429 B1 * 11/2002 Aritake et al. ................ 353/31
6,540,359 B1 * 4/2003 Cornelissen et al. .......... 353/20
6,561,652 B1 * 5/2003 Kwok et al. .................. 353/31
6,612,702 B1 * 9/2003 Ushiyama et al. ............ 353/31
6,623,121 B2 * 9/2003 Sato ............................. 353/20
6,644,813 B1 * 11/2003 Bowron ....................... 353/31
6,715,882 B2 * 4/2004 Ishii ............................. 353/31
6,783,241 B2 * 8/2004 Miyawaki et al. ............ 353/20
6,786,604 B2 * 9/2004 Aastuen et al. ............... 353/20

FOREIGN PATENT DOCUMENTS

EP     1 008 895 A1     6/2000
JP     2000-199883      7/2000

* cited by examiner

Primary Examiner—Christopher Mahoney
(74) Attorney, Agent, or Firm—Morgan & Finnegan, LLP

(57) ABSTRACT

In a projection type image display apparatus, when the angle of light incident on the multi-layer film of a polarizing beam splitter for synthesizing an optical path becomes uneven, the loss of the light occurs. So, the projection type image display apparatus of the present invention is provided with an illuminating optical system 1–5b, a color separating and synthesizing optical system 7 for separating illuminating light from the illuminating optical system into a plurality of color lights and making the respective color lights enter image display elements 8r–8b provided for the respective color lights, and synthesizing a plurality of image lights emerging from these image display elements, a projection optical system 10 for projecting and displaying the image lights synthesized by the color separating and synthesizing optical system, and polarizing elements Pr, Pg, Pb for transmitting only a particular polarized component light therethrough disposed between the color separating and synthesizing optical system and the image display elements.

21 Claims, 31 Drawing Sheets

PROJECTION TYPE IMAGE DISPLAY APPARATUS AND IMAGE DISPLAY SYSTEM

BACKGROUND OF THE INVENTION

1. Field of the Invention

This invention relates to a projection type image display apparatus for resolving illuminating light from an illuminating optical system into a plurality of color lights, combining the color lights modulated by an image display element and projecting and displaying an image.

2. Description of Related Art

There has heretofore been used a projection type image display apparatus for enlarging and projecting image light from an image display element by the use of an illuminating optical system for illuminating the image display element, and an image display element such as a liquid crystal display for modulating the polarized state of illuminating light and producing image light.

Image display apparatuses using a so-called reflection type image display element in which a side on which illuminating light from an illuminating optical system enters the image display element and a side on which image light modulated by the image display element emerges from the image display element are the same are proposed in Japanese Patent Application Laid-Open No. 10-274810, Japanese Patent Application Laid-Open No. 10-319344, etc.

The construction of the projection type image display apparatus of Japanese Patent Application Laid-Open No. 10-319344 is shown in FIG. 10 of the accompanying drawings. In this figure, the reference numeral 101 designates a light source, the reference numeral 102 denotes a reflector, the reference numeral 103 designates a filter, and the reference numerals 104 and 106 denote fly-eye lenses. Also, the reference numeral 105 designates a mirror, the reference numeral 107 denotes a polarizing beam splitter, the reference numeral 108 designates a color separating and synthesizing prism, the reference characters 109r, 109g and 109b denote image display elements, and the reference numeral 110 designates a projection lens.

The optical path IL of an illuminating optical system and the optical path PL of a projection optical system are combined together by the polarizing beam splitter 107 so as to pass through the single color separating and synthesizing prism 108.

However, the polarizing beam splitter for combining the optical paths together is comprised of multi-layer film and therefore, if the angle of light incident on the multi-layer film becomes irregular and departs from a design angle (e.g. 45°), there will arise the problem that the efficiency of separating the light into a P-polarized component and an S-polarized component is fluctuated and the loss of light occurs so that the image display apparatus becomes capable of projecting only a dark image.

Also, dichroic film in the color separating and synthesizing prism has its characteristic fluctuated by the angle of incidence. When light (illuminating light) entering the image display element enters as a beam having a predetermined expanse, there arises the problem that the unevenness of the incident angle conforming to the angle of expanse of the beam occurs in the dichroic film, whereby other color component than a predetermined color component mixes with the illuminating light to thereby reduce the color purity of the illuminating light.

SUMMARY OF THE INVENTION

In order to solve the above-noted problems, according to a first aspect of the application, in a projection type image display apparatus having an illuminating optical system, a color separating and synthesizing optical system for resolving illuminating light from the illuminating optical system into a plurality of color lights and making the respective color lights enter image display elements provided for the respective color lights, and combining image lights of a plurality of colors emerging from these image display elements, and a projection optical system for projecting and displaying the image lights combined by the color separating and synthesizing optical system, a polarizing element for transmitting only a particular polarized component light therethrough (that is, cutting other polarized component lights than the particular polarized component light) is provided between the color separating and synthesizing optical system and the image display elements.

Also, according to a second aspect of the application, in a projection type image display apparatus having an illuminating optical system, a color separating and synthesizing optical system for separating illuminating light from the illuminating optical system into a plurality of color lights and making the respective color lights enter image display element provided for the respective color lights, and synthesizing image lights of a plurality of colors emerging from these image display elements, and a projection optical system for projecting and displaying the image lights combined by the color separating and combining optical system, a light directing element for reflecting the illuminating light from the illuminating optical system at a reflectance approximate to about 100%, directing it to the color separating and combining optical system and transmitting therethrough the image lights from the color separating and combining optical system to the projection optical system is provided between the illuminating optical system and the color separating and synthesizing optical system so that the optical paths of the illuminating light and the optical paths of the image lights in the light directing element and the color separating and synthesizing optical system may differ from one another, and a polarizing element for transmitting only a particular polarized component light therethrough is provided between the color separating and synthesizing optical system and the image display elements.

Further, according to a third aspect of the application, in a projection type image display apparatus having an illuminating optical system, a color separating and synthesizing optical system for separating illuminating light from the illuminating optical system into a plurality of color lights and making the respective color lights enter image display elements provided for the respective color lights, and combining image lights of a plurality of colors emerging from these image display elements, and a projection optical system for projecting and displaying the image lights synthesized by the color separating and synthesizing optical system, a light directing element for reflecting the illuminating light from the illuminating optical system at a reflectance approximate to about 100% and directing it to the color resolving and combining optical system, and transmitting therethrough the image lights from the color separating and synthesizing optical system to the projection optical system is provided between the illuminating optical system and the color separating and synthesizing optical system so that when the trace line, in the light directing element, the color separating and synthesizing optical system and the projection optical system, of a ray of light along the center line of the illuminating beam in the illuminating optical system is defined as the reference axis of the entire system, a reference axis in the color separating and synthesizing optical system (or the illuminating optical system) and a reference axis in the projection optical system may be inclined with respect to normals to the display surfaces of the respective image display elements, and a polarizing element for transmitting only a particular polarized component light therethrough is provided between the color separating and synthesizing optical system and the image display elements.

In these second and third aspects, the light directing element can be constituted, for example, by a prism type optical element having a first surface on which the illuminating light is made to be incident, a second surface which makes the illuminating light emerge therefrom toward the color separating and synthesizing optical system and on which the image lights from the color separating and synthesizing optical system are made to be incident, and a third surface which reflects the illuminating light incident from the first surface toward the second surface at a reflectance approximate to about 100% and reflects the image lights incident from the second surface toward the projection optical system.

Also, according to a fourth aspect of the application, in a projection type image display apparatus having an illuminating optical system, a color separating and synthesizing optical system for separating illuminating light from the illuminating optical system into a plurality of color lights and making the respective color lights enter image display elements provided for the respective color lights, and synthesizing image lights of a plurality of colors emerging from these image display elements, and a projection optical system for projecting and displaying the image lights synthesized by the color separating and synthesizing optical system, a light directing element for transmitting therethrough the illuminating light from the illuminating optical system to the color separating and synthesizing optical system, reflecting the image lights from the color separating and synthesizing optical system at a reflectance approximate to about 100% and directing them to the projection optical system is provided between the illuminating optical system and the color separating and synthesizing optical system so that the optical path of the illuminating light and the optical path of the image light in the light directing element and the color separating and synthesizing optical system may differ from each other, and a polarizing element for transmitting only a particular polarized component light therethrough is provided between the color separating and synthesizing optical system and the image display elements.

Further, according to a fifth aspect of the application, in a projection type image display apparatus having an illuminating optical system, a color separating and synthesizing optical system for separating illuminating light from the illuminating optical system into a plurality of color lights and making the respective color lights enter image display elements provided for the respective color lights, and synthesizing image lights of a plurality of colors emerging from these image display elements, and a projection optical system for projecting and displaying the image lights combined by the color separating and synthesizing optical system, a light directing element for transmitting therethrough the illuminating light from the illuminating optical system to the color resolving and combining optical system, reflecting the image lights from the color separating and synthesizing optical system at a reflectance approximate to about 100% and directing them to the projection optical system is provided between the illuminating optical system and the color separating and synthesizing optical system so that when the trace line, in the light directing element, the color separating and synthesizing optical system and the projection optical system, of a ray of light along the center line of the illuminating beam in the illuminating optical system is defined as the reference axis of the entire system, a reference axis in the color resolving and combining optical system (or the illuminating optical system) and a reference axis in the projection optical system may be inclined with respect to normals to the display surfaces of the image display elements, and a polarizing element for transmitting only a particular polarized component light therethrough is provided between the color resolving and combining optical system and at least one of the image display elements.

In these fourth and fifth aspects, the light directing element can be constituted, for example, by a prism type optical element having a first surface on which the illuminating light is made to be incident and which reflects the image lights at a reflectance approximate to about 100%, a second surface which makes the illuminating light incident from the first surface emerge therefrom toward the color separating and synthesizing optical system and on which the image lights from the color separating and synthesizing optical system are made to be incident, and a third surface which makes the image lights incident from the second surface and reflected by the first surface emerge therefrom toward the projection optical system.

The image display elements modulate the polarized state of light and therefore, a polarizing element for displaying an image becomes necessary between the illuminating optical system and the projection optical system, but this polarizing element is provided between the color separating and synthesizing optical system and the image display elements, whereby an illuminating optical path and a projection optical path can be prevented from being affected by internal distortion in overlapping optical elements such as an element constituting the color separating and synthesizing optical system and the light directing element) and the disturbance of the polarized state in optical multi-layer film, and it becomes possible to improve the contrast of the image.

According to the second to fifth aspects of the application, it becomes possible to separate the optical path of the illuminating light and the optical paths of the image lights from each other without providing a polarizing beam splitter as in the prior art. Moreover, the illuminating light from the illuminating optical system or the image lights from the color separating and synthesizing optical system are reflected at a reflectance approximate to about 100% and directed to the color separating and synthesizing optical system or the projection optical system by the light directing element and therefore, as compared with the conventional projection type image display apparatus, the utilization efficiency of light can be enhanced, and it becomes possible to obtain a bright and highly definite display image.

Also, if as in the third and fifth aspects, the reference axis in the color separating and synthesizing optical system (or the illuminating optical system) and the reference axis in the projection optical system are set so as to be inclined with respect to the normals to the display surfaces of the image display elements, it will become possible to downsize the projection optical system.

If here, the reference axis in the illuminating optical system is disposed while being inclined by an inclination angle θ with respect to the normals to the image display elements, the reference axis in the projection optical system will also be disposed while being inclined by the inclination angle θ toward the opposite side to the normals to the image display elements. If at this time, the inclination angle θ is made great, the angle 2θ formed between the reference axis of the illuminating optical path and the reference axis of the projection optical path will become great and the angle ω at which the projection optical path (or the illuminating optical path) is incident on the light directing element will become small, and it will be possible to make the transmittances of all rays transmitted through the light directing element by the angle of incidence more uniform. Also, in the illuminating optical system, the smaller in the F number of the illuminating optical system, the better becomes efficiency.

On the other hand, in an eccentric optical system, the smaller is the inclination angle θ of the object surface (the image display element), the smaller is the amount of eccentric aberration, and the greater is the F number of the projection optical system, the easier becomes the correction of aberration, and this is desirable.

By making the projection optical system into an eccentric optical system having at least one rotation-asymmetrical surface or a plurality of optical elements differing in rotation symmetry axis from one another, it becomes possible to correct an eccentric aberration such as Keystone distortion caused by the projection optical system being inclined.

Also, when the light directing element is formed into a wedge shape, an auxiliary optical element for refracting and transmitting therethrough the image lights emerging from the light directing element is disposed between the light directing element and the projection optical system with an air space provided relative to the light directing element, or an auxiliary optical element for refracting and transmitting therethrough the illuminating light from the illuminating optical system is disposed between the light directing element and the illuminating optical system with an air space provided relative to the light directing element, whereby it becomes possible to alleviate any aberration caused by the wedge shape.

Also, according to a sixth aspect of the application, in a projection type image display apparatus having an illuminating optical system, a color separating and synthesizing optical system for separating illuminating light from the illuminating optical system into a plurality of color lights, making the respective color lights enter image display elements provided for respective ones of the color lights, and synthesizing image lights of a plurality of colors emerging from these image display elements, and a projection optical system for projecting and displaying the image lights synthesized by the color separating and synthesizing optical system, there is provided between the color separating and synthesizing optical system and at least one of the image display elements color adjusting means for narrowing the wavelength band of the color light entering this image display element.

Also, according to a seventh aspect of the application, in a projection type image display apparatus having an illuminating optical system, a color separating and synthesizing optical system for resolving illuminating light from the illuminating optical system into a plurality of color lights, making the respective color lights enter image display elements provided for the respective ones of the color lights, and synthesizing image lights of a plurality of colors emerging from these image display elements, and a projection optical system for projecting and displaying the image lights synthesized by the color separating and synthesizing optical system, a light directing element for reflecting the illuminating light from the illuminating optical system at a reflectance approximate to about 100%, directing it to the color separating and synthesizing optical system and transmitting therethrough the image lights from the color separating and synthesizing optical system to the projection optical system is provided between the illuminating optical system and the color separating and synthesizing optical system so that the optical path of the illuminating light and the optical path of the image light in the light directing element and the color separating and synthesizing optical system may differ from each other, and between the color separating and synthesizing optical system and at least one of the image display elements, there is provided color adjusting means for narrowing the wavelength band of the color light entering this image display element.

Further, according to an eighth aspect of the application, in a projection type image display apparatus having an illuminating optical system, a color separating and synthesizing optical system for separating illuminating light from the illuminating optical system into a plurality of color lights, making the respective color lights enter image display elements provided for the respective ones of the color lights, and combining image lights of a plurality of colors emerging from these image display elements, and a projection optical system for projecting and displaying the image lights synthesized by the color separating and synthesizing optical system, a light directing element for reflecting the illuminating light from the illuminating optical system at a reflectance approximate to about 100%, directing it to the color separating and synthesizing optical system and transmitting therethrough the image lights from the color separating and synthesizing optical system to the projection optical system is provided between the illuminating optical system and the color separating and synthesizing optical system so that when the trace line, in the light directing element, the color separating and synthesizing optical system and the projection optical system, of a ray of light along the center line of an illuminating beam in the illuminating optical system is defined as the reference axis of the entire system, a reference axis in the color separating and synthesizing optical system (or the illuminating optical system) and a reference axis in the projection optical system may be inclined with respect to normals to the display surfaces of the image display elements, and between the color separating and synthesizing optical system and at least one of the image display elements, there is provided color adjusting means for narrowing the wavelength band of the color light entering this image display element.

In these seventh and eighth aspects, the light directing element can be constituted, for example, prism type optical element having a first surface on which the illuminating light is made to be incident, a second surface from which the illuminating light is made to emerge toward the color separating and synthesizing optical system and on which the image lights from the color separating and synthesizing optical system are made to be incident, and a third surface which reflects the illuminating light incident from the first surface toward the second surface at a reflectance approximate to about 100% and makes the image lights incident from the second surface emerge therefrom toward the projection optical system.

Also, according to a ninth aspect of the application, in a projection type image display apparatus having an illuminating optical system, a color separating and synthesizing optical system for separating illuminating light from the illuminating optical system into a plurality of color lights, making the respective color lights enter image display elements provided for the respective ones of the color lights, and synthesizing image lights of a plurality of colors emerging from these image display elements, and a projection optical system for projecting and displaying the image lights synthesized by the color separating and synthesizing optical system, a light directing element for transmitting therethrough the illuminating light from the illuminating optical system to the color separating and synthesizing optical system, reflecting the image lights from the color separating and synthesizing optical system at a reflectance approximate to about 100% and directing them to the projection optical system is provided between the illuminating optical system and the color separating and synthesizing optical system so that the optical path of the illuminating light and the optical paths of the image lights in the light directing element and the color separating and synthesizing optical system may differ from each other, and between the color separating and synthesizing optical system and at least one of the image display elements, there is provided color adjusting means for narrowing the wavelength band of the color light entering this image display element.

Further, according to a tenth aspect of the application, in a projection type image display apparatus having an illuminating optical system, a color separating and synthesizing optical system for separating illuminating light from the illuminating optical system into a plurality of color lights, making the respective color lights enter image display elements provided for the respective ones of the color lights, and synthesizing image lights of a plurality of colors emerging from these image display elements, and a projection optical system for projecting and displaying the image lights combined by the color separating and synthesizing optical system, a light directing element for transmitting therethrough the illuminating light from the illuminating optical system to the color separating and synthesizing optical system, reflecting the image lights from the color separating and synthesizing optical system at a reflectance approximate to about 100% and directing them to the projection optical system is provided between the illuminating optical system and the color separating and synthesizing optical system so that when the trace line, in the light directing element, the color separating and synthesizing optical system and the projection optical system, of a ray of light along the center line of an illuminating beam in the illuminating optical system is defined as the reference axis of the entire system, a reference axis in the color separating and synthesizing optical system (or the illuminating optical system) and a reference axis in the projection optical system may be inclined with respect to normals to the display surfaces of the image display elements, and between the color separating and synthesizing optical system and at least one of the image display elements, there is provided color adjusting means for narrowing the wavelength band of the color light entering this image display element.

In these ninth and tenth aspects, the light directing element can be constituted, for example, by a prism type optical element having a first surface on which the illuminating light is made to be incident and which reflects the image lights at a reflectance approximate to about 100%, a second surface which makes the illuminating light incident from the first surface emerge toward the color separating and synthesizing optical system and on which the image lights from the color separating and synthesizing optical system are made to be incident, and a third surface which makes the image lights incident from the second surface and reflected by the first surface emerge therefrom toward the projection optical system.

In the above-described sixth to tenth aspects, the color light illuminating each image display element has its wavelength band determined by the characteristic of such film as dichroic film the color separating and synthesizing optical system has, but by providing color adjusting means such as a dichroic filter for narrowing the wavelength band of the color light between the color separating and synthesizing optical system and the image display elements, it is possible to eliminate from the color light the wavelength band component light of an area in which the film characteristic of the color separating and synthesizing optical system changes from a transmitted wavelength band to a reflected wavelength band and therefore, it becomes possible to enhance the purity of the color light and widen the range of color reproduction.

Also, generally, the wavelength band component light of the area in which the film characteristic of the color separating and synthesizing optical system changes from the transmitted wavelength band to the reflected wavelength band has its polarized state disturbed by the difference between the phase characteristics of P-polarized light and S-polarized light in the film of the color separating and synthesizing optical system and causes image contrast to be reduced, but by providing the color adjusting means as in the present embodiment, it becomes possible to improve this.

According to the seventh to tenth aspects of the application, it becomes possible to separate the optical path of the illuminating light and the optical path of the image light from each other without providing a polarizing beam splitter as in the prior art. Moreover, the illuminating light from the illuminating optical system or the image lights from the color separating and synthesizing optical system are reflected at a reflectance approximate to about 100% and directed to the color separating and synthesizing optical system or the projection optical system by the light directing element and therefore, as compared with the conventional projection type image display apparatus, the utilization efficiency of light can be enhanced, and it becomes possible to obtain a bright and highly definite display image.

Also, if as in the eighth and tenth aspects, the reference axis in the color separating and synthesizing optical system (or the illuminating optical system) and the reference axis in the projection optical system are set so as to be inclined with respect to the normals to the display surfaces of the image display elements, it will become possible to downsize the projection optical system.

Here, if the reference axis of the illuminating optical system is disposed while being inclined by an inclination angle θ with respect to the normal to the image display elements, the reference axis of the projection optical system is also disposed while being inclined by an inclination angle θ to the opposite side to the normals to the image display elements. When at this time, the inclination angle θ is made great, the angle 2θ formed between the reference axis of the illuminating optical path and the reference axis of the projection optical path becomes great, and the angle ω at which the projection optical path (or the illuminating optical path) is incident on the light directing element becomes small, and it is possible to make the transmittance by the incident angles of all rays transmitted through the light directing element uniform. Also, in the illuminating optical system, the smaller is the F number of the illuminating optical system, the better becomes efficiency.

On the other hand, in an eccentric optical system, the smaller is the inclination angle θ of the object surface (the image display element), the smaller is the amount of eccentric aberration, and the greater is the F number of the projection optical system, the easier becomes the correction of aberration, and this is desirable.

By making projection optical system is into an eccentric optical system having at least one rotation-asymmetrical surface or a plurality of optical elements differing in rotation symmetry axis from one another, it becomes possible to correct an eccentric aberration such as Keystone distortion caused by the projection optical system being inclined.

Also, when the light directing element is formed into a wedge shape, an auxiliary optical element for refracting and transmitting therethrough the image lights emerging from the light directing element is disposed between the light directing element and the projection optical system with an air space provided relative to the light directing element, or an auxiliary optical element for refracting and transmitting therethrough the illuminating light from the illuminating optical system is disposed between the light directing element and the illuminating optical system with an air space provided relative to the light directing element, whereby it becomes possible to alleviate any aberration caused by the wedge shape.

In order to achieve the above object, according to an eleventh aspect of the application, in a projection type image display apparatus having an illuminating optical system, a color separating and synthesizing optical system for separating illuminating light from the illuminating optical system into a plurality of color lights differing in wavelength band from one another, making the respective color lights enter reflection type image display elements provided for the respective color lights, and synthesizing the plurality of color lights reflected by and emerging from these reflection type image display elements, and a projection optical system for projecting and displaying color image lights synthesized by the color separating and synthesizing optical system, a plurality of color light components of the illuminating light separated by the color separating and synthesizing optical system are made into polarized lights each having chiefly a direction of polarization so that the main direction of polarization of the plurality of color light components separated by the color separating and synthesizing optical system and the main direction of polarization of the plurality of color lights synthesized by the color separating and synthesizing optical system may become the same for each color.

Thereby, it becomes possible to reduce the deterioration of the quality of displayed image such as a reduction in contrast attributable to the difference in characteristic to the directions of polarization during the color separation of the illuminating light and during the synthesis of the plurality of color lights, in the color separating and synthesizing optical system.

Specifically, for example, wavelength selective polarizing control means having the function of making the main direction of polarization of at least one color light component of the illuminating light different from the main direction of polarization of other color light component is provided in the illuminating optical system so that the main direction of polarization of at least one color light component of a plurality of color light components separated by the color separating and synthesizing optical system may differ from the main direction of polarization of the other color light components.

As the wavelength selective polarization control means, use can be made of a laminated phase element comprising a plurality of laminated phase plates, an element comprised of a dichroic surface and a phase plate, a cholesteric liquid crystal element exerting different action upon each color light component, or the like.

Also, a polarizing element for transmitting therethrough the main polarization direction components of the plurality of color lights is disposed between the color separating and synthesizing optical system and each reflection type image display element, whereby each color light modulated by each reflection type image display element is analyzed before synthesized and therefore, it becomes possible to obtain high contrast of a displayed image.

When in the color separating and synthesizing optical system, the optical path of each color light separated and entering the reflection type image display element and the optical path of each color light emerging from the reflection type image display element and synthesized are made different from each other, or the trace line, in the illuminating optical system, the color separating and synthesizing optical system and the projection optical system, of a ray of light along the center line of the illuminating beam in the illuminating optical system is defined as the reference axis of the entire system, a reference axis in the color separating and synthesizing optical system (or the illuminating optical system) and a reference axis in the projection optical system are inclined with respect to normals to the display surfaces of the reflection type image display elements, whereby it becomes possible to achieve the downsizing of the projection type image display apparatus.

Further, by a prism type light directing element for reflecting the illuminating light from the illuminating optical system or the image lights from the color separating and synthesizing optical system at a reflectance approximate to about 100% being provided between the illuminating optical system and the color separating and synthesizing optical system or between the color separating and synthesizing optical system and the projection optical system, it becomes possible to decrease the loss of the quantity of light and obtain a bright displayed image, as compared with a case where use is made of a polarizing beam splitter having wavelength dependency and angle dependency.

DETAILED DESCRIPTION OF THE PREFERRED EMBODIMENTS (First Embodiment)

Figure 1:
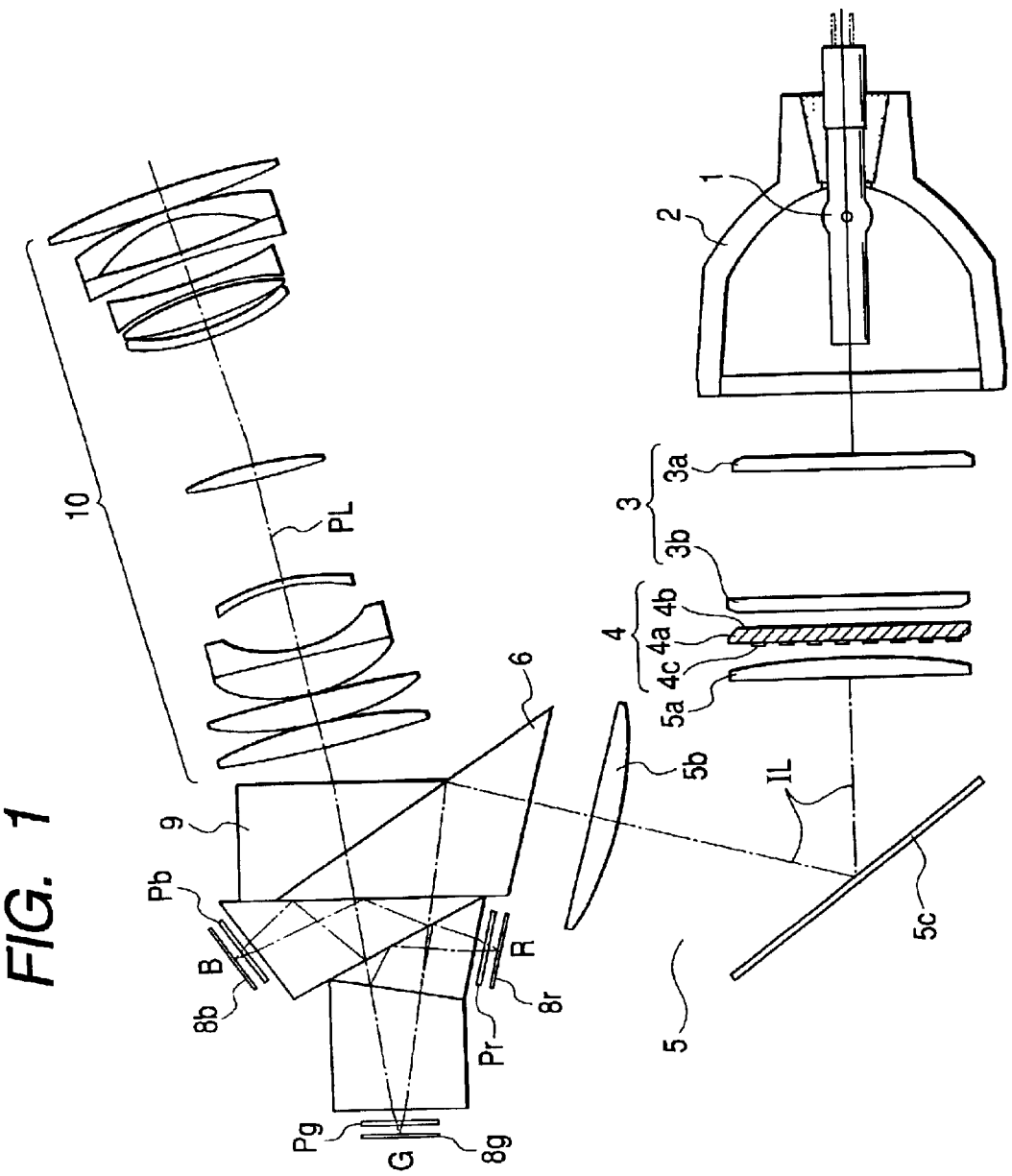
FIG. 1 shows the construction of a projection type image display apparatus which is a first embodiment of the present invention.

FIG. 1 shows the construction of a projection type image display apparatus which is a first embodiment of the present invention. In FIG. 1, the reference numeral 1 designates an illuminating light source comprised of a high pressure mercury lamp or the like, and the reference numeral 2 denotes a reflector for radiating light from this light source 1 in a predetermined direction.

The reference numeral 3 designates an integrator for forming a uniform illuminating area, and comprised of fly-eye lenses 3a and 3b.

The reference numeral 4 denotes a polarizing conversion element for making unpolarized light uniform in a predetermined direction of polarization, and comprised of polarizing separation film 49, reflecting film 4b and a ½ phase plate 4C.

The reference numeral 5 designates a condensing optical system for condensing the illuminating light, and comprised of lenses 5a and 5b, and a mirror 5c. The light source 1 to the lens 5b together constitute an illuminating optical system referred to in the appended claims.

The reference numeral 6 denotes an optical path prism (light directing element) for setting an optical path so that the optical paths of an illuminating optical system and a projection optical system may pass through a color separating and synthesizing optical system.

The reference numeral 7 designates a dichroic prism (color separating and synthesizing optical system) for separating the optical path into three colors, i.e., R, G and B, and synthesizing them again, and in the present embodiment, it is constructed as by combining three prisms, and vapor-depositing dichroic film on a predetermined combined surface.

The reference characters 8r, 8g and 8b denote reflection type image display elements for respective color lights comprised of liquid crystal displays or the like, and they are driven by a signal conforming to image information from an image information supplying apparatus such as a personal computer, a television, a video or a DVD player, and reflect incident illuminating lights of the respective colors and also modulate and emit them.

The reference numeral 9 designates an auxiliary prism (auxiliary optical element), and the reference numeral 10 denotes an eccentric projection lens (projection optical system).

The reference characters Pr, Pg and Pb designate polarizing plates (polarizing elements disposed between the dichroic prism 7 and the respective reflection type image display elements 8r–8b.

Description will now be made of optical action in the image display apparatus constructed as described above. An illuminating beam radially emitted from the light source 1 is reflected by the reflector 2 and is condensed toward the fly-eye lens 3a. This illuminating beam is separated into a plurality of beams by the fly-eye lens 3a, whereafter the beams are superimposed upon the image display elements 8r, 8g and 8b by the action of the fly-eye lens 3b and the lenses 5a and 5b, and form a uniform illuminating area on the image display elements.

Also, a number of beams emerging from the fly-eye lens 3b are separated into P-polarized light and S-polarized light by the polarizing separation film 4a corresponding to the respective beams. The P-polarized light is converted into a polarized component of the same direction as the S-polarized light by the ½ phase plate 4c, and the S-polarized light is reflected by the reflecting film 4b and is emitted as predetermined polarized light in the same direction.

Figure 2:
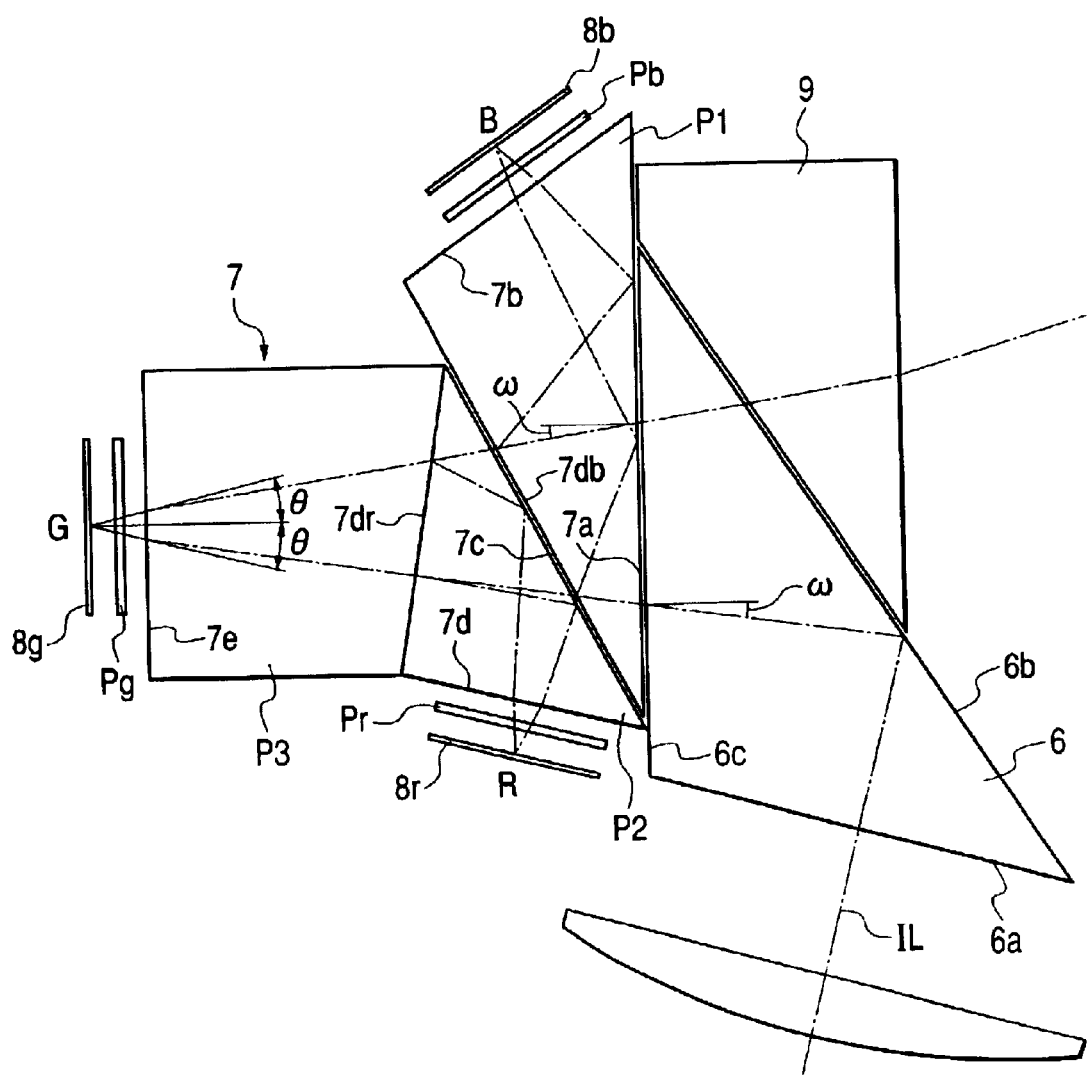
FIG. 2 is a fragmentary enlarged view of the projection type image display apparatus of the first embodiment.

As shown in FIG. 2, the illuminating beam is incident from a first surface 6a of the optical path prism 6 and is totally reflected at an angle satisfying a total reflection condition by a second surface 6b. Thereby, reflection at a reflectance approximate to about 100% (substantially 100%) is obtained, and the illuminating beam has its optical path returned and emerges from a third surface 6c.

While in the present embodiment, description will be made of a case where the illuminating beam is totally reflected by the second surface 6b of the optical path prism 6, the reflection on this second surface 6b may be the reflection by a mirror coat formed on a portion of the outside of the second surface 6b as by vapor deposition.

Also, in the present embodiment, a 3P prism comprised of three prisms (first to third prisms P1 to P3) is used as the dichroic prism 7.

In FIG. 2, B(blue) light incident from a first surface 7a of the first prism P1 is reflected by a first dichroic surface 7db, and R(red) and G(green) lights are transmitted therethrough.

The B light is reflected (e.g. totally reflected) at a reflectance of about 100% by the first surface 7a, and thereafter emerges from a second surface 7b, and is transmitted through a polarizing plate Pb and arrives at the image display element 8b for B.

The R and G lights transmitted through the first dichroic surface 7db are incident from a third surface 7c of the second prism P2 disposed with a slight air space provided between it and the surface 7db, and the R light is reflected by a second dichroic surface 7dr, and the G light is transmitted therethrough.

The R light is reflected (e.g. totally reflected) at a reflectance of about 100% by a third surface 7c, and thereafter emerges from a fourth surface 7d, and is transmitted through a polarizing plate Pr and arrives at the image display element 8r for R.

The G light transmitted through a second dichroic surface 7dr enters the third prism P3, and thereafter emerges from a fifth surface 7e, and is transmitted through a polarizing plate Pg and arrives at the image display element 8g for G.

Each color illuminating light having entered each image display element has its polarized state modulated by each image display element driven by a signal conforming to the image information and is reflected.

Image lights modulated and reflected by the respective image display elements are reflected in a direction differing from the direction of incidence of the illuminating light, are transmitted through the respective polarizing plates Pr-Pb and enter the dichroic prism 7, and pass through the surfaces thereof in the order opposite to that when they were color-separated as previously described, and are again combined into one and emerge.

The light having emerged from the dichroic prism 7 enters the optical path prism 6 from a third surface 6c thereof at an angle smaller than the angle satisfying the total reflection condition by a second surface 6b, and is transmitted through the second surface 6b and emerges.

The light having emerged from the optical path prism 6 is transmitted through the auxiliary prism 9 while being refracted thereby, and is projected as a full-color image onto a screen, not shown, by the eccentric projection lens 10 of FIG. 1.

Here, assuming that in FIG. 1, the reference axis of the illuminating optical system is the center axis of the illuminating beam, the reference axis of the optical system can be considered to be a straight line obtained by tracing a ray of light along the optical axis of the reflector 2 by other illuminating optical systems (5a, 5b, 5c) than the fly-eye lenses 3a and 3b provided subsequently thereto, the optical path prism 6, the dichroic prism 7, the image display elements 8r–8b, the auxiliary prism 9 and the eccentric projection lens 10.

On the basis of this, in FIG. 1, IL is set as the reference axis of the illuminating optical system, and PL is set as the reference axis of the projection optical system.

In the present embodiment, as shown in FIG. 2, the reference axis of the illuminating optical system after color separation (i.e., the reference axis of the color separating and synthesizing system) IL and the reference axis PL of the projection optical system are both set so as to be inclined by θ with respect to normals to the display surfaces of the image display elements 8r–8b. Thereby, the angle formed between the reference axis IL of the illuminating optical system and the reference axis PL of the projection optical axis is 2θ.

When the above-mentioned inclination angle θ is made great, the angle 2θ formed between the reference axis of the illuminating optical path and the reference axis of the projection optical path becomes great, and the angle ω at which the image light (or the illuminating light) is incident on the optical path prism 6 becomes small, and the transmittance of all rays transmitted through the optical path prism 6 by the incident angle can be made more uniform. Also, in the illuminating optical system, the smaller is the F number of the illuminating optical system, the better becomes efficiency.

On the other hand, in an eccentric optical system, the smaller is the inclination angle θ of the object surface (image display element), the smaller is the amount of eccentric aberration, and the greater is the F number of the eccentric projection lens 10, the easier becomes the correction of the aberration.

The polarizing plate Pr-Pb, as previously described, are provided between the dichroic prism 7 and respective ones of the image display elements 8r–8b, and function both as polarizes for the illuminating light and analyzers for projected light (image light).

Therefore, light not subjected to modulation (emerging in the same direction of polarization as the direction of polarization in which the light has entered) at the image display elements displays white, and light subjected to modulation and having had its direction of polarization rotated by 90° displays black. At this time, the direction of transmission of the polarizing plate may be made parallel to the direction of polarization made uniform by a polarizing conversion element, or may be a direction differing from the direction of polarization made uniform by the polarizing conversion element with a phase plate provided in the optical path after color separation.

As described above, the image display elements 8r–8g modulate the polarized state of light and therefore, polarizing plates for displaying an image become necessary between the illuminating optical system and the projection optical system, but in the present embodiment, the polarizing plates Pr-Pb are provided between the dichroic prism 7 and the respective image display elements 8r–8b, whereby the illuminating optical path and the projection optical path can be prevented from being affected by the internal strain in the overlapping dichroic prism 7 and optical path prism 6 and the disturbance of the polarized state in optical multi-layer film, and the contrast of an image can be improved.

Also, in the present embodiment, the optical prism 6 for reflecting the illuminating light from the illuminating optical system at a reflectance of nearly 100%, directing it to the dichroic prism 7 and transmitting therethrough the image light emerging from the dichroic prism 7 to the eccentric projection lens 10 side is provided between the illuminating optical system and the dichroic prism 7 so that the optical path of the illuminating light and the optical path of the image light in the optical path prism 6 and the dichroic prism 7 may be made different from each other and therefore, the optical path of the illuminating light and the optical path of the image light can be separated from each other without a polarizing beam splitter being provided as in the prior art. Moreover, the illuminating light from the illuminating optical system can be reflected at a reflectance approximate to about 100% by the optical path prism 6 and directed to the dichroic prism 7, and the image lights from the image display elements 8r–8b can be transmitted toward the eccentric projection lens 10.

Accordingly, as compared with a conventional projection type image display apparatus, the utilization of light can be enhanced and a bright displayed image can be obtained.

Also, in the present embodiment, by making the eccentric projection lens 10 into an eccentric optical system having at least one rotation-asymmetrical surface or a plurality of optical elements differing in rotation symmetry axis from one another, eccentric aberration such as Keystone distortion caused by the reference axis of the projection optical system being inclined can be corrected.

Also, in the present embodiment, the optical path prism 6 is formed into a wedge shape, but between this optical path prism 6 and the eccentric projection lens 10, there is disposed the auxiliary prism 9 for refracting and transmitting therethrough the image light emerging from the optical path prism 6, with an air space provided relative to the optical path prism 6, and therefore an aberration caused by the wedge shape can be alleviated.

(Second Embodiment)

Figure 3:
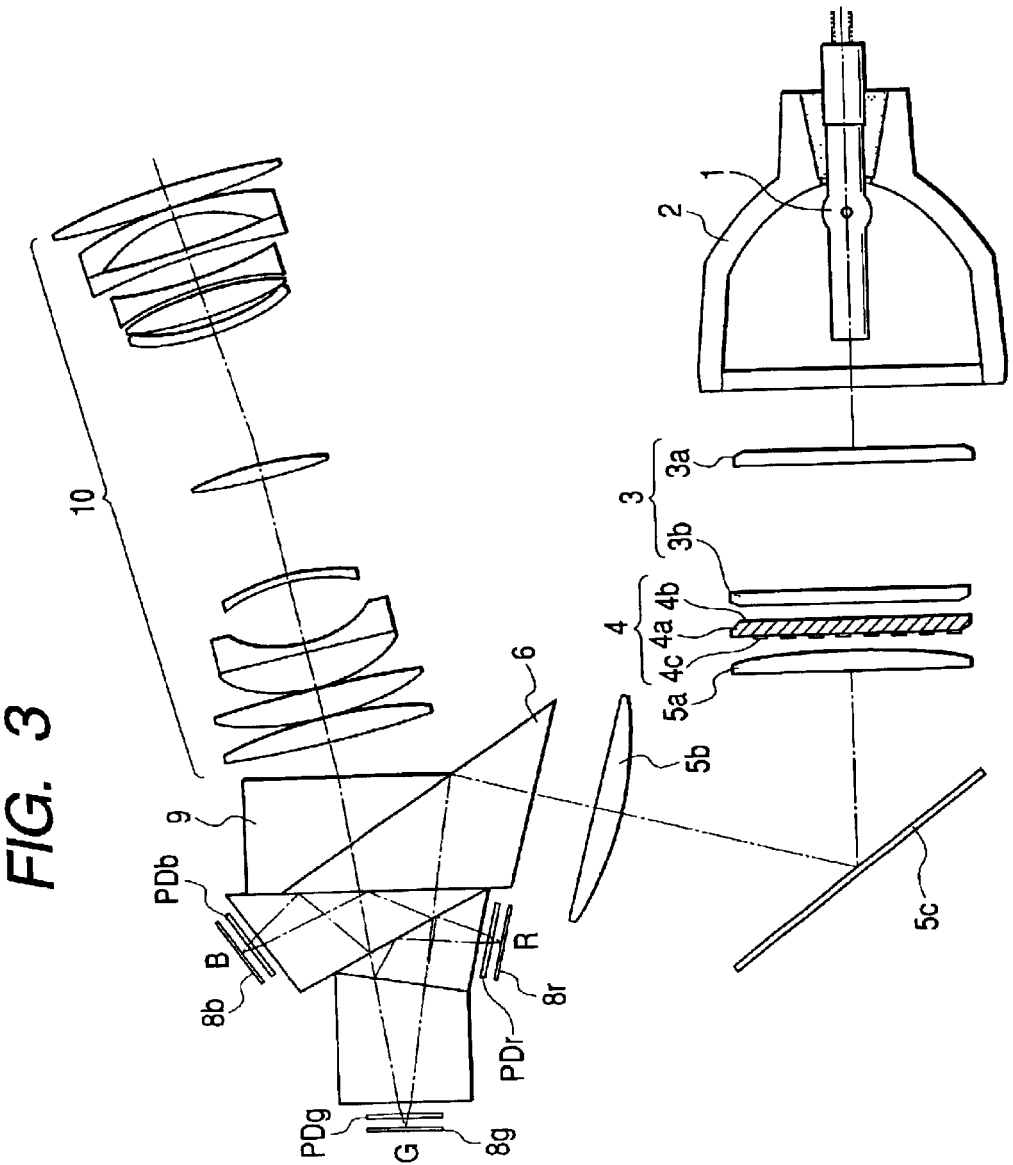
FIG. 3 shows the construction of a projection type image display apparatus which is a second embodiment of the present invention.

FIG. 3 shows the construction of a projection type image display apparatus which is a second embodiment of the present invention. In this embodiment, constituents common to those in the first embodiment are given the same reference characters as those in the first embodiment and need not be described.

The present embodiment differs from the first embodiment in that dichroic filter units PDr, PDg and PDb with polarizing plates are provided between the dichroic prism 7 and the image display elements 8r, 8g, 8b to thereby effect color adjustment.

In the present embodiment, the dichroic filter units PDr, PDg and PDb are provided between the polarizing plates in the respective color optical paths and the image display elements and are used in combination with a phase plate. Also, the polarizing plates of the dichroic filter units PDr, PDg and PDb serve both as polarizes for the illuminating light and analyzers for the projection optical system.

Figure 4A:
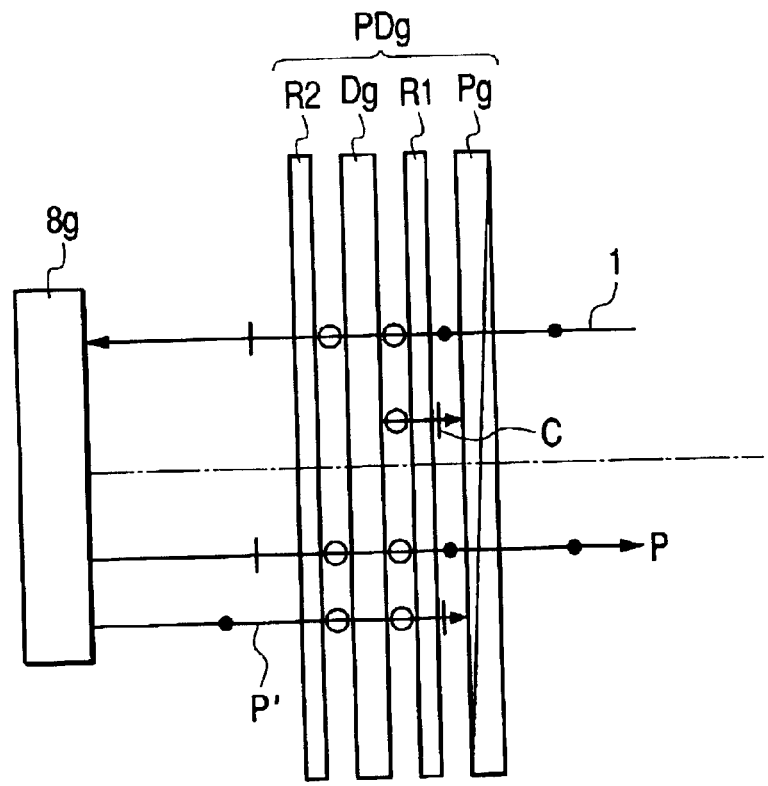
FIGS. 4A and 4B illustrate the optical action of a dichroic filter unit with a polarizing plate in the second embodiment.

FIG. 4A shows the details of the G optical path. The dichroic filter unit PDg with a polarizing plate is constructed by a polarizing plate Pg, a first ¼ phase plate R1, a dichroic filter Dg and a second ¼ phase plate R2 being cemented together.

Thereby, the light incident as the illuminating light (I) is adjusted into rectilinearly polarized light (°) by the polarizing plate Pg, and thereafter is converted into circularly polarized light by the first phase plate R1, and enters the dichroic filter Dg.

In the dichroic filter Dg, light (C) of an unnecessary wavelength component is reflected and a wavelength component to be used is transmitted. The direction of polarization (O) of the light reflected by the dichroic filter Dg is converted into a direction of polarization (|) rotated by 90° with respect to the transmission axis of the polarizing plate Pg by the first ¼ phase plate R1, and this reflected light is absorbed by the polarizing plate Pg.

Also, the light transmitted through the dichroic filter Dg is converted into linearly polarized light (|) by the second ¼ phase plate R2 and enters the image display element 8g.

Light (P) reflected by the image display element 8g and having had its direction of polarization not changed is again made into circularly polarized light (O) by the second ¼ phase plate R2, and is transmitted through the dichroic filter Dg, and thereafter is transmitted through the first ¼ phase plate R1 and is converted into linearly polarized light of the same direction of polarization (°) as the illuminating light (I), and is transmitted through the polarizing plate Pg.

Light (P') having had its direction of polarization rotated by 90° by the image display element 8g has its direction of polarization rotated (°) by 90° and therefore, is transmitted through the second phase plate R2, the dichroic filter Dg and the first phase plate R1, and thereafter is converted into a direction of polarization (|) orthogonal to the illuminating light (I), and is absorbed by the polarizing plate Pg.

Again in the R and B optical paths, there are provided dichroic filter units PDr and Pdb of similar construction with polarizing plates.

Figure 5:
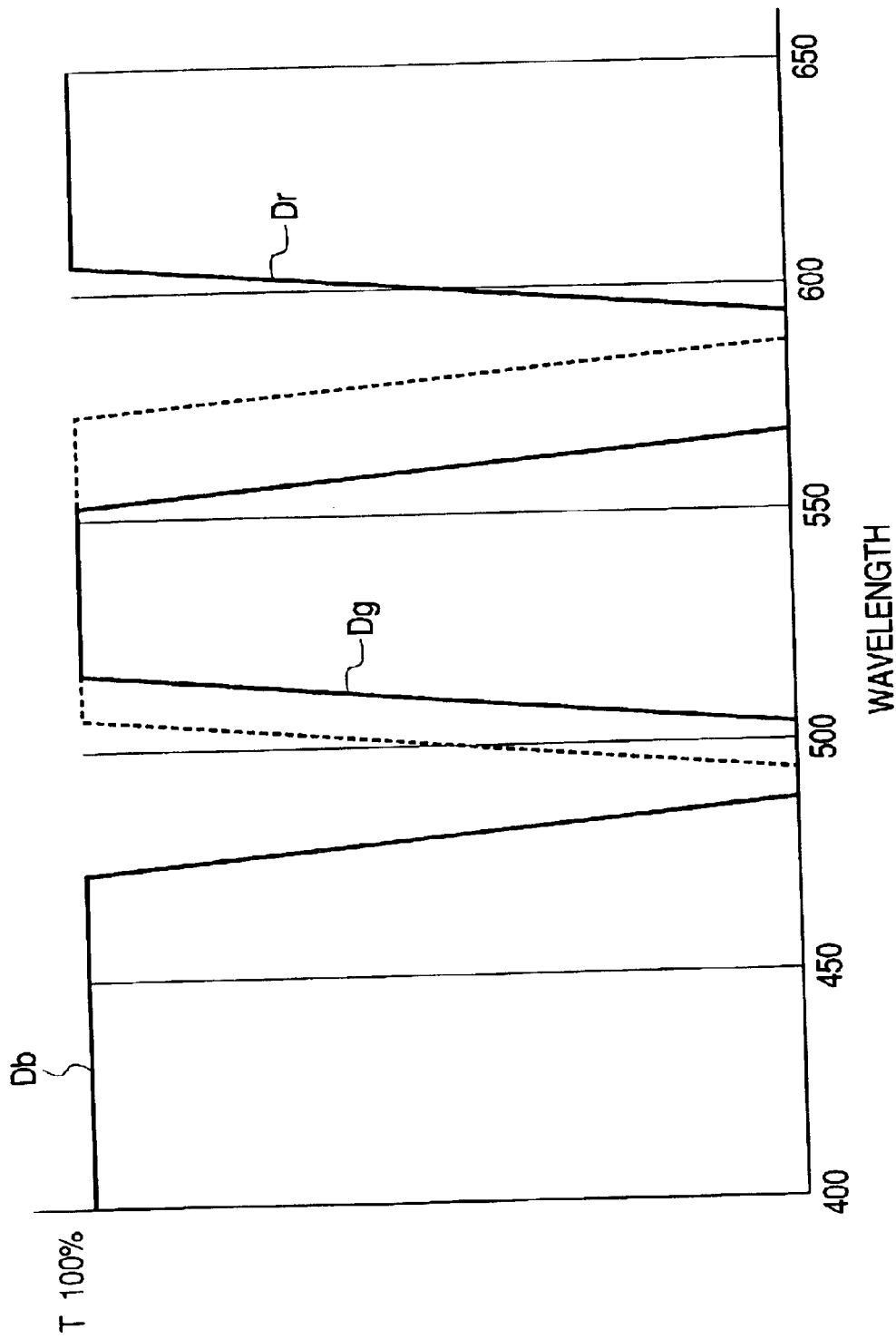
FIG. 5 illustrates the characteristic of a dichroic filter in the second embodiment.

Here, the characteristics of the dichroic filters Dg, Db and Dr are such characteristics as shown in FIG. 5 so as to cut the lights of the wavelength bands (cyan and orange) of the boundary portion among R, G and B of the illuminating light.

In FIG. 5, the characteristics of dichroic film 7db and dichroic film 7dr combined in the dichroic prism 7 are also shown by dotted lines.

Figure 4B:
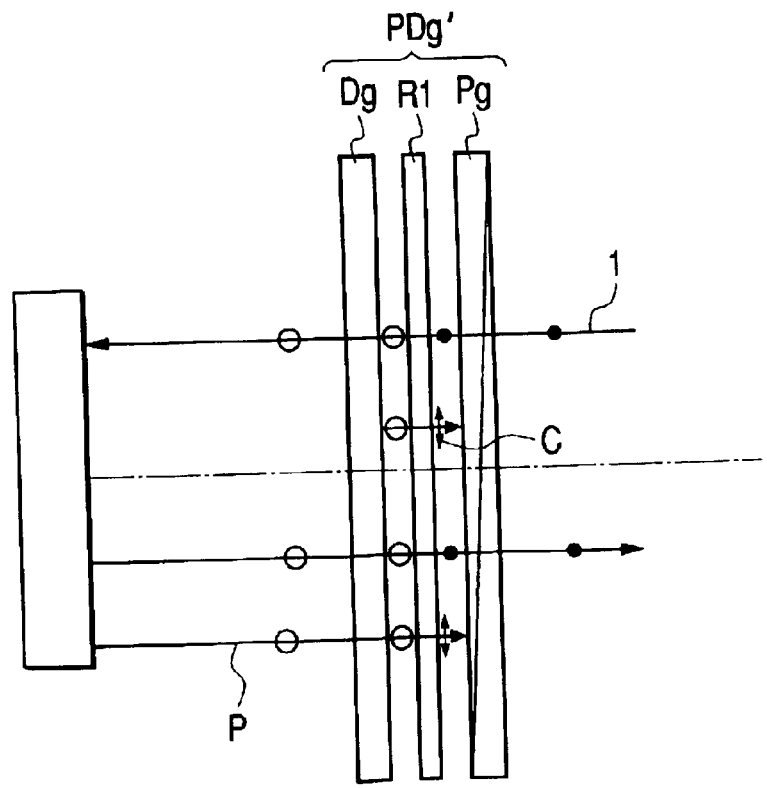

As a modification of the present embodiment, a construction in which the second phase plate is omitted as shown in FIG. 4B may be adopted. In this case, the image display elements 8r, 8g and 8b have the action of modulating circularly polarized light.

(Third Embodiment)

Figure 6:
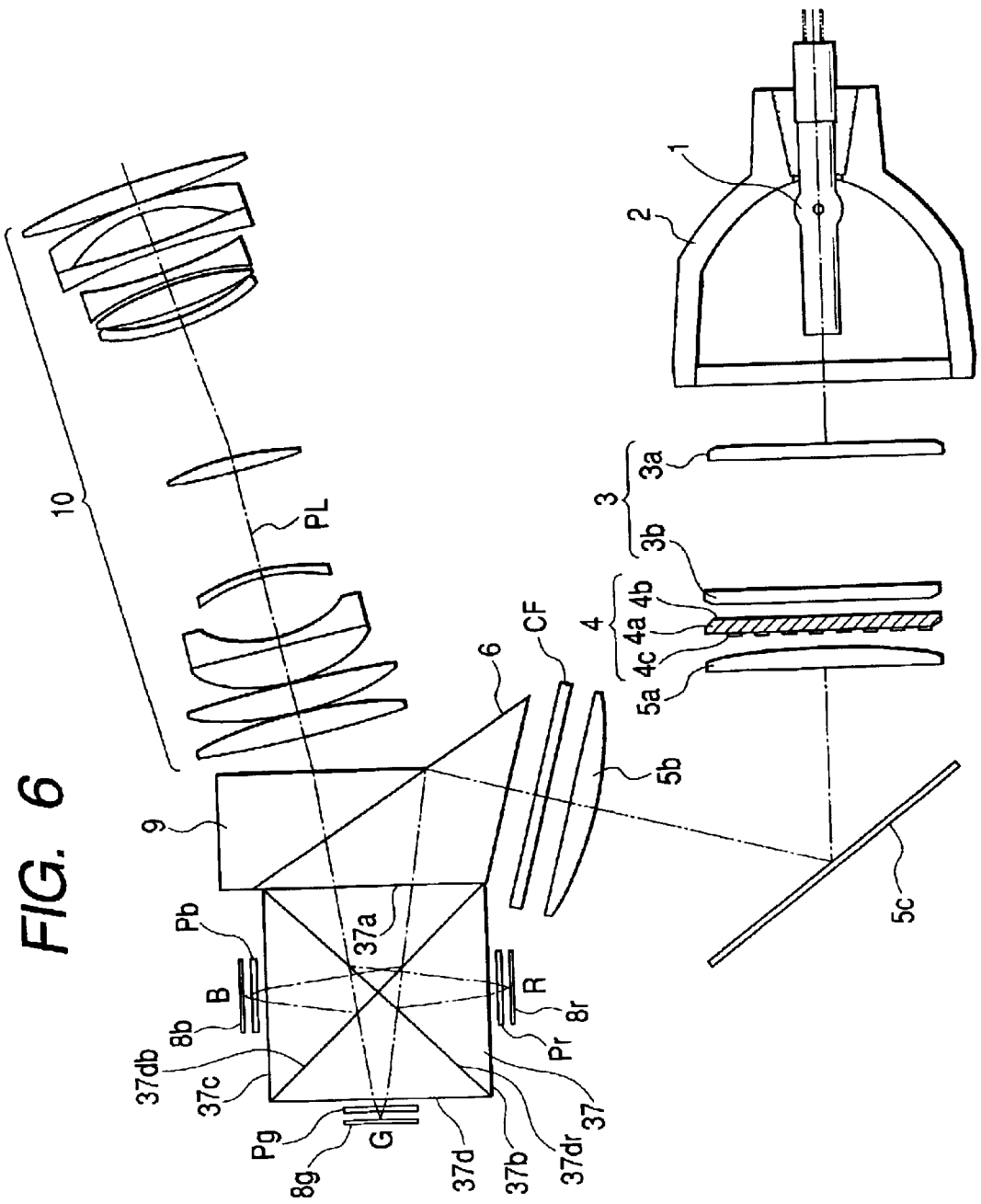
FIG. 6 shows the construction of a projection type image display apparatus which is a third embodiment of the present invention.

FIG. 6 shows the construction of a projection type image display apparatus which is a third embodiment of the present invention. In the third embodiment, constituents common to those in the first embodiment are given the same reference characters as those in the first embodiment and need not be described.

The present embodiment differs from the first embodiment in that a color phase filter CF for converting the direction of polarization of light of a particular wavelength band by 90° is provided in the illuminating optical system and further, use is made of a dichroic prism 37 of a construction which comprises four triangular prisms and of which the dichroic surfaces cross in X-shape.

The action of the dichroic prism 37 will be described here. In FIG. 6, of light incident from a first surface 37a, light reflected by a first dichroic surface 37db is transmitted through a second surface 37c, is transmitted through the polarizing plate Pb and further, arrives at the image display element 8b for B light.

Light reflected by a second dichroic surface 37dr is transmitted through a third surface 37b and is transmitted through the polarizing plate Pr, and thereafter arrives at the image display element 8r for R light.

Light transmitted through both of the first dichroic surface 37db and the second dichroic surface 37dr is transmitted through a fourth surface 37d and is transmitted through the polarizing plate Pg, and thereafter arrives at the image display element 8g for G light.

A color phase filter CF has its direction of polarization rotated by 90° in a particular wavelength band (e.g. the band of G) when light uniformized in a certain direction of polarization enters it. This is shown in FIG. 7A.

Figure 7A:
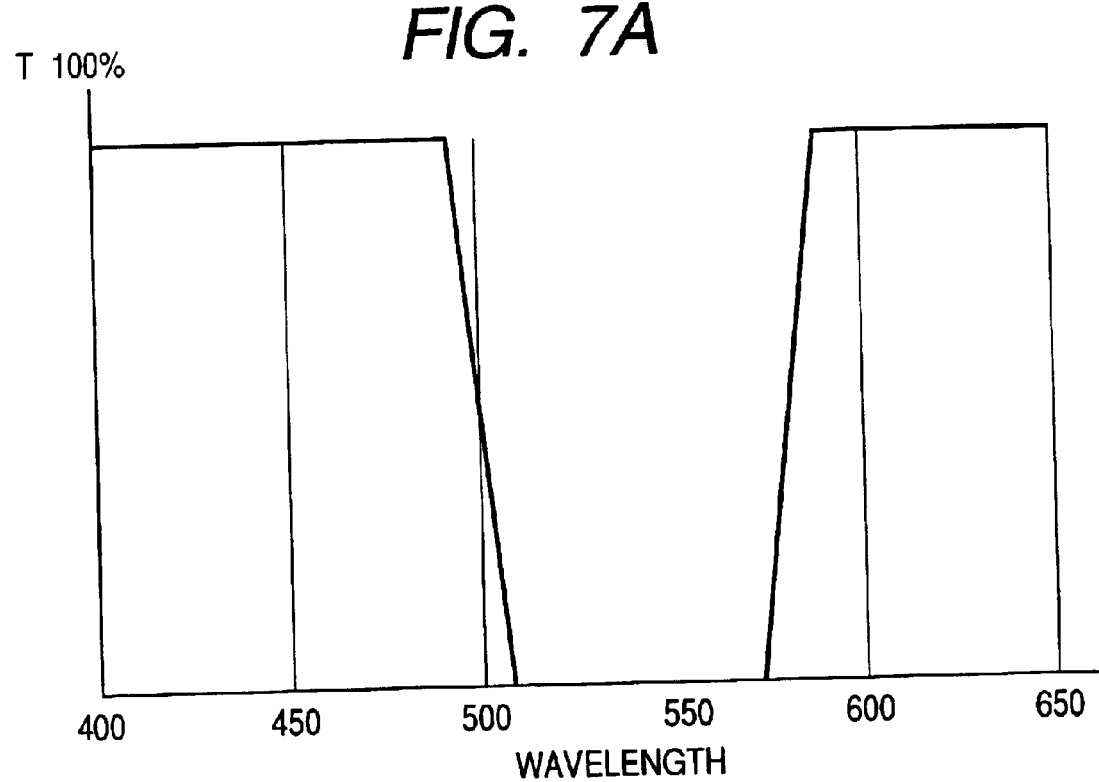
FIGS. 7A and 7B are characteristic graphs of a color phase filter in the third embodiment.
Figure 7B:
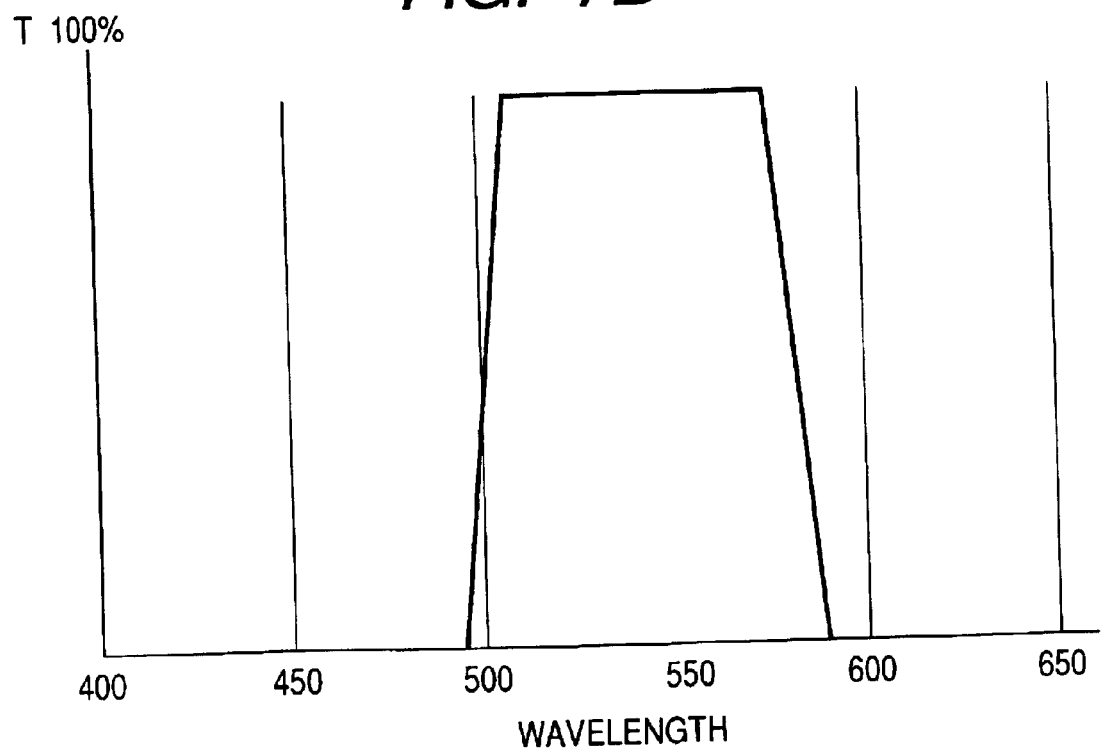

FIG. 7A shows the intensity of a polarized component parallel to the direction of polarization of incident light, and FIG. 7B shows the intensity of a polarized component perpendicular to the incident direction of polarization.

Figure 8:
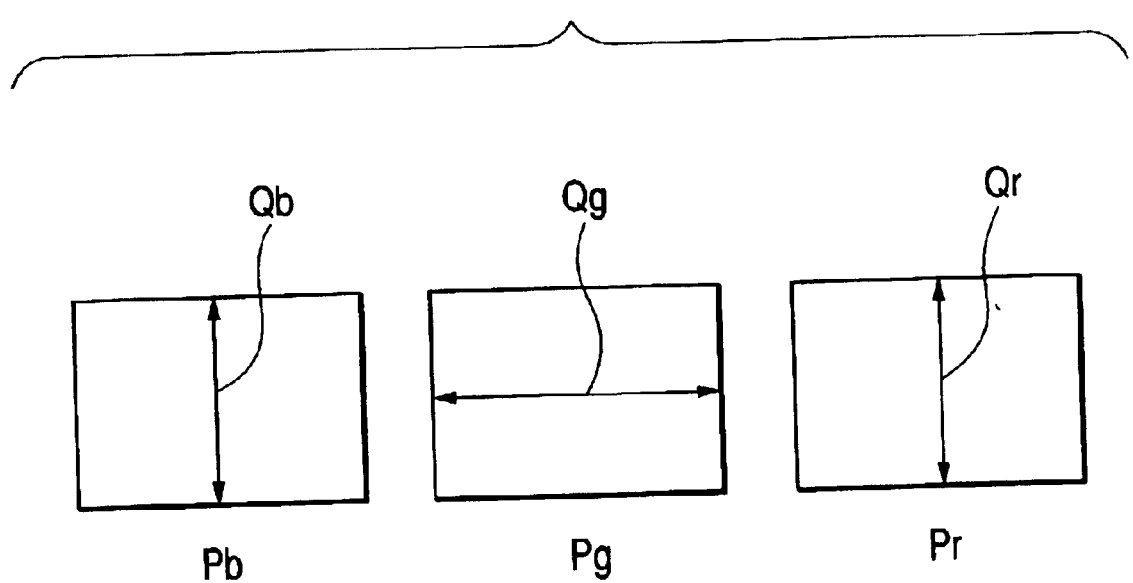
FIG. 8 illustrates the direction of transmission of a polarizing plate in the third embodiment.

Light of such characteristics as shown in FIGS. 7A and 7B emerges from the color phase filter CF and therefore, in the present embodiment, the direction of polarization of G transmitted through the dichroic prism 7 and the direction of polarization of R and B are directions differing by 90° from each other. Therefore, as shown in FIG. 8, the transmission axis Qg of the polarizing plate Pg provided in the G optical path and the transmission axes Qr and Qb of the polarizing plates Pr and Pb provided in the R and B optical paths are in directions differing by 90° from each other.

Also, phase plates may be provided in G or R and B optical paths and the direction of polarization may be set so as to be changed to a predetermined direction.

As shown here, design is made such that the directions of polarization of the G light and the R and B lights differ by 90 degree from each other and light much transmitted through dichroic film constituting the dichroic prism 7 is transmitted through the dichroic film as P-polarized light, whereby the efficiency in the dichroic film can be made higher.

Also, as a construction differing from that of this embodiment, the color phase filter CF may be provided between the optical path prism 6 and the dichroic prism 7 so that in the optical path prism 6, the color lights may be transmitted and reflected in the same direction of polarization and in the dichroic prism 7, a P-polarized component and an S-polarized component may be used properly depending on color light.

In the construction using the color phase filter as described above, any construction having the color separating action such as not only a dichroic prism comprising the cross prism shown in the present embodiment, but a dichroic prism comprising the 3P prism as shown in the first embodiment has the effect shown here.

(Fourth Embodiment)

Figure 9:
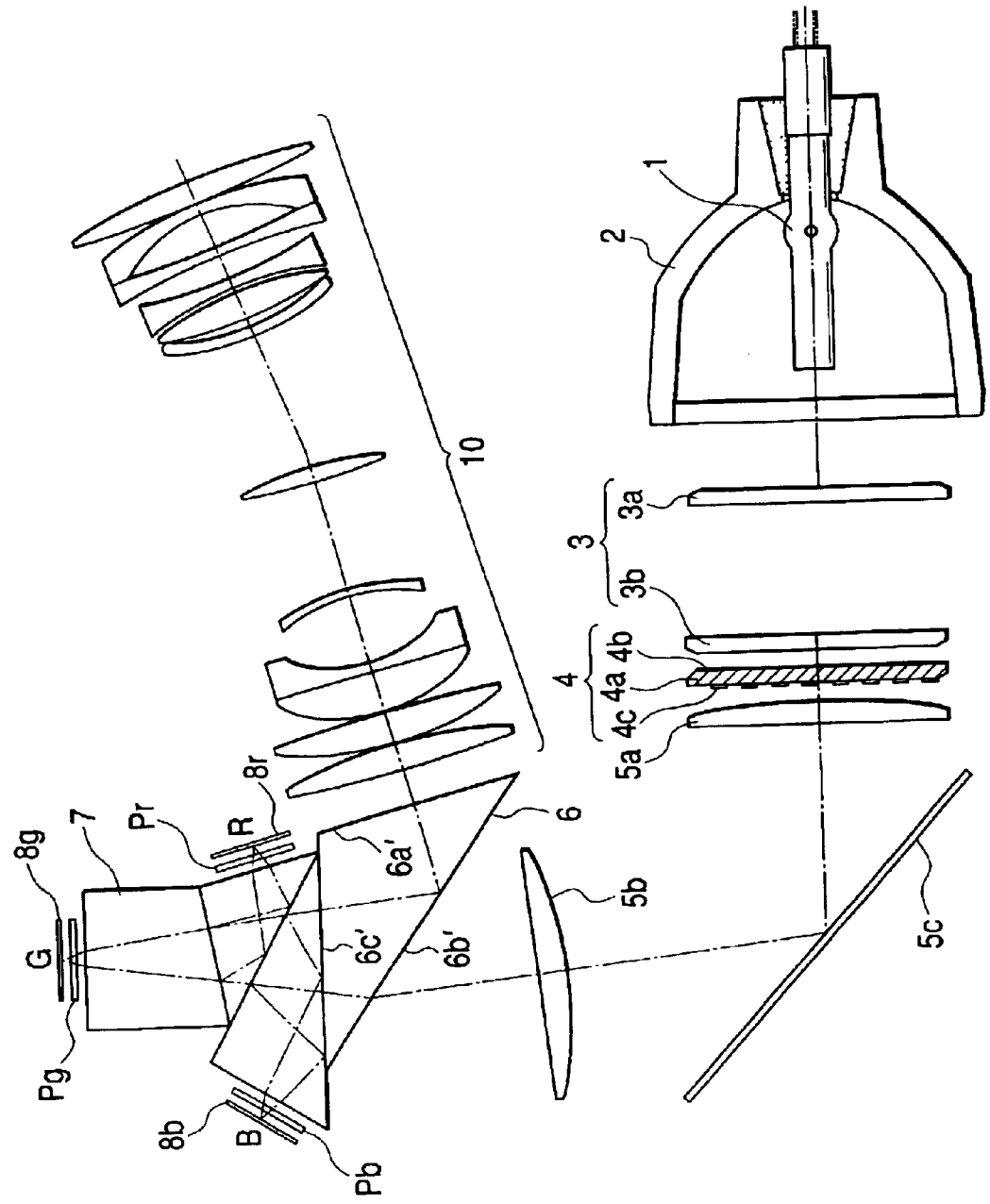
FIG. 9 shows the construction of a projection type image display apparatus which is a fourth embodiment of the present invention.
Figure 10:
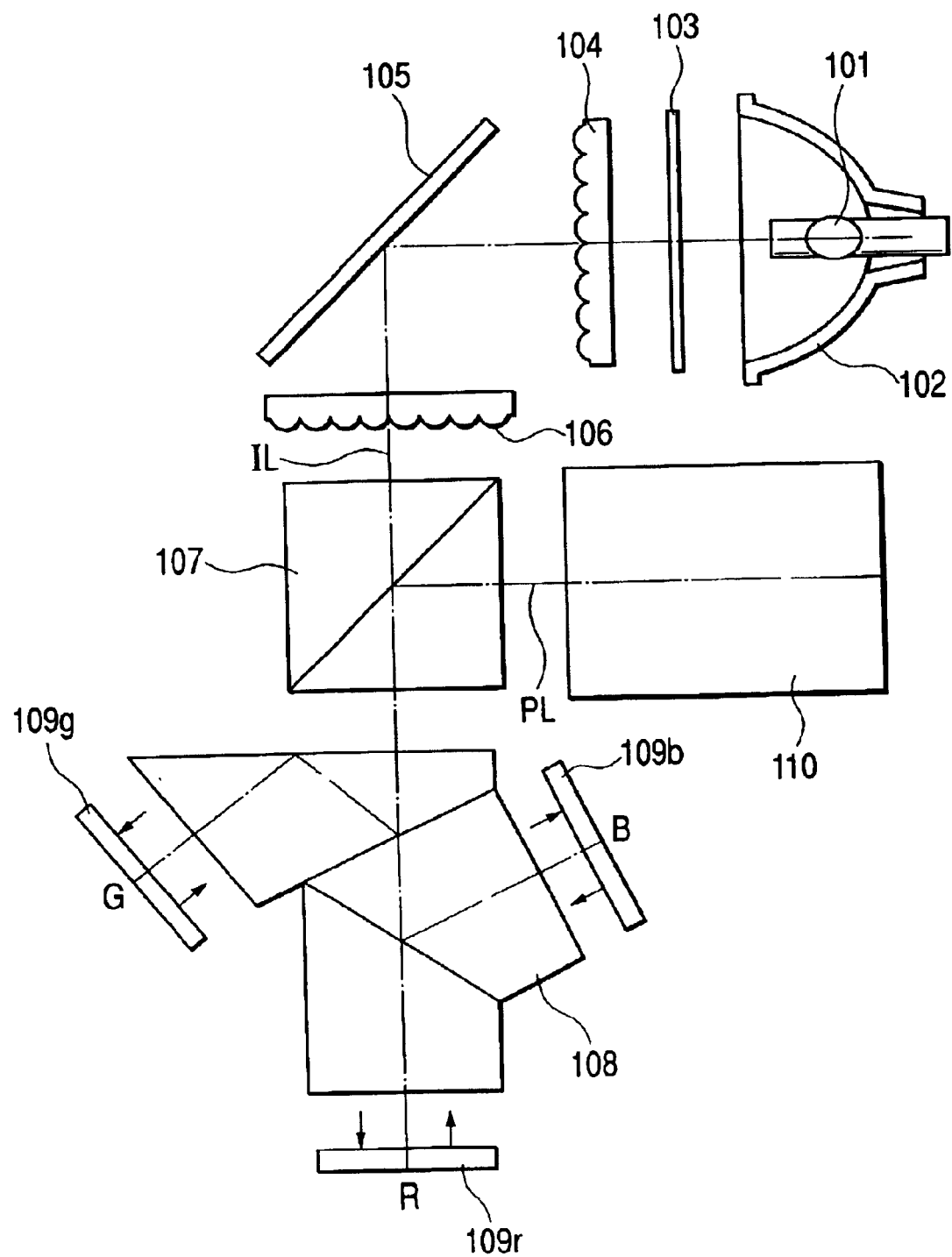
FIG. 10 shows the construction of a conventional projection type image display apparatus.

FIG. 9 shows the construction of a projection type image display apparatus which is a fourth embodiment of the present invention.

This embodiment is the same as the first embodiment with the exception that it differs from each of the above-described embodiments in the manner in which the light passes through the optical path prism 6 and therefore, in the present embodiment, constituents common to those in the first embodiment are given the same reference characters as those in the first embodiment and need not be described.

In the present embodiment, the illuminating light passed through the lens 5b is first incident on a first surface 6b' of the optical path prism 6, and is transmitted through a second surface 6c' thereof and enters the dichroic prism 7.

In the dichroic prism 7, as in the first embodiment, the illuminating light is separated into R, G and B color lights, which are transmitted through the polarizing plates Pr, Pg and Pb and enter the respective image display elements 8r–8b, and are modulated, whereafter the R, G and B lights transmitted through the polarizing plates Pr, Pg and Pb are combined and again enter the optical path prism 6 through the second surface 6c' thereof.

The image light having entered the optical path prism 6 is totally reflected by the first surface 6b' thereof, and emerges from a third surface 6a' thereof, and is projected by the eccentric projection lens 10.

In the present embodiment, the optical path prism 6 for transmitting therethrough the illuminating light from the illuminating optical system to the dichroic prism 7, and reflecting the image light from the dichroic prism 7 at a reflectance approximate to about 100% and transmitting it therethrough toward the eccentric projection lens 10 is provided between the illuminating optical system and the dichroic prism 7 so that the optical path of the illuminating light and the optical path of the image light in the optical path prism 6 and the dichroic prism 7 may differ from each other and therefore, it is possible to separate the optical path of the illuminating light and the optical path of the image light from each other without providing a polarizing beam splitter as in the prior art. Moreover, by the optical path prism 6, the image light from the dichroic prism 7 can be reflected at a reflectance approximate to about 100% and directed to the eccentric projection lens 10.

Accordingly, as compared with the conventional projection type image display apparatus, the utilization efficiency of light can be enhanced and a bright displayed image can be obtained.

In the present embodiment, an auxiliary optical element for refracting and transmitting therethrough the illuminating light from the illuminating optical system may be provided between the optical path prism 6 and the illuminating optical system with an air space provided relative to the optical path prism 6.

Also, in the present invention, the disposition of the image display element for each color light is not limited to the disposition described in the above-described embodiments, but may be set arbitrarily.

As described above, according to the present embodiment, in a projection type image display apparatus in which an image display element for modulating the polarized state of light is provided, whereby a polarizing element becomes necessary, this polarizing element is provided between the color separating and synthesizing optical system and the image display element and therefore, the illuminating optical path and the projection optical path can be prevented from being affected by the internal distortion in the overlapping optical elements (such as the element constituting the color separating and synthesizing optical system and the light directing element) and the disturbance of the polarized state in the optical multi-layer film, and the contrast of an image can be improved.

Also, it becomes possible to separate the optical path of the illuminating light and the optical path of the image light from each other without providing a polarizing beam splitter as in the prior art. Moreover, by the light directing element, the illuminating light from the illuminating optical system or the image light from the color separating and synthesizing optical system is reflected at a reflectance approximate to about 100% and directed to the color separating and synthesizing optical system or the projection optical system and therefore, as compared with the conventional projection type image display apparatus, the utilization efficiency of light can be enhanced and a bright and highly definite displayed image can be obtained.

Further, if a reference axis in the color separating and synthesizing optical system (or the illuminating optical system) and a reference axis in the projection optical system are set so as to be inclined with respect to normals to the display surfaces of the image display elements, the projection optical system can be downsized.

By making the projection optical system into an eccentric optical system having at least one rotation-asymmetrical surface or a plurality of optical elements differing in rotation symmetry axis from one another, it is possible to correct an eccentric aberration such as Keystone distortion caused by the projection optical system being inclined.

Also, when the light directing element is formed into a wedge shape, an auxiliary optical element for refracting and transmitting therethrough the image light emerging from the light directing element is disposed between the light directing element and the projection optical system with an air space provided relative to the light direction element, or an auxiliary optical element for refracting and transmitting therethrough the illuminating light from the illuminating optical system is disposed between the light directing element and the illuminating optical system with an air space provided relative to the light directing element, whereby any aberration caused by the wedge shape can be alleviated.

(Fifth Embodiment)

Figure 11:
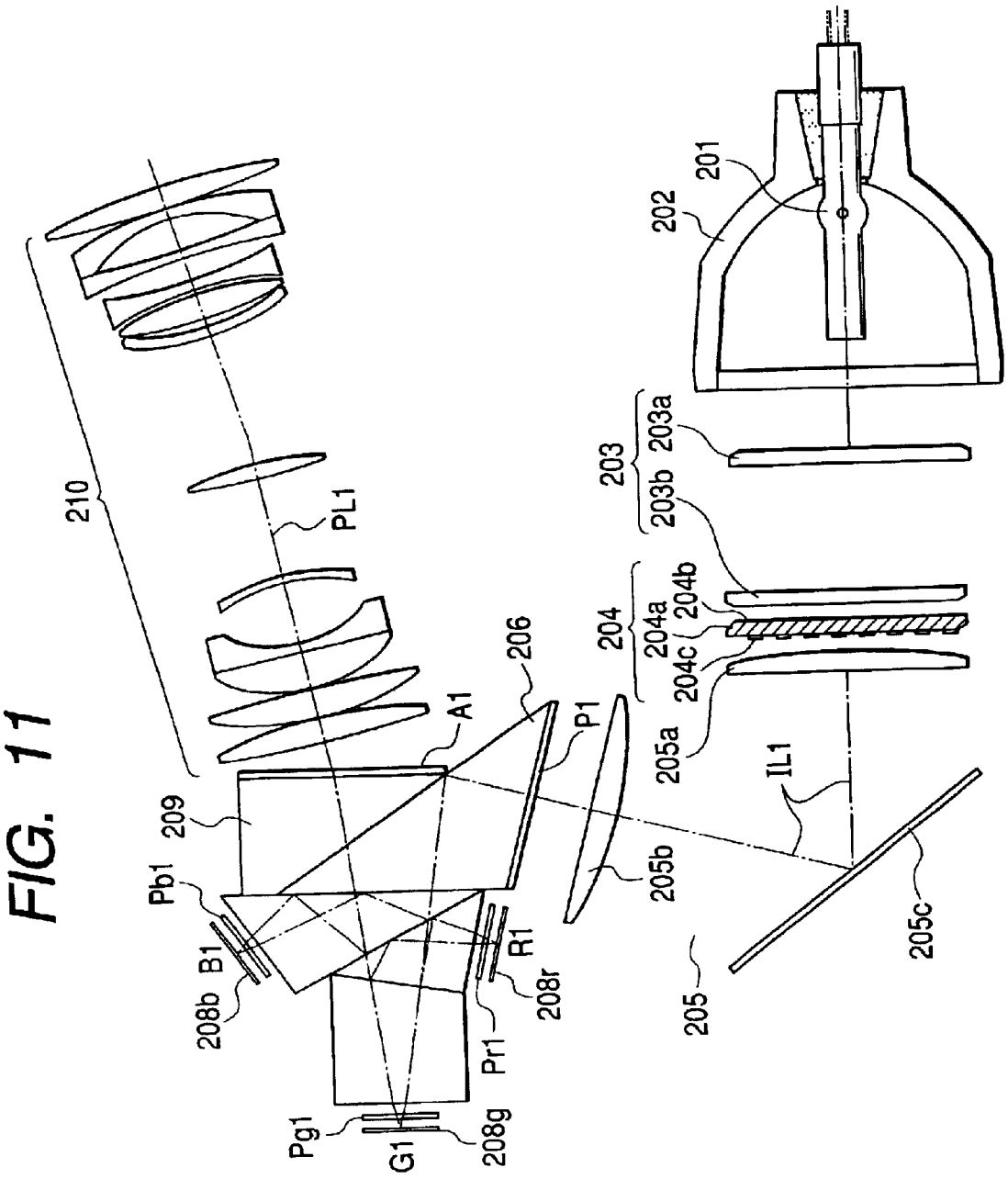
FIG. 11 shows the construction of a projection type image display apparatus which is a fifth embodiment of the present invention.

FIG. 11 shows the construction of a projection type image display apparatus which is a fifth embodiment of the present invention. In FIG. 11, the reference numeral 201 designates an illuminating light source comprised of a high pressure mercury lamp or the like, and the reference numeral 202 denotes a reflector for radiating light form the light source 201 in a predetermined direction.

The reference numeral 203 designates an integrator for forming a uniform illuminating area, and comprised of fly-eye lenses 203a and 203b.

The reference numeral 204 denotes a polarizing conversion element for making unpolarized light uniform in a predetermined direction of polarization, and comprised of polarizing separation film 204a, reflecting film 204b and a ½ phase plate 204c.

The reference numeral 205 designates a condensing optical system for condensing the illuminating light, and comprised of lenses 205a, 205b and a mirror 205c. In this embodiment, the light source 201 to the lens 205b together constitute an illuminating optical system.

The reference numeral 206 denotes an optical path prism (light directing element) for setting an optical path so that the optical paths of the illuminating optical system and a projection optical system may pass through a color separating and synthesizing optical system.

The reference numeral 207 designates a dichroic prism (color separating and synthesizing optical system) for separating the optical path into three colors, i.e., R, G and B, and synthesizing them again, and in the present embodiment, it is constructed as by combining three prisms, and vapor-depositing dichroic film to a predetermined combination surface.

The reference characters 208r, 208g and 208b denote reflection type image display elements for respective color lights comprised of liquid crystal displays or the like, and they are driven by a signal conforming to image information from an image information supplying apparatus such as a personal computer, a television, a video or a DVD player, not shown, and reflect incident illuminating lights of respective colors and modulate and emit them.

The reference numeral 209 designates an auxiliary prism (auxiliary optical element), and the reference numeral 210 denotes an eccentric projection lens (projection optical system). The reference character P1 designates a polarizer for the image display elements 208r, 208g and 208b, and the reference character Al denotes an analyzer for the image display elements 208r, 208g and 208b.

The reference characters Pr1 and Pb1 designate dichroic filters (color adjusting means) disposed between the dichroic prism 207 and the reflection type image display elements 208r and 208b for red and blue.

Description will now be made of optical action in the projection type image display apparatus constructed as described above. An illuminating beam radially emitted from the light source 201 is reflected by the reflector 202 and is condensed toward the fly-eye lens 203a. This illuminating beam is separated into a plurality of beams by the fly-eye lens 203a, whereafter the beams are superimposed on the image display elements 208r, 208g and 208b by the action of the fly-eye lens 203b and the lenses 205a, 205b to thereby form a uniform illuminating area on the image display elements.

Also, a number of beams emerging from the fly-eye lens 203b are separated into P-polarized lights and S-polarized lights by polarizing separation film 204a corresponding to the respective beams. The P-polarized lights are converted into polarized components of the same direction as the S-polarized lights by the ½ phase plate 204c, and the S-polarized lights are reflected by the reflecting film 204b, and are radiated as predetermined polarized lights in the same direction.

Figure 12:
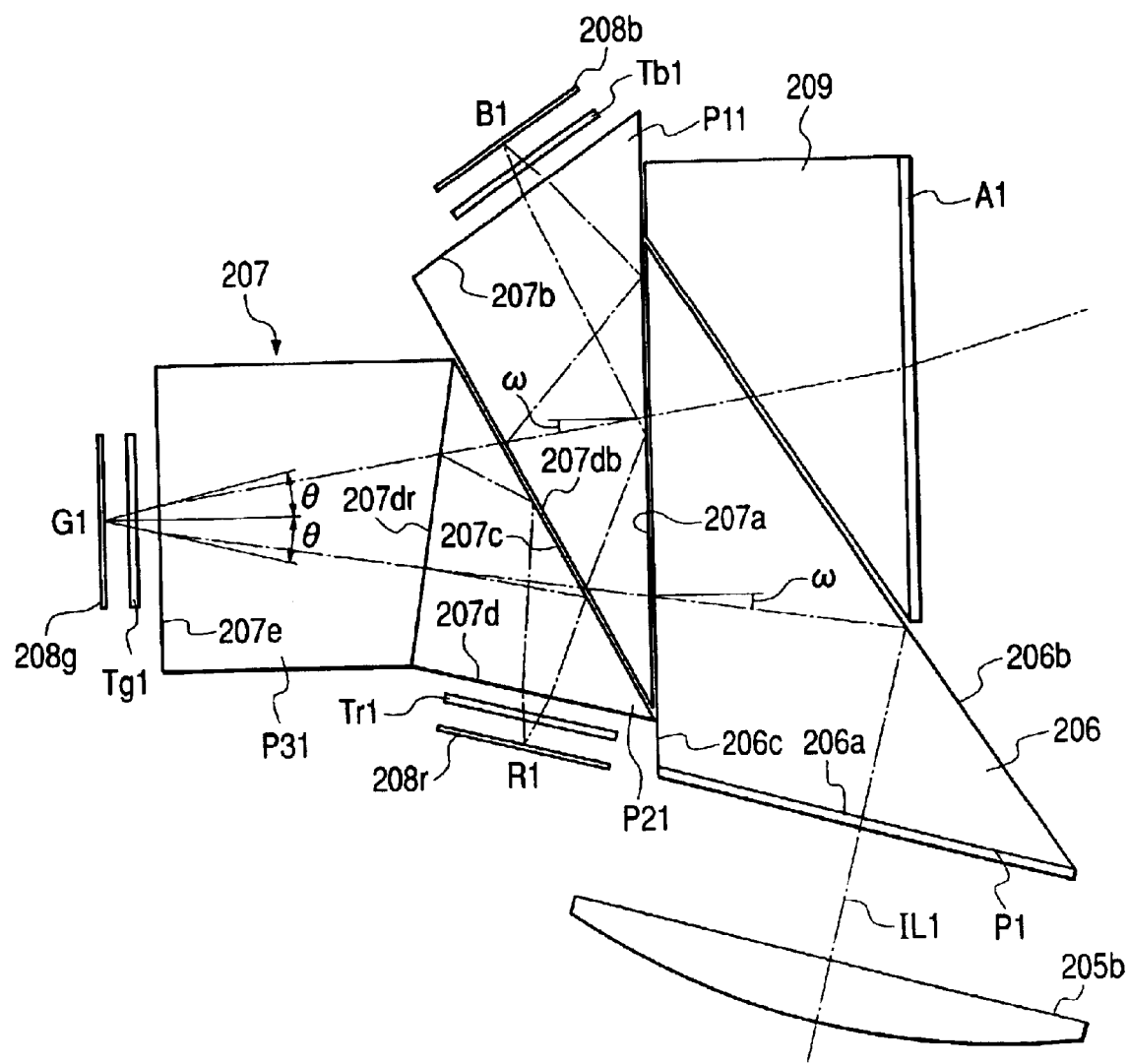
FIG. 12 is a fragmentary enlarged view of the projection type image display apparatus of the fifth embodiment.

As shown in FIG. 12, the illuminating beam is incident from a first surface of the optical path prism 206 at an angle satisfying a total reflection condition by a second surface 206b thereof and is totally reflected. Thereby, reflection at a reflectance approximate to about 100% is obtained, and the illuminating beam has is optical path bent, and thereafter emerges from a third surface 206c.

While in the present embodiment, description will be made of a case where the illuminating light is totally reflected by the second surface 206b of the optical path prism 206, the reflection on this second surface 206b may be the reflection by a mirror coat formed on a portion of the outside of the second surface 206b by vapor deposition or the like.

Also, in the present embodiment, a 3P prism comprised of three prisms (first to third prisms P11, P21 and P31) is used as the dichroic prism 7.

In FIG. 12, B(blue) light incident from a first surface 207a of the first prism P11 is reflected by a first dichroic surface 207db, and R(red) and G(green) lights are transmitted therethrough.

The B light is reflected (e.g. totally reflected) at a reflectance approximate to about 100% by the first surface 207a, and thereafter emerges from a second surface 207b, and is transmitted through the dichroic filter Pb1 and arrives at the image display element 208b for B.

The R and G lights transmitted through the first dichroic surface 207db are incident from a third surface 207c of a second prism P21 disposed with a slight air space provided with respect to the surface 207db, and the R light is reflected by a second dichroic surface 207dr, and the G light is transmitted therethrough.

The R light is reflected (e.g. totally reflected) at a reflectance approximate to about 100% by a third surface 207c, and thereafter emerges from a fourth surface 207d, and is transmitted through the dichroic filter Pr1 and arrives at the image display element 208r for R.

The G light transmitted through the second dichroic surface 207dr enters the third prism P31, and thereafter emerges from a fifth surface 207e and arrives at the image display element 208g for G.

Each color illuminating light incident on each image display element has its polarized state modulated by each image display element driven by a signal conforming to the image information and is reflected.

The image light modulated and reflected by each image display element is reflected in a direction differing from the direction of incidence of the illuminating light, and the R and B lights are transmitted through the dichroic filters Pr1 and Pb1, and the G light intactly enters the dichroic prism 207, and they pass along a route opposite to that when they were color-separated as previously described, and are again synthesized into one and emerge.

The light emerging from the dichroic prism 207 is incident on the optical path prism 206 from a third surface 206c thereof at an angle smaller than the angle satisfying the total reflection condition by a second surface 206b, and is transmitted through the second surface 206b and emerges.

The light emerging from the optical path prism 206 is transmitted through the auxiliary prism 209 while being refracted thereby, and is projected as a full-color image onto a screen, not shown, by the eccentric projection lens 210 of FIG. 11.

Assuming here that in FIG. 11, the reference axis of the illuminating optical system is the center axis of the illuminating beam, the reference axis of the optical system can be considered to be a straight line obtained by tracing a ray of light along the optical axis of the reflector 202 by other illuminating optical system (205a, 205b, 205c) than the fly-eye lenses 203a and 203b provided subsequently thereto, the optical path prism 206, the dichroic prism 207, the image display elements 208r, 208g, 208b, the auxiliary prism 209 and the eccentric projection lens 210.

On the basis of this, in FIG. 11, IL1 is set as the reference axis of the illuminating optical system, and PL1 is set as the reference axis of the projection optical system.

In the present embodiment, as shown in FIG. 12, the reference axis of the illuminating optical system after color resolution (i.e., the reference axis of the color separating and synthesizing optical system) IL1 and the reference axis PL1 of the projection optical system are both set so as to be inclined by $\theta$ with respect to normals to the display surfaces of the image display elements 208r, 208g and 208b. Thereby, the angle formed between the reference axis IL1 of the illuminating optical system and the reference axis PL1 of the projection optical system is $2\theta$.

When the above-mentioned inclination angle $\theta$ is made great, the angle $2\theta$ formed between the reference axis of the illuminating optical path and the reference axis of the projection optical path becomes great, and the angle $\omega$ at which the image light (or the illuminating light) is incident on the optical path prism 206 becomes small, and the transmittance of all rays transmitted through the optical path prism 206 by the incident angle can be made uniform. Also, in the illuminating optical system, the smaller is the F number of the illuminating optical system, the better becomes efficiency.

On the other hand, in the eccentric optical systems, the smaller is the inclination angle $\theta$ of the object surface (the image display element), the smaller is the amount of eccentric aberration, and the greater is the F number of the eccentric projection lens 210, the easier becomes the correction of the aberration.

Figure 13:
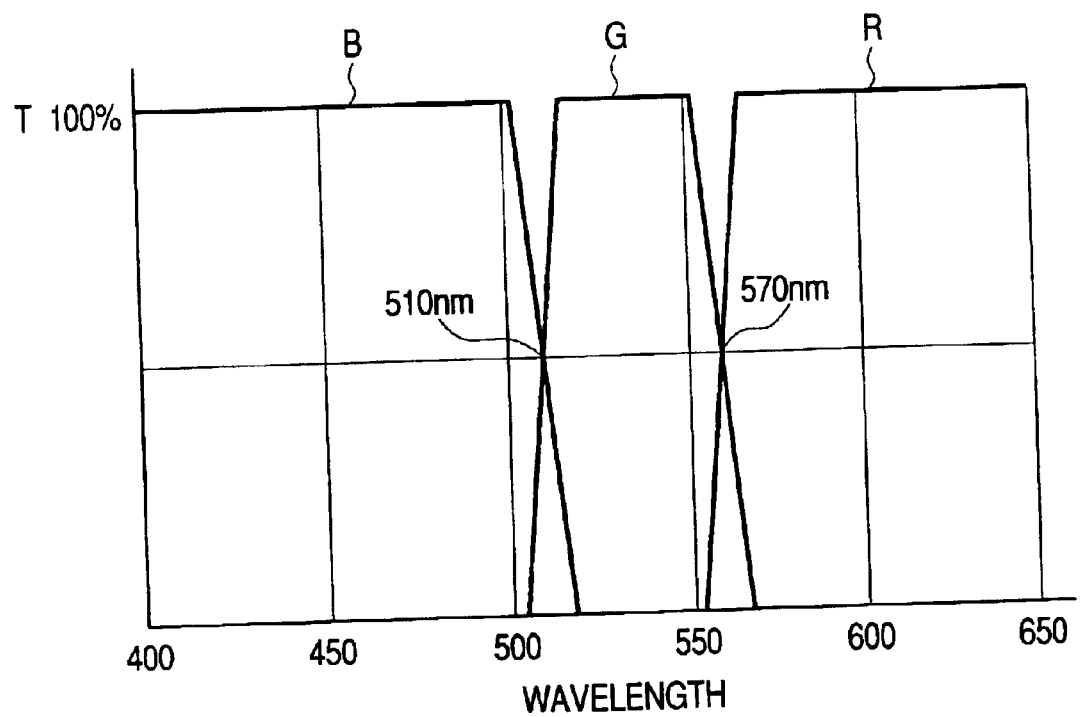
FIG. 13 illustrates the characteristic of a dichroic prism in the fifth embodiment.
Figure 14:
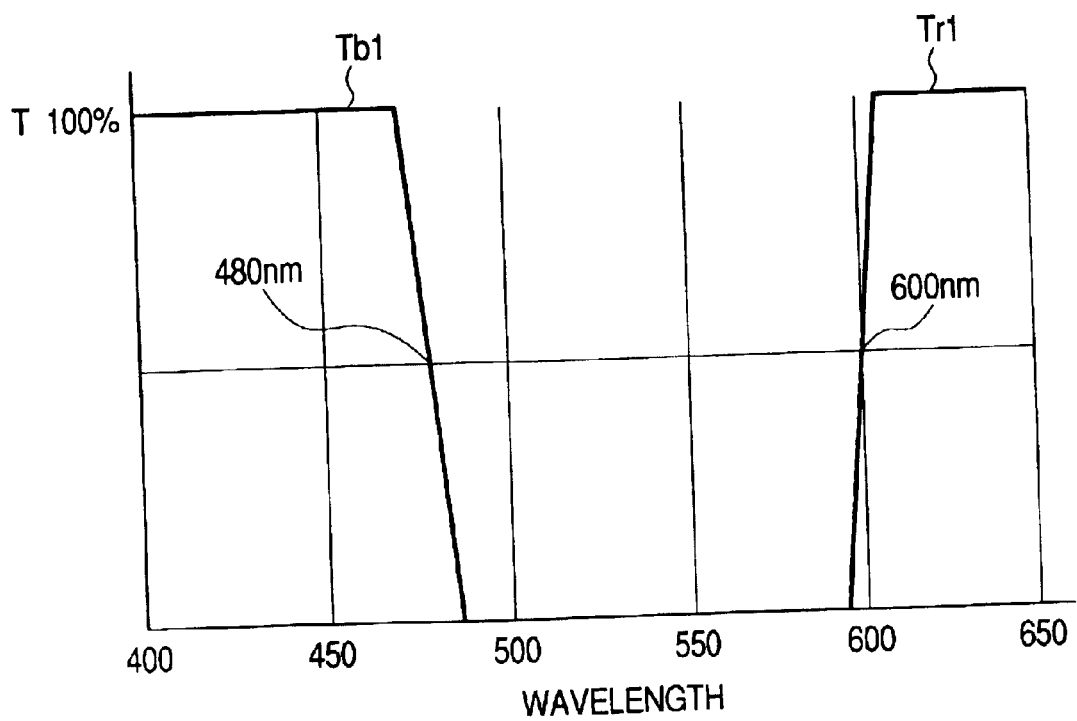
FIG. 14 illustrates the characteristic of a dichroic filter in the fifth embodiment.

FIG. 13 shows the color resolving characteristic in the dichroic prism 7 in the present embodiment, and FIG. 14 shows the characteristics of the dichroic filters Pr1 and Pb1.

In FIG. 13, the cut wavelengths of the dichroic prism 207 are set to $\lambda 1 = 510$ nm, $\lambda 2 = 570$ nm, and this solid line represents the B light, thick solid line represents the G light, and broken line represents the R light.

Also, in FIG. 14, the dichroic filter Pb1 for the B light is an edge filter of which the cut wavelength is 480 nm, and the dichroic filter Pr1 for the R light is an edge filter of which the cut wavelength is 600 nm.

Thereby, lights of the wavelength bands of 480–510 nm and 570–600 nm are eliminated from white light emitted from the light source, and color lights of high color purity and balanced white light are reproduced.

The lights of the wavelength bands cut by the dichroic filters Pr1 and Pb1 are reflected while having their directions of polarization not changed and are absorbed by the polarizing plate Al of the projection optical system.

As described above, in the present embodiment, the color lights illuminating the image display elements 208r, 208g and 208b have their wavelength bands determined by the characteristic of the dichroic film of the dichroic prism 207, but the dichroic filters Pr1 and Pb1 for narrowing the wavelength bands of the color lights are provided between the dichroic prism 207 and the image display elements 208r, 208b, whereby the wavelength band component lights of an area in which the dichroic film characteristic of the dichroic prism 207 changes from a transmission wavelength band to a reflection wavelength band can be eliminated from the color lights and therefore, the purity of the color lights can be enhanced to thereby widen the range of color reproduction.

Also, generally, the wavelength band component lights of an area in which the film characteristic of the color separating and synthesizing optical system changes from the transmission wavelength band to the reflection wavelength band may disturb the polarized state by the difference in phase characteristic between P-polarized light and S-polarized light in the film of the color separating and synthesizing optical system and reduce the contrast of an image, but this can be improved by providing the dichroic filters Pr1 and Pb1 as in the present embodiment.

Also, in the present embodiment, between the illuminating optical system and the dichroic prism 7, there is provided the optical path prism 206 for reflecting the illuminating light from the illuminating optical system at a reflectance approximate to about 100% and directing it to the dichroic prism 207 and transmitting therethrough the image light emerging from the dichroic prism 207 to the eccentric projection lens 210 side so that the optical path of the illuminating light and the optical path of the image light in the optical path prism 206 and the dichroic prism 207 may differ from each other and therefore, it is possible to separate the optical path of the illuminating light and the optical path of the image light from each other without providing a polarizing beam splitter as in the prior art. Moreover, by the optical path prism 206, the illuminating light from the illuminating optical system can be reflected at a reflectance approximate to about 100% and directed to the dichroic prism 207, and the image lights from the image display elements 208r, 208g and 208b can be transmitted therethrough toward the eccentric projection lens 210.

Accordingly, as compared with the conventional projection type image display apparatus, the utilization of light can be enhanced and a bright displayed image can be obtained.

Also, in the present embodiment, by making the eccentric projection lens 210 into an eccentric optical system having at least one rotation-asymmetrical surface or a plurality of optical elements differing in rotation symmetry axis from one another, it is possible to correct eccentric aberration such as Keystone distortion caused by the reference axis of the projection optical system being inclined.

Also, in the present embodiment, the optical path prism 206 is formed into a wedge shape, but between this optical path prism 206 and the eccentric projection lens 210, there is disposed the auxiliary prism 209 for refracting and transmitting therethrough the image light emerging from the optical path prism 206, with an air space provided relative to the optical path prism 206, and therefore any aberration caused by the wedge shape can be alleviated.

The dichroic filter Tg1 may be located between the prism 207 and the image display element 208. Needless to say, in the present embodiment, the dichroic filter can be removed.

(Sixth Embodiment)

Figure 15:
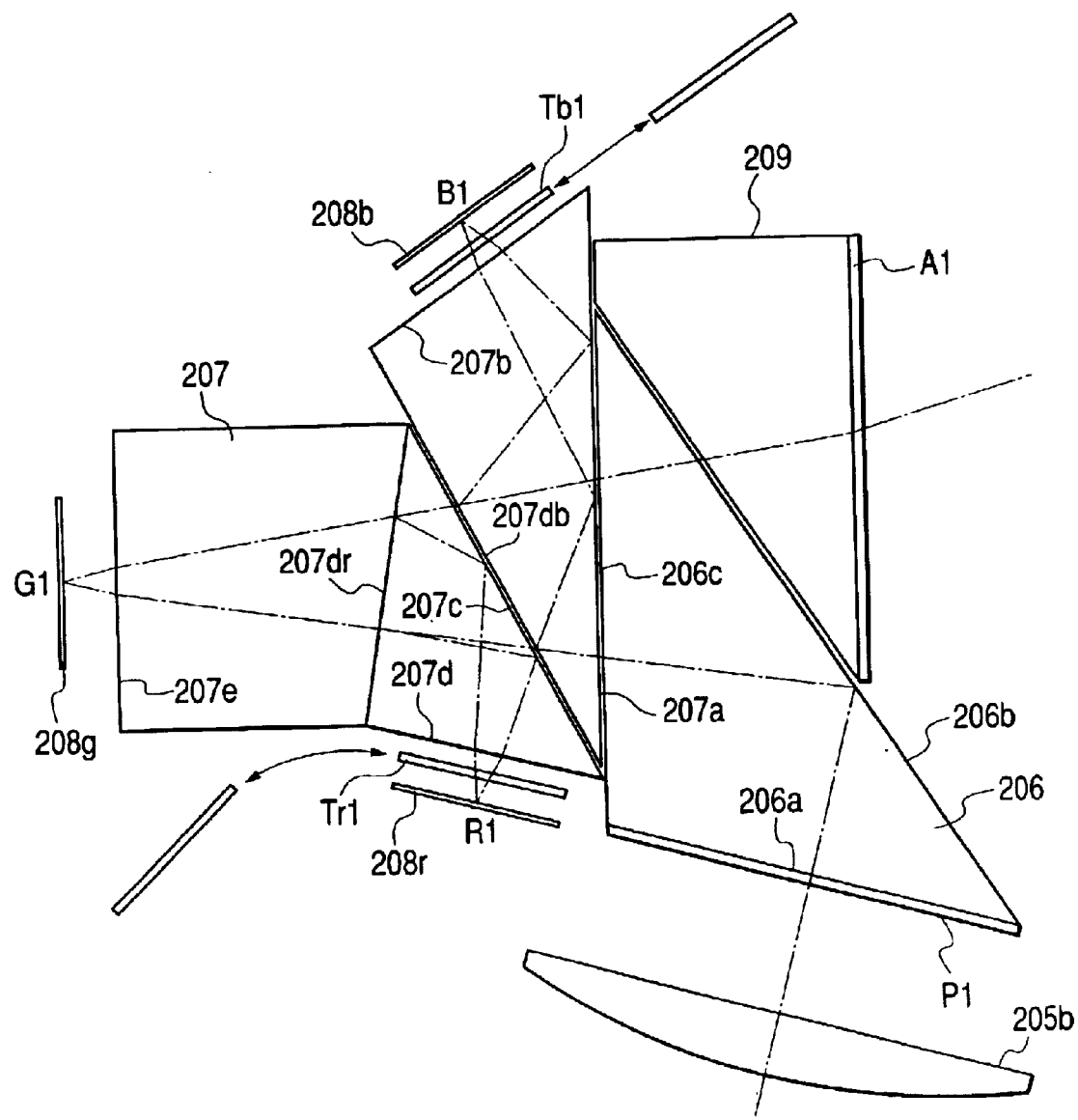
FIG. 15 shows the construction of a projection type image display apparatus which is a sixth embodiment of the present invention.

FIG. 15 shows the construction of a projection type image display apparatus which is a sixth embodiment of the present invention. In this embodiment, constituents common to those in the fifth embodiment are given the same reference characters as those in the fifth embodiment and need not be described.

The present embodiment differs from the fifth embodiment in that the dichroic filters Pr1 and Pb1 provided between the dichroic prism 207 and the image display elements 208r, 208b are insertable and retractable into and from the optical path.

When the dichroic filters Pr1 and Pb1 are inserted in the optical path, the color component of the projected light is such as shown in FIG. 14 of the fifth embodiment, but when the dichroic filters Pr1 and Pb1 are retracted from the optical path, the color component of the projected light is such as shown in FIG. 13.

In this case, the color purity of the R and B lights lowers, but the components of the projected light increase and therefore, the quantity of light increases. Thus, a state in which the color purity is high and a state in which the brightness is high become usable while being changed over.

(Seventh Embodiment)

Figure 16:
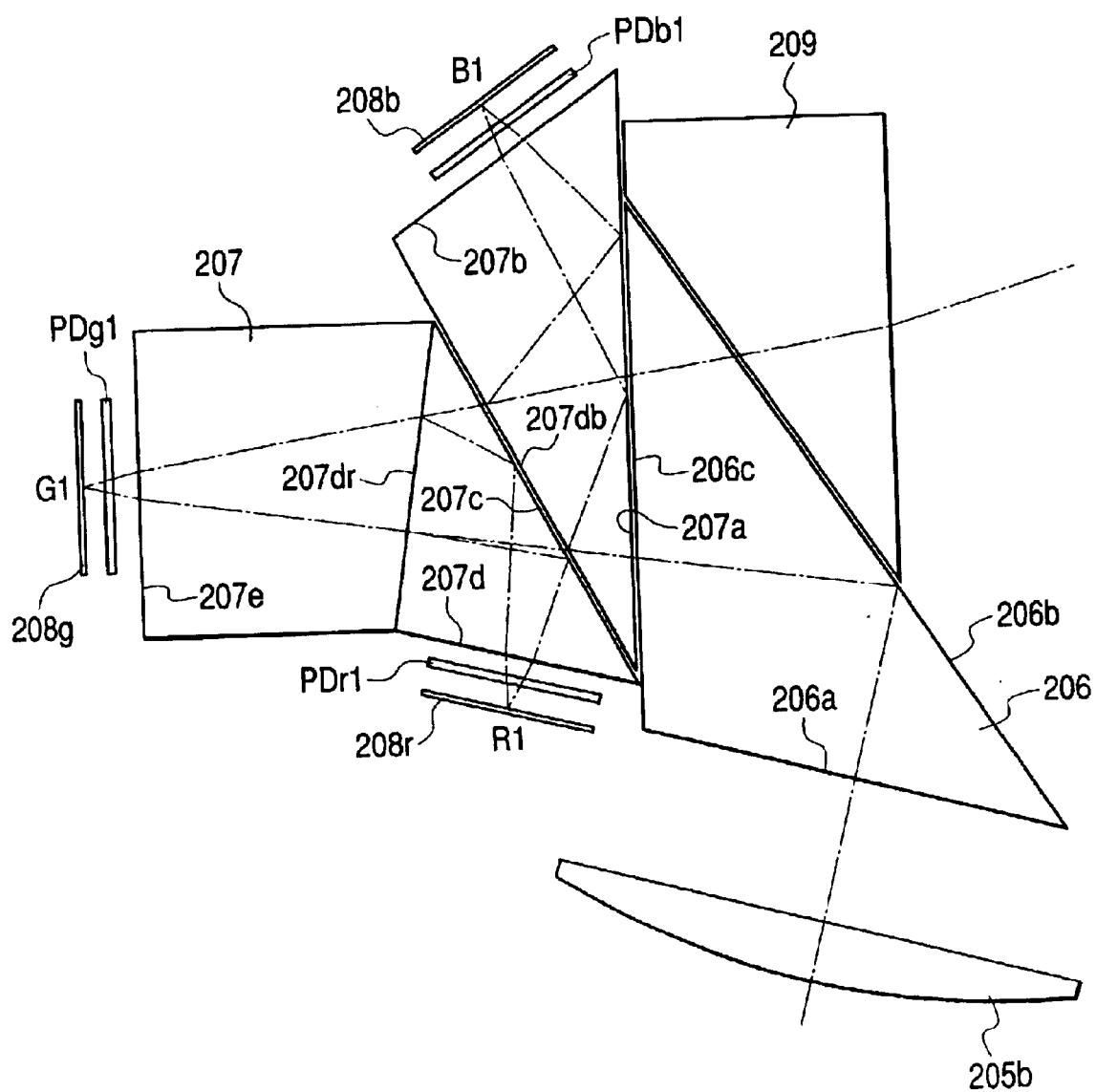
FIG. 16 shows the construction of a projection type image display apparatus which is a seventh embodiment of the present invention.

FIG. 16 shows the construction of a projection type image display apparatus which is a seventh embodiment of the present invention. In this embodiment, constituents common to those in the fifth embodiment are given the same reference characters as those in the fifth embodiment and need not be described.

The present embodiment differs from the fifth embodiment in that dichroic filter units PDr1, PDg1 and PDb1 with polarizing plates are provided between the dichroic prism 207 and the image display elements 208r, 208g, 208b to effect color adjustment.

In the present embodiment, the dichroic filter units PDr1, PDg1 and PDb1 are provided between the polarizing plates and the image display elements in the respective color optical paths and are used in combination with phase plates. Also, the polarizing plates of the dichroic filter units PDr1, PDg1 and PDb1 serve both as polarizes for the illuminating light and analyzers for the projection optical system.

Figure 17:
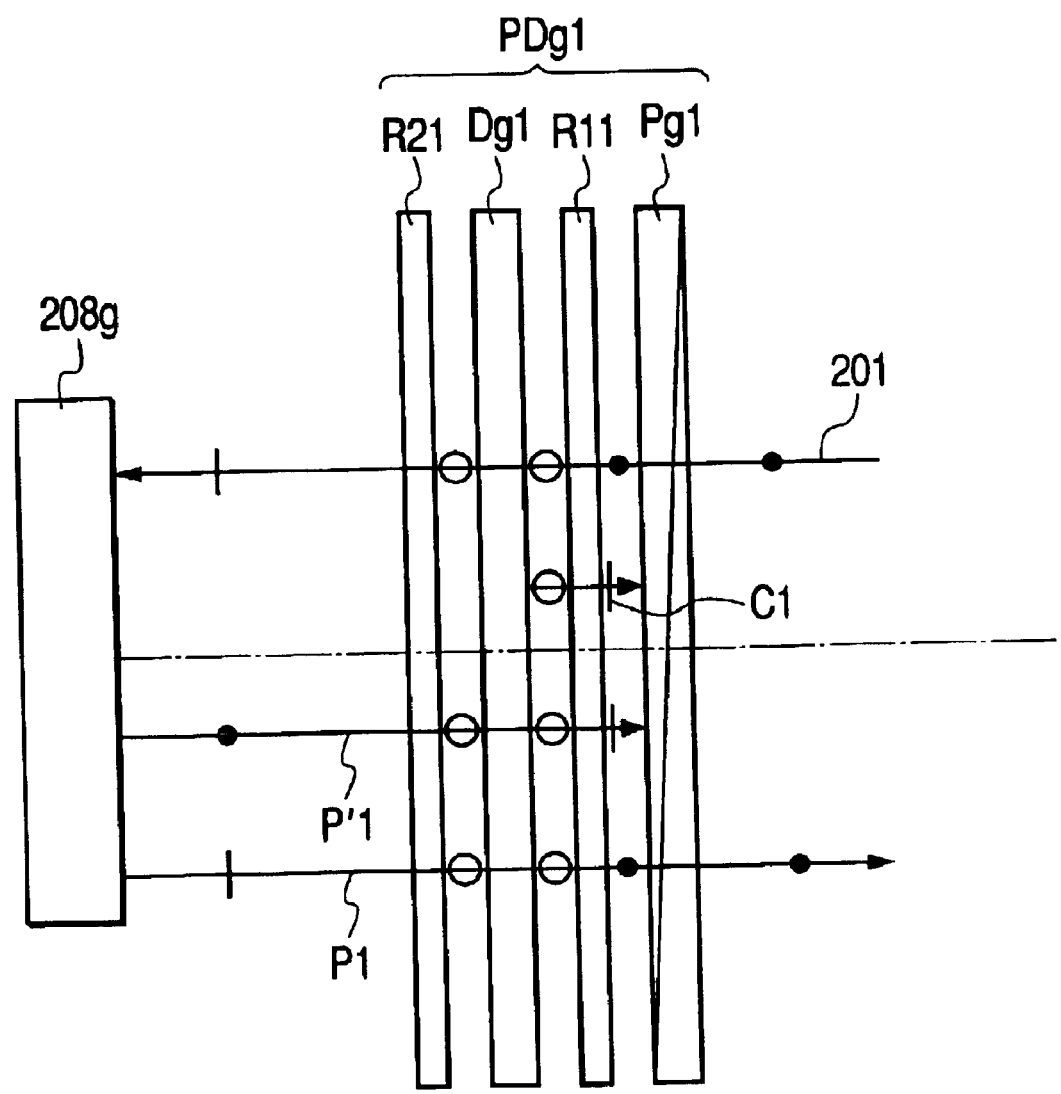
FIG. 17 illustrates the optical action of a dichroic filter unit with a polarizing plate in the seventh embodiment.

FIG. 17 shows the details of the optical path of G. The dichroic filter unit PDg1 with a polarizing plate is constructed by a polarizing plate Pg1, a first ¼ phase plate R11, a dichroic filter Dg1 and a second ¼ phase plate R21 being cemented together.

Thereby, the light incident as the illuminating light (I) is adjusted into linearly polarized light (°) by the polarizing plate Pg1, and thereafter is converted into circularly polarized light (O) by the first phase plate R11, and enters the dichroic filter Dg1.

In the dichroic filter Dg1, light (C) of an unnecessary wavelength component is reflected and a wavelength component to be used is transmitted. The direction of polarization (O) of the light reflected by the dichroic filter Dg1 is converted into a direction of polarization (|) rotated by 90° with respect to the transmission axis of the polarizing plate Pg1 by the first ¼ phase plate R1, and this reflected light is absorbed by the polarizing plate Pg1.

Also, the light transmitted through the dichroic filter Dg1 is converted into linearly polarized light (|) by the second ¼ phase plate R21 and enters the image display element 208g.

Light (P1) reflected by the image display element 208g and having had its direction of polarization not changed is again converted into circularly polarized light (O) by the second ¼ phase plate R21 and is transmitted through the dichroic filter Dg1, and thereafter is transmitted through the first ¼ phase plate R11 and is converted into linearly polarized light of the same direction of polarization (°) as that of the illuminating light (I), and is transmitted through the polarizing plate Pg1.

Light (P'1) having had its direction of polarization rotated by 90° by the image display element 208g has its direction of polarization rotated (°) by 90° and therefore, is transmitted through the second phase plate R21, the dichroic filter Dg1 and the first phase plate R11, and thereafter is converted into a direction of polarization (|) orthogonal to the illuminating light (I), and is absorbed by the polarizing plate Pg1.

In the optical paths of R and B as well, there are provided dichroic filter units PDr1 and PDb1 with polarizing plates similar in construction to the dichroic filter unit for G.

Figure 18:
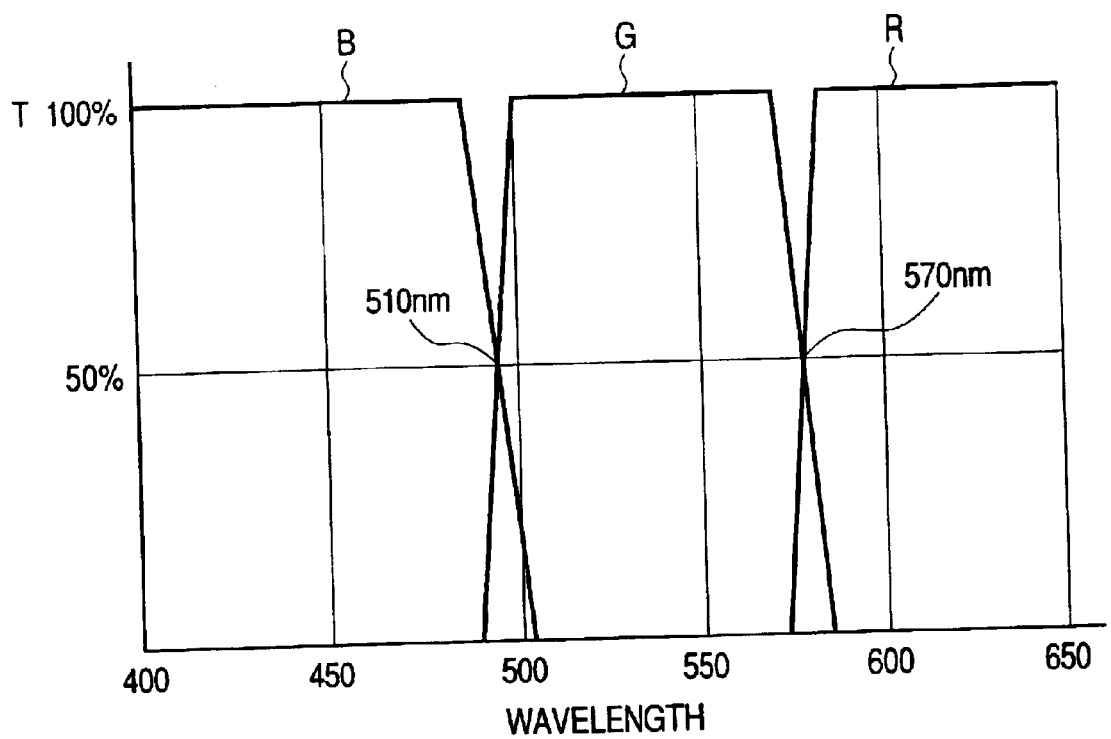
FIG. 18 illustrates the characteristic of a dichroic prism in the seventh embodiment.
Figure 19:
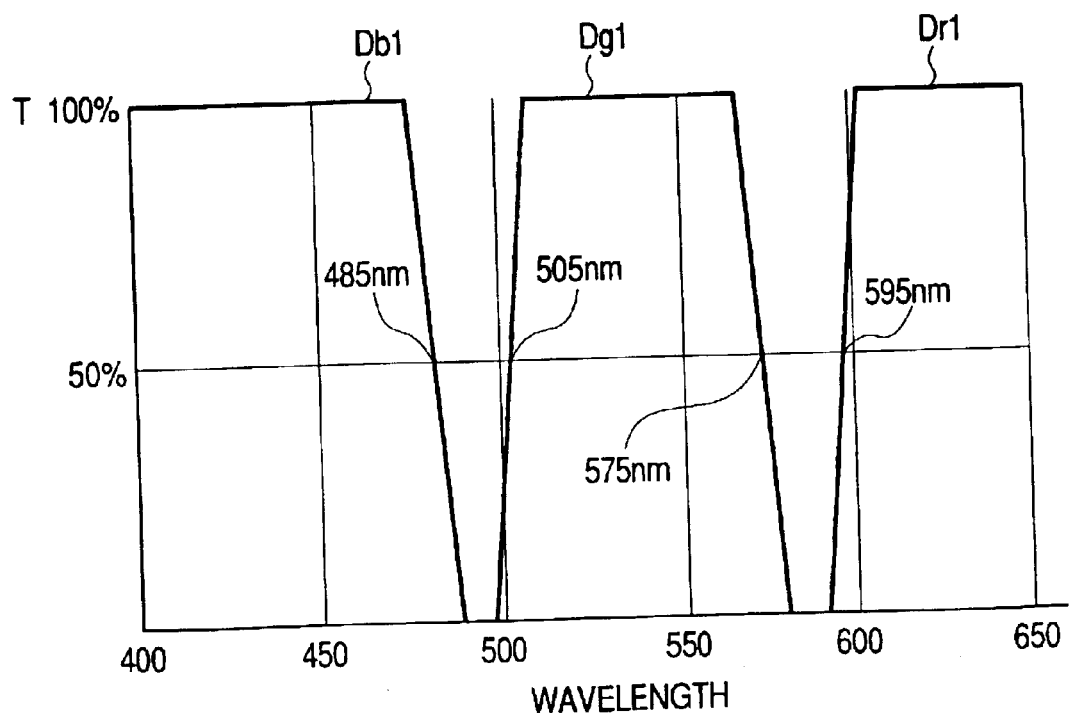
FIG. 19 illustrates the characteristic of a dichroic filter in the seventh embodiment.

The color resolving or separating characteristic of the dichroic prism 207 in the present embodiment is shown in FIG. 18, and the spectral characteristics of the dichroic filters Dg1, Db1 and Dr1 are shown in FIG. 19.

In FIG. 18, the cut wavelengths of the dichroic prism 7 are set to $\lambda 1=495$ nm, $\lambda 2=580$ nm, and the way of viewing this figure is the same as that for FIG. 13.

Also, in FIG. 19, the dichroic filters in the G optical path, are band-pass filters Dg1 of which the cut wavelengths are 505 nm and 575 nm, and in the B optical path, are edge filters Db1 of which the cut wavelength is 485 nm, and in the R optical path, are edge filters Dr1 of which the cut wavelength is 595 nm.

Thus, lights of the wavelength areas of 485–505 nm and 575–595 nm are eliminated from the white light emitted from the light source, and color lights of high color purity and balanced white light are reproduced.

(Eighth Embodiment)

Figure 20:
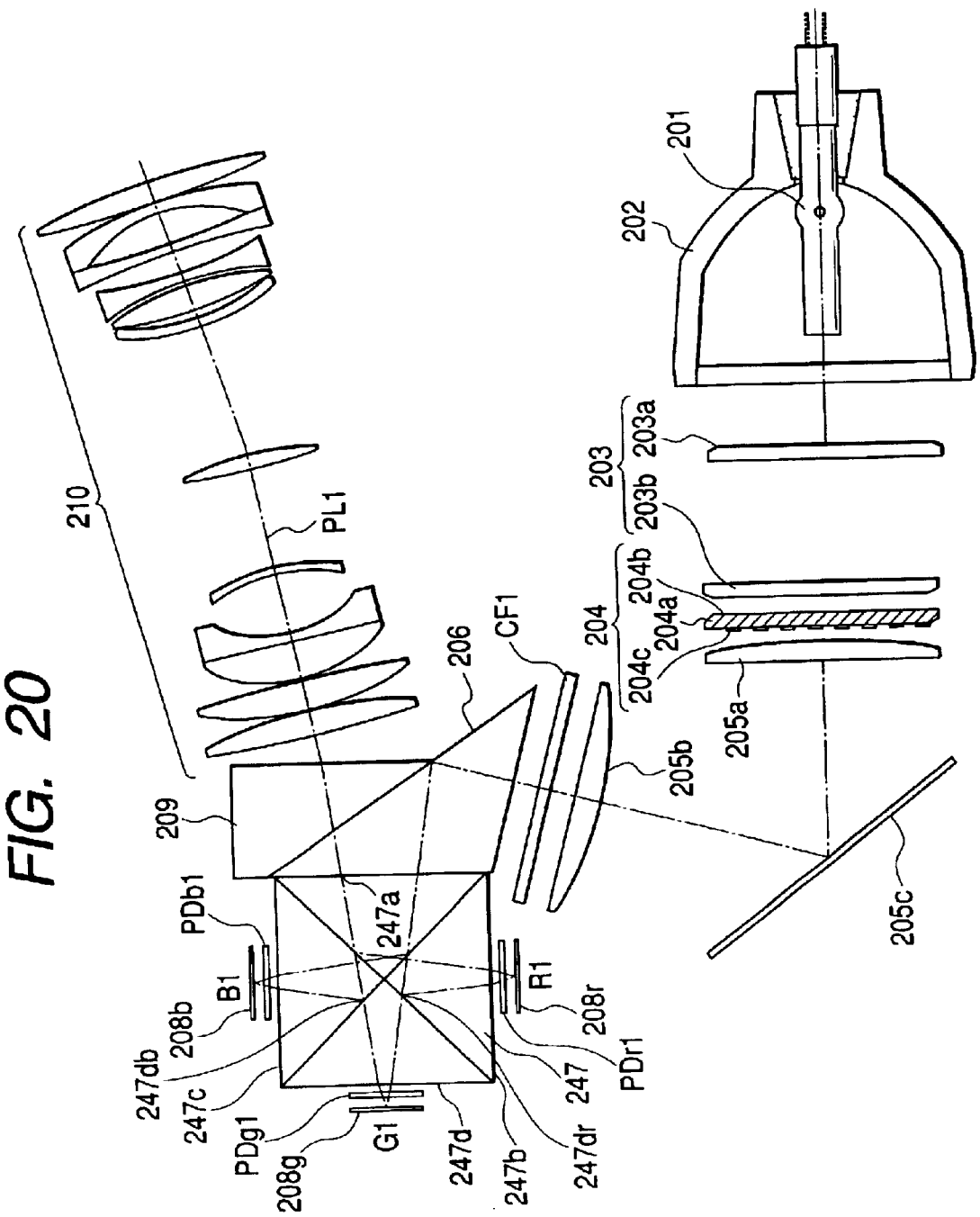
FIG. 20 shows the construction of a projection type image display apparatus which is an eighth embodiment of the present invention.

FIG. 20 shows the construction of a projection type image display apparatus which is an eighth embodiment of the present invention. In this embodiment, constituents common to those in the fifth embodiment are given the same reference characters as those in the fifth embodiment and need not be described.

The present embodiment differs from the fifth embodiment in that a color phase filter CF1 for changing the direction of polarization of light of a particular wavelength band by 90° is provided in the illuminating optical system and further, use is made of a dichroic prism 247 of a construction which comprises four triangular prisms and in which dichroic surfaces cross in X-shape.

The action of the dichroic prism 247 will be described here. In FIG. 20, of light incident from a first surface 247a, light reflected by a first dichroic surface 247db is transmitted through a second surface 247c, is transmitted through a dichroic filter unit PDb1 with a polarizing plate and further, arrives at the image display element 208b for the B light.

Light reflected by a second dichroic surface 247dr is transmitted through a third surface 247b and is transmitted through the dichroic filter unit PDr1 with a polarizing plate, and thereafter arrives at the image display element 208r for the R light.

Light transmitted through both of the first dichroic surface 247db and the second dichroic surface 247dr is transmitted through a fourth surface 247d and is transmitted through the dichroic filter unit PDg1 with a polarizing plate, and thereafter arrives at the image display element 208g for the G light.

The color phase filter CF1 has its direction of polarization rotated by 90° in a particular wavelength band (e.g. the band of G) when light uniformized in a certain direction of polarization enters it. This is shown in FIGS. 21A and 21B.

Figure 21A:
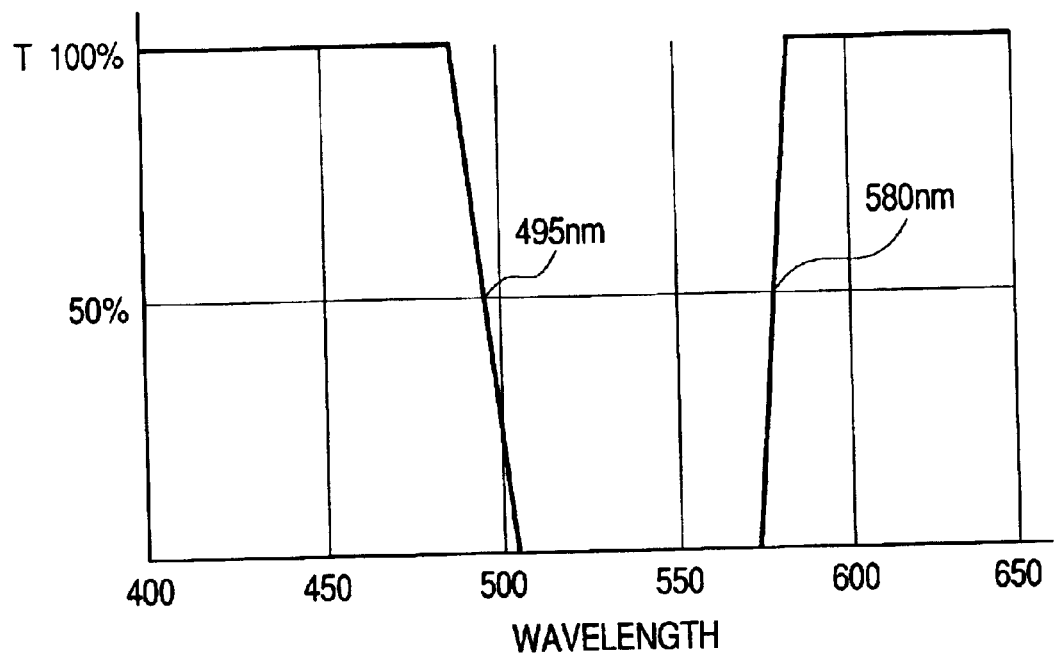
FIGS. 21A and 21B are characteristic graphs of a color phase filter in the eighth embodiment.
Figure 21B:
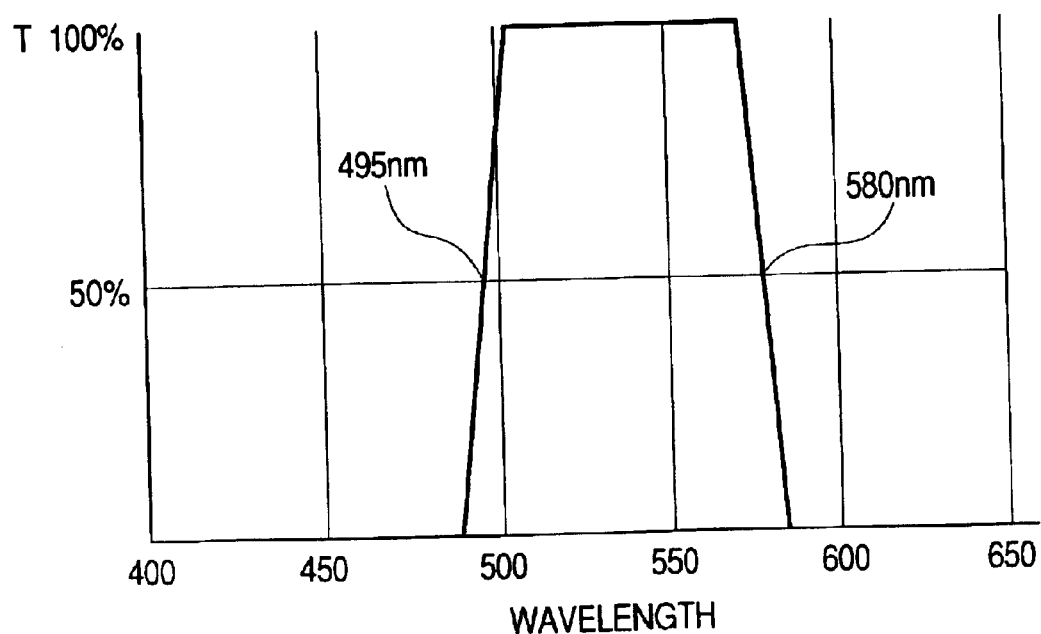

FIG. 21A shows the intensity of a polarized component parallel to the direction of polarization of the incident light, and FIG. 21B shows the intensity of a polarized component perpendicular to the direction of polarization of the incident light.

Figure 22:
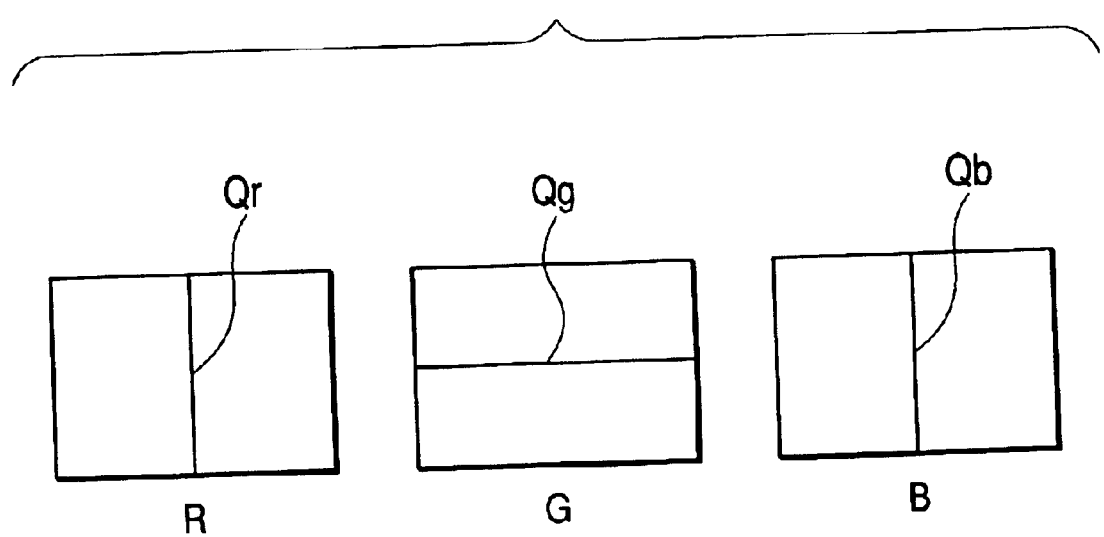
FIG. 22 illustrates the direction of transmission of a polarizing plate in the eighth embodiment.

The light of such a characteristic as shown in FIGS. 21A and 21B emerges from the color phase filter CF1 and therefore, in the present embodiment, the direction of polarization of G transmitted through the dichroic prism 207 and the directions of polarization of R and G differ by 90° from each other. Therefore, as shown in FIG. 22, the transmission axis Qg1 of the polarizing plate Pg1 in the dichroic filter unit PDg1 with a polarizing plate provided in the optical path of G and the transmission axes Qr1 and Qb1 of the polarizing plates Pr1 and Pb1 in the dichroic filter units PDr1 and PDb1 with polarizing plates provided in the optical paths of R and B differ in direction by 90° from each other.

Also, a phase plate or phase plates may be provided in the optical path or paths of G or R and B so as to change the direction of polarization to a predetermined direction.

As shown here, design is made such that the directions of polarization of the G light and the R and B light differ by 90° from each other and the light much transmitted through dichroic film constituting the dichroic prism 207 is transmitted through the dichroic film as P-polarized light, whereby the efficiency in the dichroic film can be made higher.

Also, as a construction differing from that of this embodiment, the color phase filter CF1 may be provided between the optical path prism 206 and the dichroic prism 207 so that in the optical path prism 206, the respective color lights are transmitted and reflected in the same direction of polarization and in the dichroic prism 207, a P-polarized component and an S-polarized component may be properly used depending on the color light.

In the construction using the color phase filter CF1 as described above, any construction having color separating action such as not only the dichroic prism comprising the cross prism as shown in the present embodiment, but also the dichroic prism comprising the 3P prism as shown in the fifth embodiment has the effect shown here.

(Ninth Embodiment)

Figure 23:
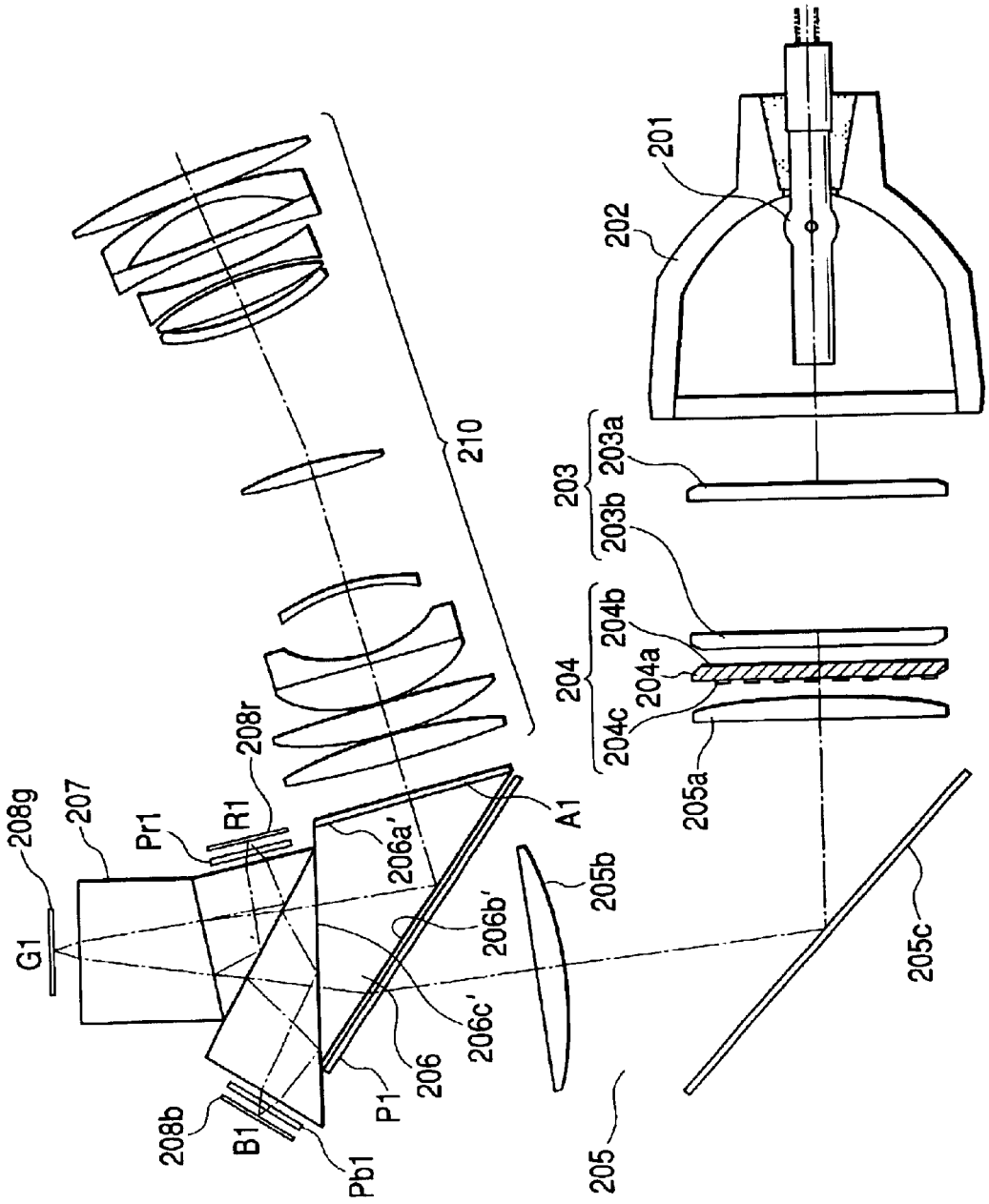
FIG. 23 shows the construction of a projection type image display apparatus which is a ninth embodiment of the present invention.

FIG. 23 shows the construction of a projection type image display apparatus which is a ninth embodiment of the present invention.

This embodiment is the same as the fifth embodiment with the exception that the manner in which the light passes through the optical path prism 206 differs from that in each of the above-described embodiments and therefore, in this embodiment, constituents common to those in the fifth embodiment are given the same reference characters as those in the fifth embodiment and need not be described.

In the present embodiment, the illuminating light passed through the lens 205b is first transmitted through the polarizer P1 and is incident on a first surface 206b' of the optical path prism 206, is transmitted through a second surface 206c' thereof, and arrives at the dichroic prism 207.

In the dichroic prism 207, as in the fifth embodiment, the illuminating light is separated into R, G and B color lights, and the R and B lights are transmitted through the dichroic filters Pr1 and Pb1, and the G light intactly enters the image display elements 208r, 208g and 208b for the respective colors, and is modulated, whereafter the R and B lights transmitted through the dichroic filters Pr1 and Pb1 and the G light are synthesized and again enters from the second surface 206c' of the optical path prism 206.

The image light having entered the optical path prism 206 is totally reflected by the first surface 206b', and emerges from a third surface 206a' and is transmitted through the analyzer Al, and thereafter is projected by the eccentric projection lens 210.

In the present embodiment, between the illuminating optical system and the dichroic prism 207, there is provided the optical path prism 206 for transmitting therethrough the illuminating light from the illuminating optical system to the dichroic prism 207, and reflecting the image light from the dichroic prism 207 at a reflectance approximate to about 100% and transmitting it therethrough toward the eccentric projection lens 210 so that the optical path of the illuminating light and the optical path of the image light in the optical path prism 206 and the dichroic prism 207 may differ from each other and therefore, it is possible to separate the optical path of the illuminating light and the optical path of the image light form each other without providing a polarizing beam splitter as in the prior art. Moreover, the image light from the dichroic prism 207 can be reflected at a reflectance approximate to about 100% by the optical path prism 206 and directed to the eccentric projection lens 210.

Accordingly, as compared with the conventional projection type image display apparatus, the utilization efficiency of light can be enhanced and a bright displayed image can be obtained.

In the present embodiment, an auxiliary optical element for refracting and transmitting therethrough the illuminating light from the illuminating optical system may be disposed between the optical path prism 206 and the illuminating optical system with an air space provided relative to the optical path prism 206.

Also, in the present invention, the disposition of the image display element for each color light is not limited to the disposition described in each of the above-described embodiment, but may be set arbitrarily.

As described above, according to the present embodiment, in a projection type image display apparatus in which the wavelength band of color light illuminating each image display element is determined by the characteristic of such film as the dichroic film of a color separating and synthesizing optical system, color adjusting means such as a dichroic filter for narrowing the wavelength band of the color light is provided between the color separating and synthesizing optical system and the image display element and therefore, the wavelength band component light of an area in which the film characteristic of the color separating and synthesizing optical system changes from a transmission wavelength band to a reflection wavelength band can be eliminated from the color light to thereby enhance the purity of the color light and widen the range of color reproduction.

Also, generally, the wavelength band component light of the area in which the film characteristic of the color separating and synthesizing optical system changes from the transmission wavelength band to the reflection wavelength band may disturb the polarized state by the difference in phase characteristic between P-polarized light and S-polarized light in the film of the color separating and synthesizing optical system and reduce the contrast of an image, but this can be improved by providing the color adjusting means as in the present invention.

Also, it becomes possible to separate the optical path of the illuminating light and the optical path of the image light from each other without providing a polarizing beam splitter as in the prior art. Moreover, by the light directing element, the illuminating light from the illuminating optical system or the image light from the color separating and synthesizing optical system is reflected at a reflectance approximate to about 100% and directed to the color separating and synthesizing optical system or the projection optical system and therefore, as compared with the conventional projection type image display apparatus, the utilization efficiency of light can be enhanced and a bright and highly definite displayed image can be obtained.

Further, if a reference axis in the color separating and synthesizing optical system (or the illuminating optical system) and a reference axis in the projection optical system are set so as to be inclined with respect to normals to the display surfaces of the image display elements, the projection optical system can be downsized.

By making the projection optical system into an eccentric optical system having at least one rotation-asymmetrical surface or a plurality of optical elements differing in rotation symmetry axis from one another, it is possible to correct eccentric aberration such as Keystone distortion caused by the projection optical system being inclined.

Also, when the light directing element is formed into a wedge shape, an auxiliary optical element for refracting and transmitting therethrough the image light emerging from the light direction element is disposed between the light directing element and the projection optical system with an air space relative to the light directing element, or an auxiliary optical element for refracting and transmitting therethrough the illuminating light from the illuminating optical system is disposed between the light directing element and the illuminating optical system with an air space provided relative to the light directing element, whereby any aberration caused by the wedge shape can be alleviated.

(Tenth Embodiment)

Figure 24:
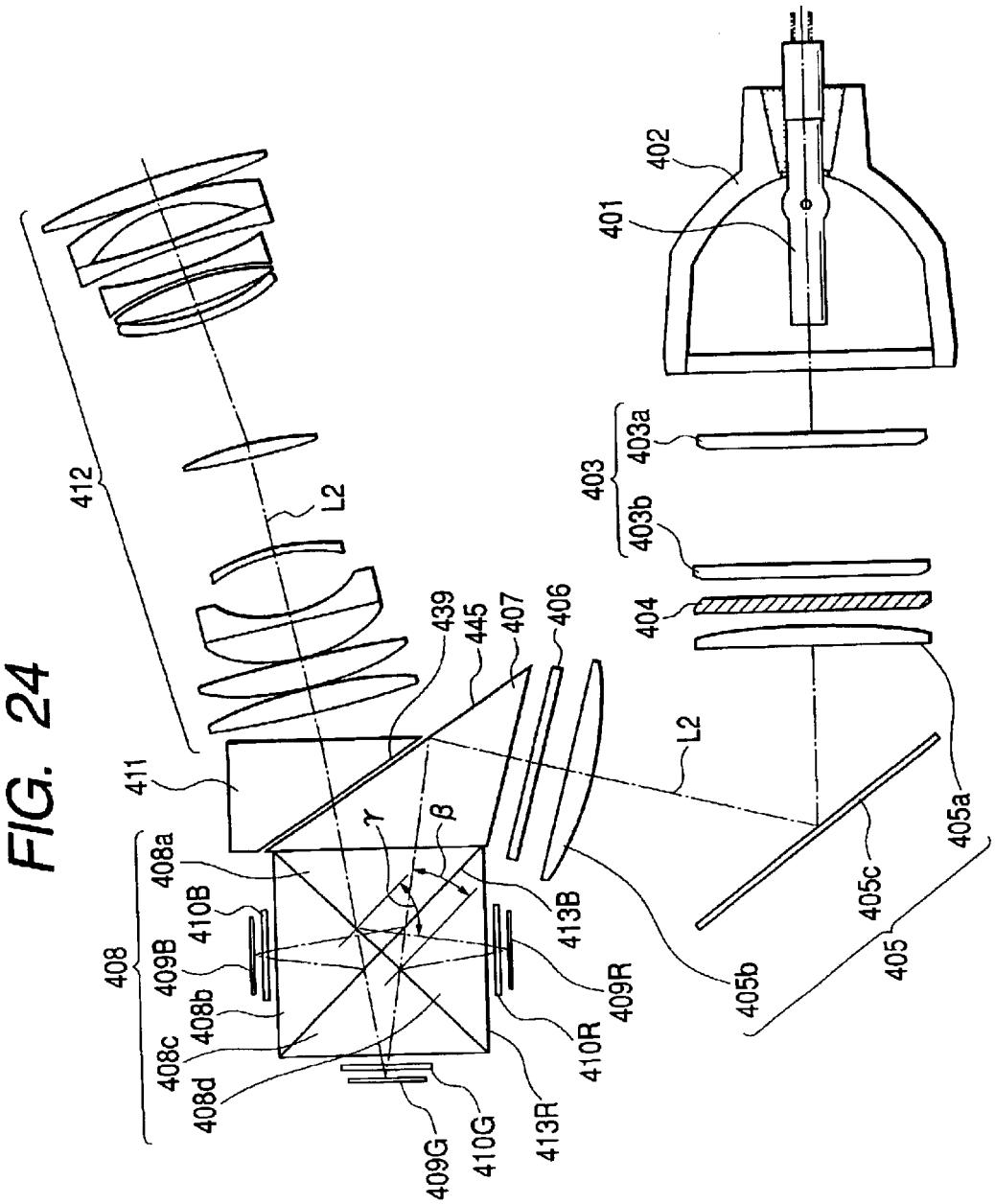
FIG. 24 shows the construction of a projection type image display apparatus which is a tenth embodiment of the present invention.

FIG. 24 shows the basic construction of a projection type image display apparatus which is a tenth embodiment of the present invention. In FIG. 24, the reference numeral 401 designates a light source, and the reference numeral 402 denotes a reflecting mirror such as a parabolic-surfaced mirror for reflecting light from the light source. The reference numeral 403 designates a fly-eye integrator including a first fly-eye element 403a having a plurality of two-dimensionally arranged lens arrays, and a second fly-eye element 403b similar thereto. The reference numeral 404 denotes a polarizing conversion element for making the non-polarized light from the light source 401 uniform in a predetermined direction of polarization, the reference numeral 405 designates an illuminating light superimposing system including a first lens 405a, a second lens 405b and a reflecting mirror 405c, and the reference numeral 406 denotes a laminated phase element as a wavelength selective polarizing control mechanism.

The reference numeral 407 designates a light directing prism for directing the illuminating light from an illuminating optical system constructed as described above, and the reference numeral 408 denotes a cross dichroic prism as a color separating and synthesizing optical system comprising four prisms 408a, 408b, 408c and 408d combined and cemented together in a cross shape. The reference characters 409R, 409G and 409B designate reflection type liquid crystal elements (reflection type image display elements) for receiving, modulating and reflecting red, green and blue lights, and the reference characters 410R, 410G and 410B denote polarizing elements disposed corresponding to the reflection type liquid crystal elements 409R, 409G and 409B for red, green and blue for transmitting therethrough only polarized components in a particular direction.

The reference numeral 411 designates a correcting prism disposed with a slight gap 439 provided relative to the light directing prism 407, and the reference numeral 412 denotes a projection lens as a projection optical system.

In the fly-eye integrator 403, substantially parallel light from the reflecting mirror 402 is divided and converged into a plurality of beams by the first fly-eye element 403a, and a plurality of light source images are formed near the second fly-eye element 403b. The beams from the respective light source images are superimposed on the respective reflection type liquid crystal elements 409R, 409G and 409B by the first lens 405a and the second lens 405b through the reflecting mirror 405c, and illumination of high uniformity is done.

Figure 25:
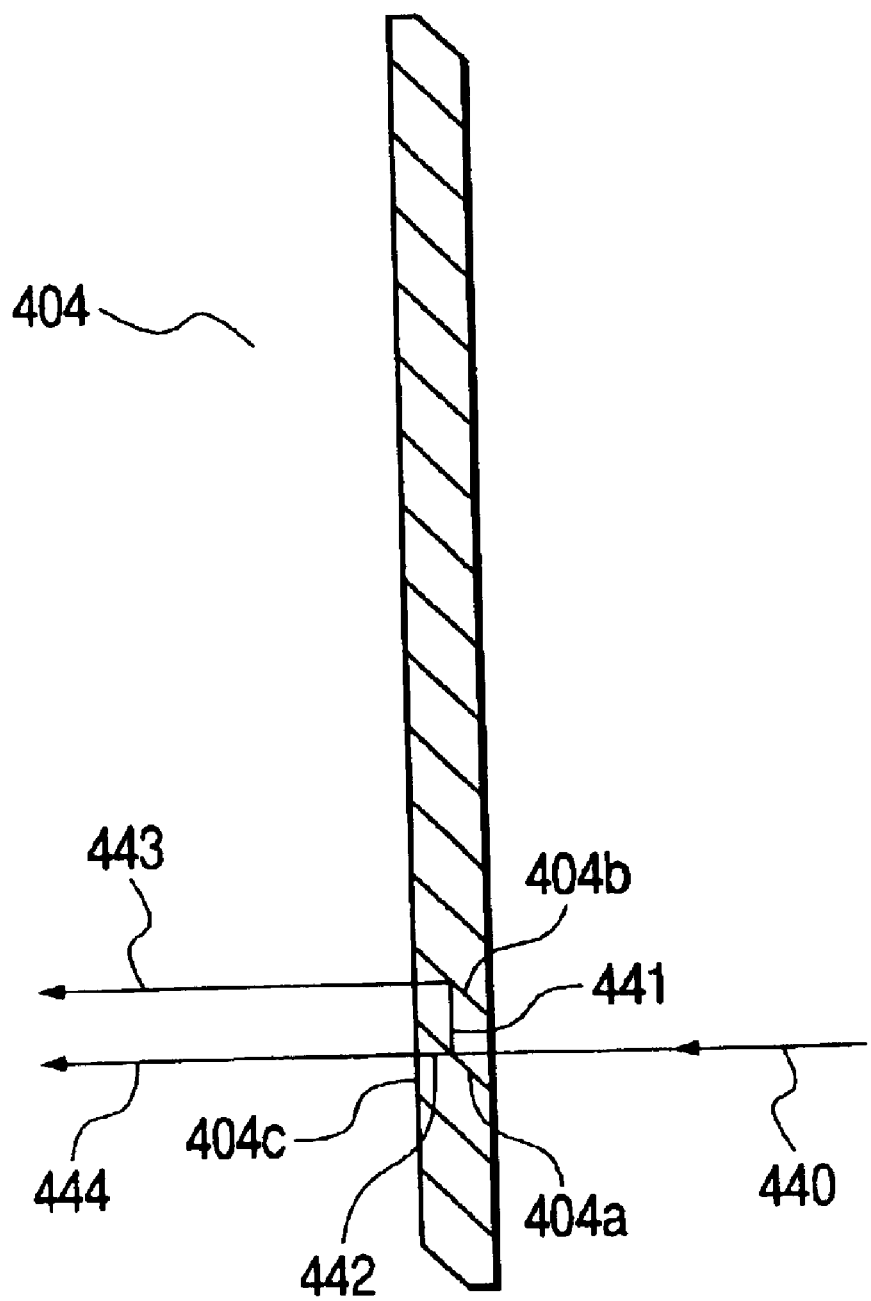
FIG. 25 shows the construction and optical action of a polarizing conversion element used in the tenth embodiment.

FIG. 25 shows on an enlarged scale the polarizing conversion element 404 shown in FIG. 24. This polarizing conversion element 404 is constructed by a plurality of prism members each having a length in a direction orthogonal to the plane of the drawing sheet of FIG. 25 and having a parallelogram tic cross section being joined together.

In FIG. 25, the reference character 404a designates a polarization separating surface for reflecting S-polarized light 441 which is a polarized component in a direction perpendicular to the plane of the drawing sheet of FIG. 25 included in non-polarized light 440 from the fly-eye integrator 403, and transmitting therethrough P-polarized light 442 which is a polarized component parallel to the plane of the drawing sheet of FIG. 25, and the reference character 404b denotes a reflecting surface for again reflecting S-polarized light 441 reflected by the polarization separating surface 404a to thereby change the direction thereof and make it into the emerging light 443 of the S-polarized light. Also, the reference character 404c designates a phase plate for rotating the direction of polarization of the P-polarized light 442 transmitted through the polarization separating surface 404a by 90° to thereby make this P-polarized light into S-polarized light 444.

404a, 404b and 404c, with these as a unit, are periodically provided on the prism members, and as a whole, have the function of uniformizing the direction of polarization of the incident light into S-polarized light perpendicular to the plane of the drawing sheet of FIG. 25.

Figure 26:
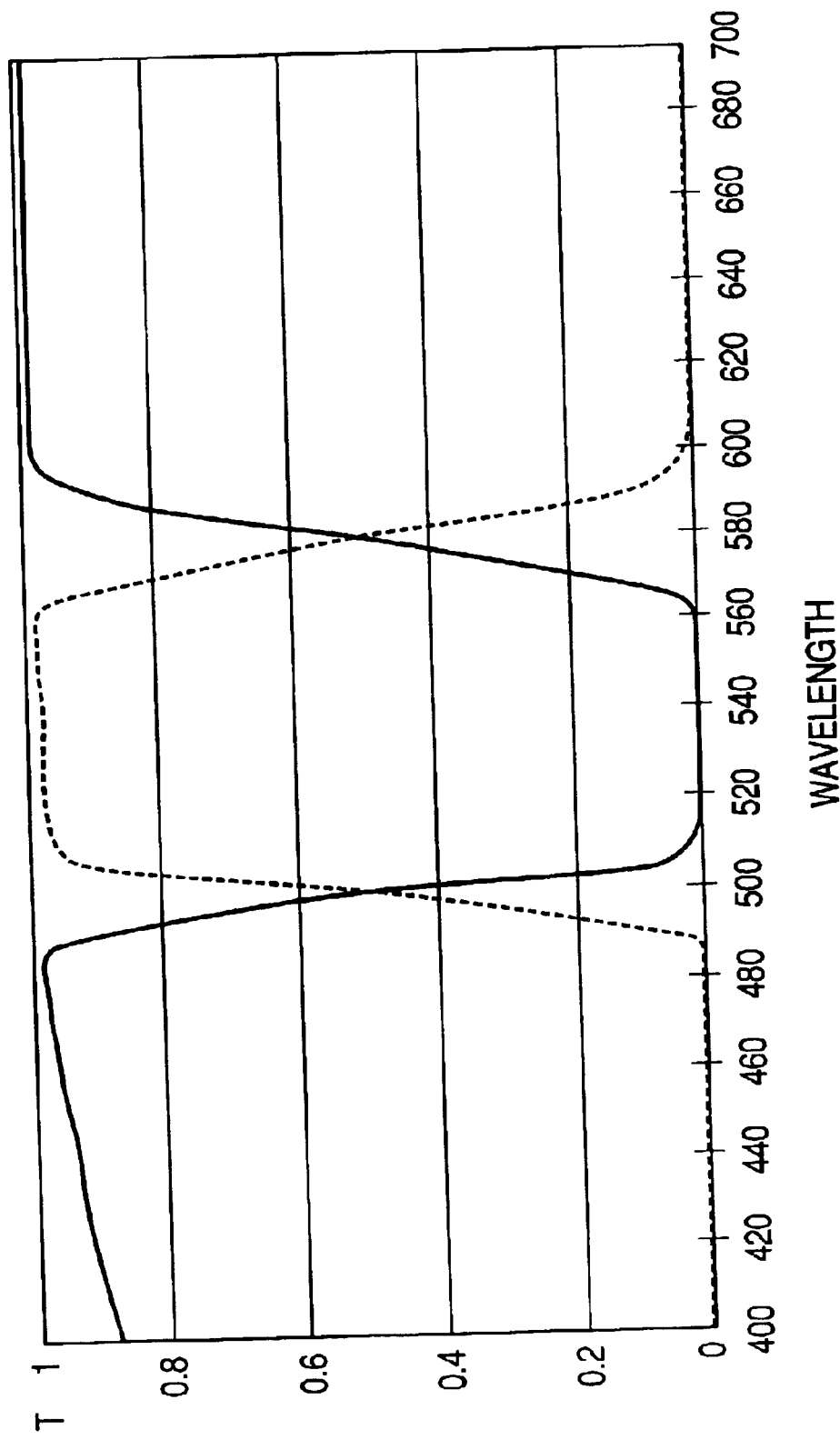
FIG. 26 shows the construction and optical action of a laminated phase element as a wavelength phase element as a wavelength selective polarizing control mechanism used in the tenth embodiment.

FIG. 26 shows the spectral characteristic of the laminated phase element 406 shown in FIG. 24. The axis of ordinates represents transmittance, the axis of abscissas represents wavelength, the solid line indicates the spectral transmittance characteristic for the polarization in a direction perpendicular to the plane of the drawing sheet of FIG. 24 (S-polarization for the polarization separating surface 404a of the polarizing conversion element 404 of FIG. 24), and the broken line indicates the spectral transmittance characteristic for the polarization in a direction parallel to the plane of the drawing sheet of FIG. 24 (P-polarization for the polarization separating surface 404a of the polarizing conversion element 404).

That is, the laminated phase element 406 has the characteristic of not changing the red and blue lights of the incident polarized light, and rotating only the direction of polarization of the green light by 90° and transmitting this light therethrough.

The element of such a characteristic can be obtained by laminating a plurality of phase plates obtained by drawings resin such as polycarbonate while changing the lag axes thereof.

Figure 35A:
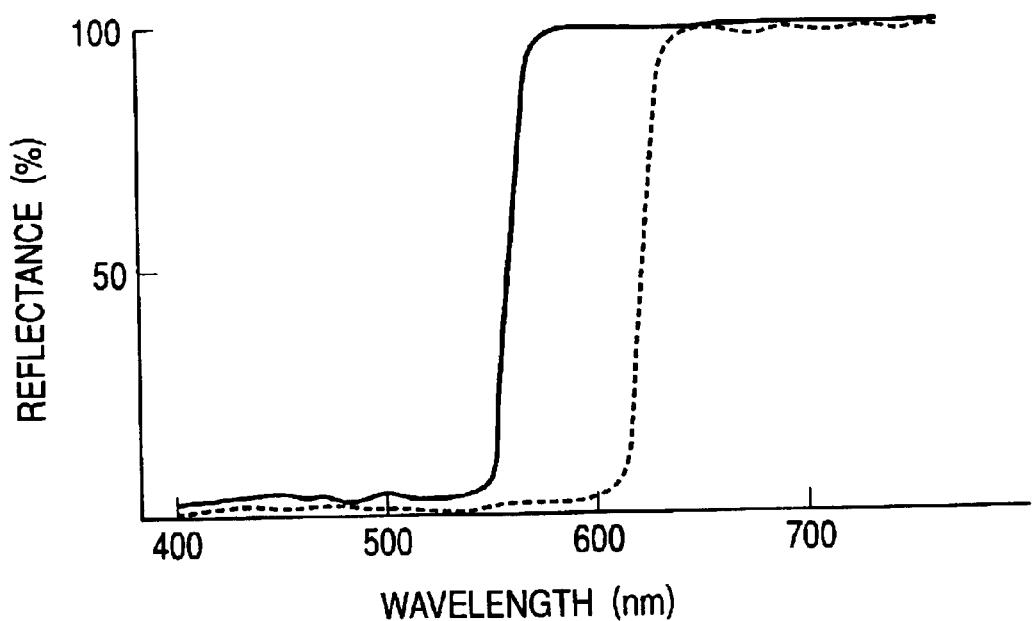
FIGS. 35A and 35B are graphs showing the reflectance characteristics of dichroic surfaces.
Figure 35B:
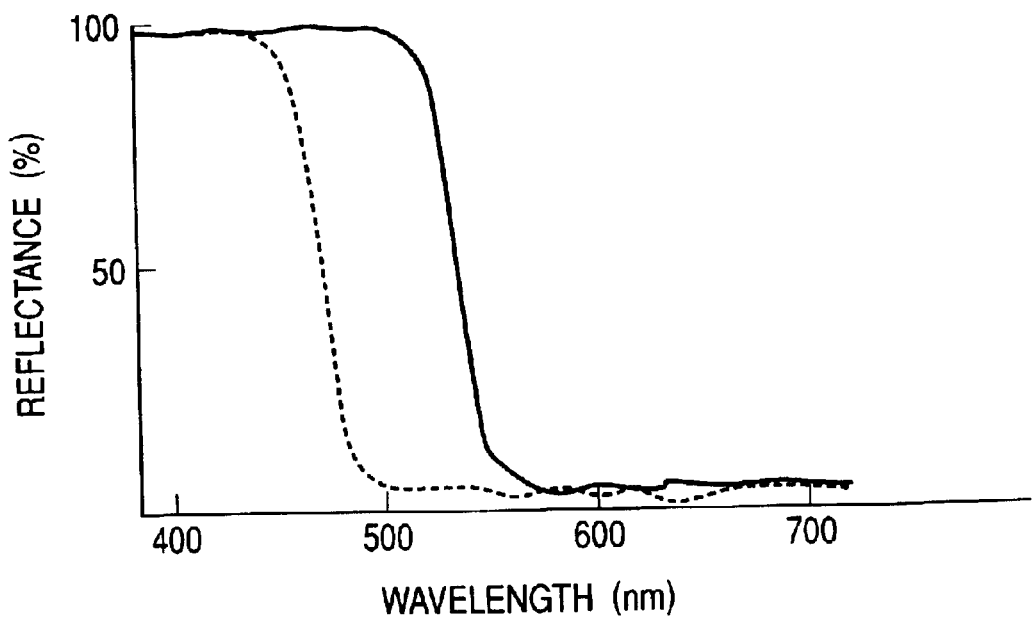

Dichroic films are formed in X-shape by vapor deposition on the joined surfaces of the four prisms constituting the cross dichroic prism 408, and these dichroic films function as a red reflecting dichroic surface 413BR and a blue reflecting dichroic surface 413B having characteristics as shown in FIGS. 35A and 35B.

These dichroic surfaces are disposed so as to intersect with each other, and reflect red and blue lights included in the incident light, and transmit green light therethrough, thus separating white light into three color lights.

The reflection type liquid crystal elements 409R, 409G and 409B have the function of receiving a driving signal from a signal processing system, not shown, and changing (modulating) the direction of polarization of the illuminating light which is the incident polarized light, and in the present embodiment, image signal processing is done so that a component of the same direction of polarization as the illuminating right may be projected and form an image.

The signal processing system is supplied with image information from an image information supplying apparatus such as a personal computer, a video, a television or a DVD player, and on the basis of this image information, the signal processing system generates a driving signal for driving the reflection type liquid crystal elements 409R, 409G and 409B.

In the above-described construction, the white light from the light source 401 is reflected directly or by the reflecting mirror 402 and is made into substantially parallel light and enters the fly-eye integrator 403. In the fly-eye integrator 403, as previously described, the substantially parallel light is divided into a plurality of beams, which are converted into polarized light much including a component of a direction perpendicular to the plane of the drawing sheet by the polarizing conversion element 404, and enter the laminated phase element 406 through the illuminating light superimposing system 405.

The beam having entered the laminated the laminated phase element 406, as described with reference to FIG. 26, has only its green light component having a green wavelength area changed in the direction of polarization by 90° and is made into polarized light parallel to the plane of the drawing sheet, and red and blue light components having red and blue wavelength areas intactly emerge as polarized lights having the direction of polarization when they have entered, and enter a first surface of the light directing prism 407.

A second surface 445 of the light directing prism 407 is set to an angle satisfying a total reflection condition for the incident light and therefore, here almost all lights are reflected at a reflectance of nearly 100% and travel toward the cross dichroic prism 408.

In the cross dichroic prism 408, as previously described, the incident white light is resolved into three color lights by the dichroic surfaces 413R and 413B, and the respective color lights illuminate the reflection type liquid crystal elements 409R, 409G and 409B.

In this case, of the polarizing elements provided between the respective reflection type liquid crystal elements 409R, 409G, 409B and the cross dichroic prism 408, 410R and 410B have their polarization axes set so as to transmit therethrough polarized light perpendicular to the plane of the drawing sheet, and 410G has its polarization axis set so as to transmit therethrough polarized light parallel to the plane of the drawing sheet. Thus, the reflection type liquid crystal elements 409R, 409G and 409B are illuminated by polarized light high in degree of polarization.

The respective color illuminating lights having entered the respective reflection type liquid crystal elements 409R, 409G and 409B have their directions of polarization changed and are modulated and reflected, whereby they are made into respective color image lights including image information, and again enter the cross dichroic prism 408 through the polarizing elements 410R, 410G and 410B.

The polarizing elements 410R, 410G and 410B act in common to the illuminating lights and the image lights and therefore, transmit therethrough polarized components of the same direction as the respective color illuminating lights of the polarized light included in the respective modulated and reflected color image lights, i.e., polarized components perpendicular to the plane of the drawing sheet for red and blue lights, and a polarized component parallel to the plane of the drawing sheet for green light. Accordingly, the image rights having entered the cross dichroic prism 408 are color-synthesized as color lights of the same direction of polarization as that during color separation, and enter the light directing prism 407.

As is apparent from FIG. 24, the respective color illuminating lights are obliquely incident on the respective reflection type liquid crystal elements 409R, 409G and 409B, and respective color image lights which are the reflected lights thereof obliquely emerge mirror-image-symmetrically with respect to the respective color illuminating lights. That is, design is made such that the directions (i.e., the optical paths) of the respective color illuminating lights incident on the respective reflection type liquid crystal elements 409R, 409G and 409B and the directions (optical paths) of the respective color image lights emerging from the respective reflection type liquid crystal elements 409R, 409G and 409B may always differ from each other at any position.

Further, in other words, when the trace line, in the dichroic prism 408 and the projection lens 412, of a ray of light along the center line of the illuminating beam in the illuminating optical system is defined as the reference axis L of the entire system, reference axes on the illuminating light side and the image light side in the dichroic prism 408, and further a reference axis in the projection lens 412 are inclined with respect to normals to the display surfaces of the reflection type liquid crystal elements 409R, 409G and 409B, respectively.

Therefore, the image lights color-synthesized by the dichroic prism 408, when they arrive at a second surface 445 of the light directing prism 407, unlike the illuminating light, are incident on the second surface 445 at an angle equal to or smaller than a critical angle and are intactly transmitted therethrough, and are projected by the projection lens 412 through the gap 439 and the correcting prism 411.

The correcting prism 411 is provided to suppress the creation of any aberration caused by the refraction when the image lights emerge from the wedge-shaped light directing prism 407.

Also, the respective color image lights emerge obliquely from the respective reflection type liquid crystal elements 409R, 409G and 409B and therefore, when an ordinary lens having a rotation symmetry axis is used as the projection lens 412, to project the image lights without distortion, it is necessary to greatly shift the lens in a direction perpendicular to the optical axis thereof, but if so, projection will become difficult, or even if projection is possible, a lens of a wide angle and a great aperture will become necessary.

So, in the present embodiment, the projection lens 412 is of a construction in which at least one of a plurality of lenses or optical surfaces is made into a shape having no rotation symmetry axis (rotation-asymmetrical shape) or a rotation-symmetry axis common to all does not exist. Thereby, the image lights obliquely emerging from the reflection type liquid crystal elements 409R, 409G and 409B can be projected well.

While the projection lenses 412 shown in FIG. 24 are all comprised of refractive lenses, a construction using a mirror may also be adopted.

In the present embodiment, the projection lenses 412, from the construction of the entire system, can be made into a plane-symmetrical shape in which the plane of the drawing sheet of FIG. 24 is a symmetrical plane. Considering with this plane as the reference, in the case of the present embodiment, the direction of the color resolution by the cross dichroic prism 408 is a direction along the symmetrical plane or a plane optically equivalent to the symmetrical plane.

According to the construction of the tenth embodiment described above, the illuminating light is directed to the reflection type liquid crystal elements 409R, 409G and 409B by the total reflection by the second surface 445 of the light directing prism 407 and therefore, it is possible to eliminate the wavelength dependency and angle dependency of a polarizing beam splitter which pose a problem in a construction using a polarizing beam splitter as in the conventional projection type image display apparatus and thus, the reflection type liquid crystal elements 409R, 409G and 409B can be illuminated efficiently.

Also, by the action of the laminated phase element 406, the polarized state of the illuminating light entering the cross dichroic prism 408, for the red and blue color light components reflected by the dichroic surfaces 413R and 413B of the cross dichroic prism 408, becomes polarization perpendicular to the plane of the drawing sheet of FIG. 24 (S-polarization to the dichroic surfaces), and for the green color light component transmitted through the dichroic surfaces 413R and 413B, includes chiefly polarization parallel to the plane of the drawing sheet of FIG. 24 (P-polarization to the dichroic surfaces). Also, the directions of polarization of the color image lights reflected by the respective reflection type liquid crystal elements 409R, 409G and 409B are the same as the directions of polarization of the respective color components of the illuminating light and therefore, it is possible to reduce the deterioration of a displayed image such as a reduction in contrast or the quantity of light attributable to the difference in cut wavelength by the polarization in the dichroic surfaces during color separation and color synthesis which has heretofore posed a problem.

Further, the image lights produced by being subjected to the modulation by the reflection type liquid crystal elements 409R, 409G and 409B are analyzed by the polarizing elements 410R, 410G and 410B before they are color-synthesized by the cross dichroic prism 408 and therefore, high contrast can be maintained.

In FIG. 24, the respective color illuminating lights entering the reflection type liquid crystal elements 409R, 409G and 409B and the respective color image lights obtained by the color illuminating lights being modulated and reflected, and emerging therefrom are incident on different locations on the dichroic surface 413R and 413B of the cross dichroic prism 408 at different angles.

The dot-and-dash line in FIG. 24 indicates an axis (reference axis L2) passing through the centers of the reflection type liquid crystal elements 409R, 409G and 409B, and taking a line traveling along this axis as an example, when the angle at which the illuminating light is incident on the dichroic surface 413R is defined as β and the angle at which each color image light is again incident on the dichroic surface 413R is defined as γ, these angles differ from each other.

On the other hand, generally, the characteristic of the dichroic surface is varied by the incident angle, and when the difference between the above-mentioned β and γ is great, good color separation and synthesis will become difficult.

Accordingly, in the present embodiment, design is made such that the difference between the two becomes $$|β-γ|<25°   \quad (1)$$

Further, it is desirable that design be made such that $$|β-γ|<15°   \quad (2)$$

In the present embodiment, the illuminating lights made uniform to a certain extent in the direction of polarization by the action of the polarizing conversion element 404 enter the laminated phase element 406, but in order to effect more accurate polarization control, a polarizing element for transmitting therethrough polarized light perpendicular to the plane of the drawing sheet of FIG. 24 may be provided so as to be proximate to or in close contact with the light incidence side of the laminated phase element 406.

Further, in the construction of FIG. 24, by joining such optical elements as the second lens 405b, the laminated phase element 406, the polarizing elements 410R, 410G, 410B and the reflection type liquid crystal elements 409R, 409G, 409B to adjacent optical elements or members and making them integral with one another, it becomes possible to reduce the reflectance of light on the boundary surface, and increase the quantity of light and eliminate stray light.

Also, the reflection type liquid crystal elements 409R, 409G and 409B are usually rectangular, but in this case, how to arrange the longer sides and the shorter sides may be arbitrary. If the shorter sides are arranged so as to be parallel to the plane of the drawing sheet of FIG. 24, the size of the cross dichroic prism 408 in the cross section of FIG. 24 can be made small, and if conversely, the longer sides are arranged so as to be parallel to the plane of the drawing sheet of FIG. 24, the size of the cross dichroic prism 408 in the depth direction of FIG. 24 can be made small. As described above, the arrangement of the reflection type liquid crystal elements 409R, 409G and 409B can be suitable selected in conformity with the use thereof and the manner in which the entire system is installed.

(Eleventh Embodiment)

Figure 27:
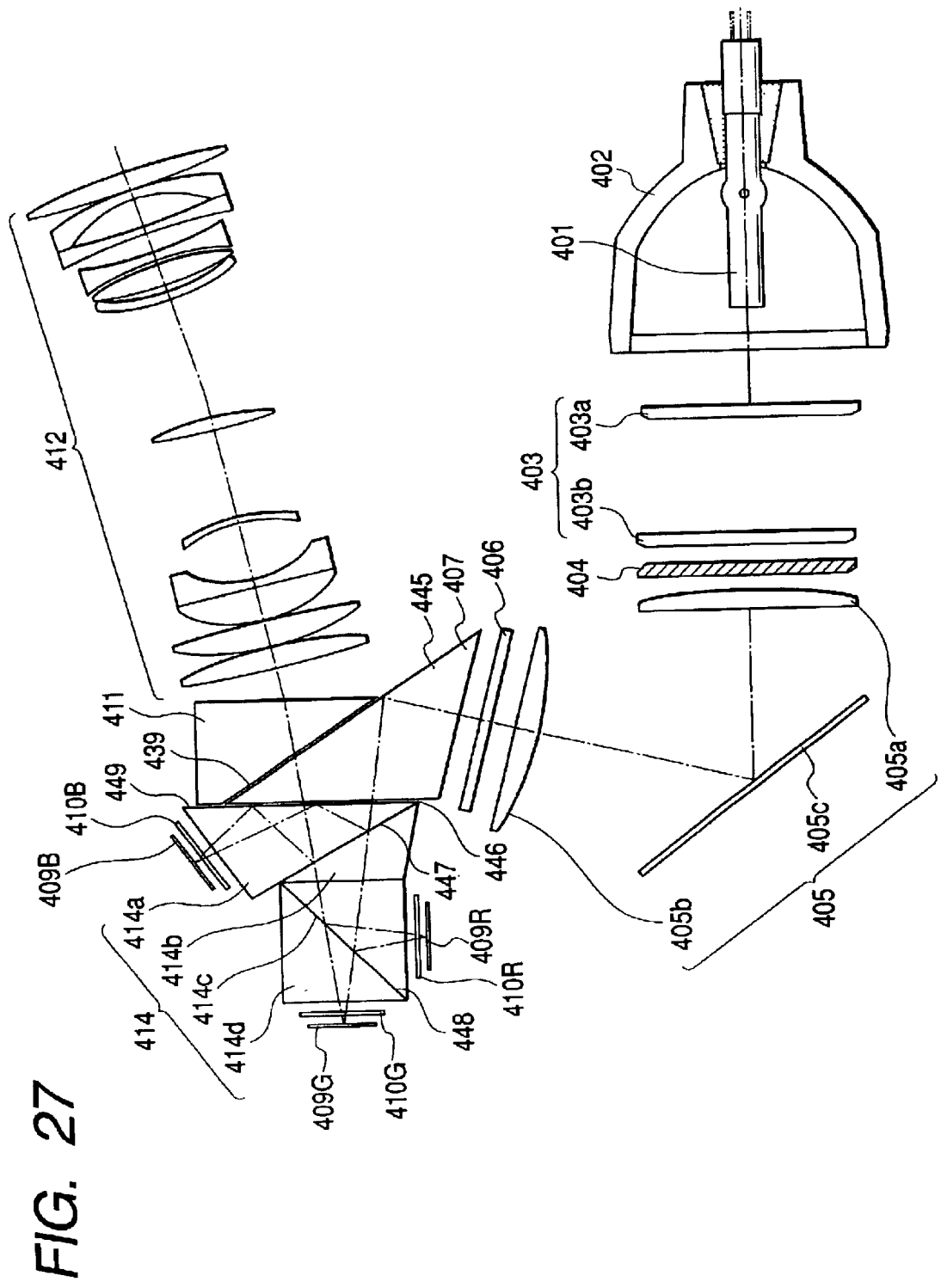
FIG. 27 shows the construction of a projection type image display apparatus which is an eleventh embodiment of the present invention.

FIG. 27 shows the construction of a projection type image display apparatus which is an eleventh embodiment of the present invention. In this embodiment, constituents common to those in the tenth embodiment are given the same reference characters as those in the tenth embodiment.

The present embodiment uses, instead of the cross dichroic prism 408 used as the color separating and synthesizing optical system in the tenth embodiment, a color separating and synthesizing prism body 414 called a 4P prism comprising four prisms 414a, 414b, 414c and 414d.

The color separating and synthesizing prism body 414 is disposed with a slight gap 446 provided relative to a light directing prism 407 and a correcting prism 411, and between the prism 414a and the prism 414b, there is formed a blue reflecting dichroic surface 447 as dichroic film having the characteristic of reflecting the blue color light. Also, between the prism 414c and the prism 414d, there is formed a red reflecting dichroic surface 448 as dichroic film having the characteristic of reflecting the red color light.

In the present embodiment, the construction of the illuminating optical system including the laminated phase element 406, the light directing prism 407, the correcting prism 411 and the projection lens 412 are the same as those in the tenth embodiment, and the present embodiment differs from the tenth embodiment only in the color separating and synthesizing method by the color separating and synthesizing prism body 414.

As in the tenth embodiment, of the illuminating light emerging from the light directing prism 407, blue and red color light components have a direction of polarization perpendicular to the plane of the drawing sheet of FIG. 27, and a green color light component has a direction of polarization parallel to the plane of the drawing sheet of FIG. 27.

The illuminating light having entered the color separating and synthesizing prism body 414 has its blue color light component first reflected by the blue reflecting dichroic surface 447, and has its green and red color light components transmitted therethrough. The blue color light component reflected by the blue reflecting dichroic surface 447 is totally reflected by a surface 449 constituting the prism 414a, and enters the reflection type liquid crystal element 409B for blue through the polarizing element 410B.

The green and red color light components transmitted through the blue reflecting dichroic surface 447 enter a red reflecting dichroic surface 448 and the red color light component is reflected by this surface, and enters the reflection type liquid crystal element 409R for red through the polarizing element 410R. Further, the green color light component is transmitted through the red reflecting dichroic surface 448, and enters the reflection type liquid crystal element 409G for green through the polarizing element 410G.

The color image lights modulated and changed in their polarized states by the reflection type liquid crystal elements 409R, 409G and 409B are analyzed by the polarizing elements 410R, 410G and 410B, respectively, and thereafter again enter the color separating and synthesizing prism body 414, and travel in the prisms in a direction opposite to that during the color separation and are color-synthesized. The color-synthesized image lights, as in the tenth embodiment, are transmitted through the light directing prism 407 and the correcting prism 411 and are projected by the projection lens 412.

The color separating and synthesizing prism body 414 used in the present embodiment, unlike the cross dichroic prism 408 in the tenth embodiment, is free from the intersection between two dichroic surfaces and therefore, the accuracy required in the manufacture thereof is not so high and the curtailment of cost becomes possible.

Also, the incident angle and the angle of reflection of the light with respect to the blue reflecting dichroic surface 447 are smaller than 45° and therefore, the difference in dichroic characteristic by the direction of polarization in the dichroic surface 447 can be made small.

The color separating and synthesizing prism body 414 shown in FIG. 27 is formed so as to become as small as possible with consideration given to an area through which rays of light are transmitted and therefore, it is constituted by the four prisms 414a, 414b, 414c and 414d, but it is also possible to make the prisms 414b and 414c integral with each other to thereby construct the color separating and synthesizing prism body as the so-called 3P prism.

(Twelfth Embodiment)

Figure 28:
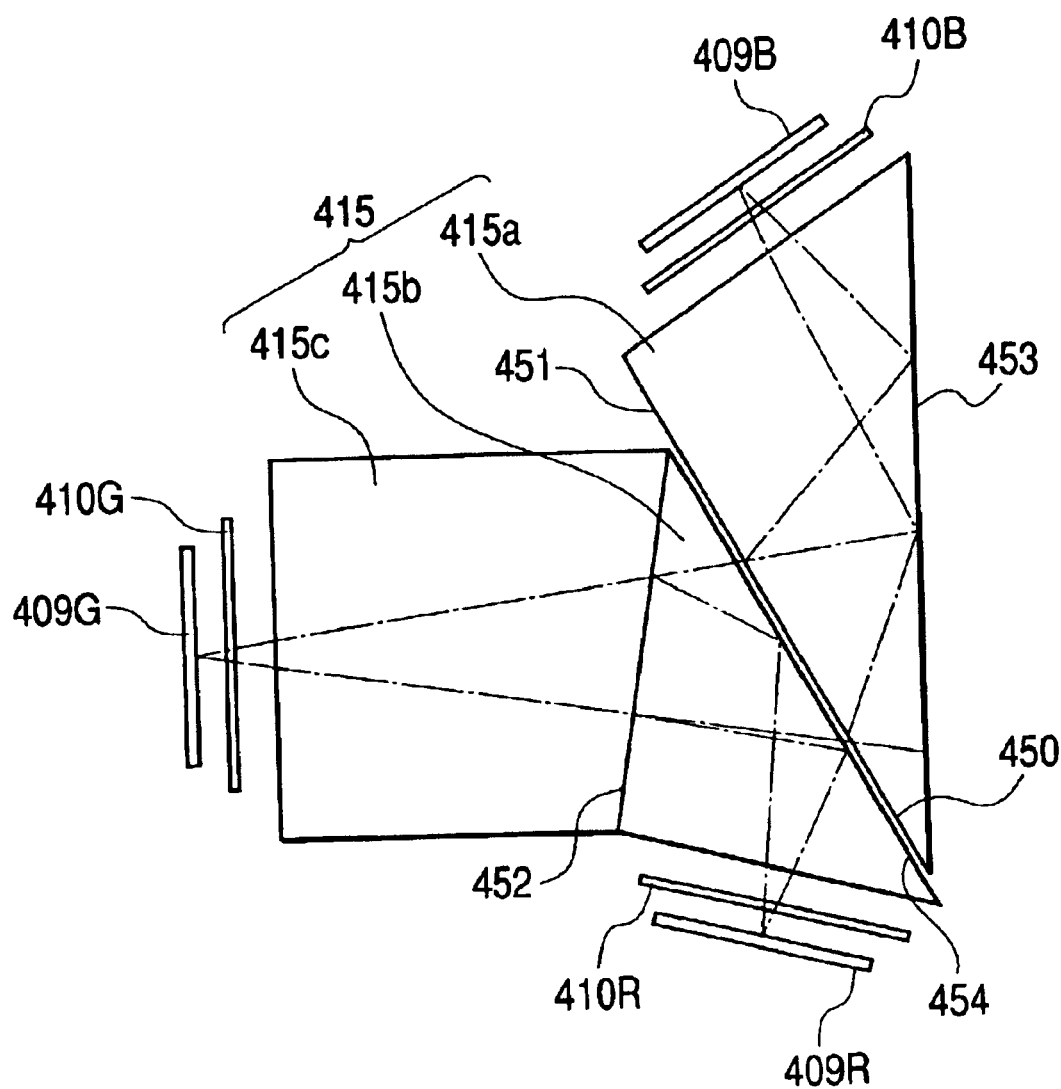
FIG. 28 shows the construction of the color separating and synthesizing optical system of a projection type image display apparatus which is a twelfth embodiment of the present invention.

FIG. 28 shows the construction of portions around the color separating and synthesizing optical system of a projection type image display apparatus which is a twelfth embodiment of the present invention. In this embodiment, constituents common to those in the tenth embodiment are given the same reference characters as those in the tenth embodiment.

A color separating and synthesizing prism body 415 is a 3P prism comprising three prisms 415a, 415b and 415c, and a slight gap 450 is provided between the prism 415a and the prism 415b. The prism body 415, like the prism body 414 of FIG. 27, as a whole, is disposed with a slight gap provided also relative to the light directing prism 407 and the correcting prism 411.

A blue reflecting dichroic surface 451 as dichroic film having a blue reflecting characteristic is formed on that surface of the prism 415a which is opposed to the prism 415b, and a red reflecting dichroic surface 452 as dichroic film having a red reflecting characteristic is formed on the joined surface between the prism 415b and the prism 415c.

As in the hitherto described embodiments, the illuminating light entering the color separating and synthesizing prism body 415 from the right side of FIG. 28 has its blue color light component first reflected by the blue reflecting dichroic surface 451, and has its green and red color light components transmitted therethrough.

The blue color light component reflected by the blue reflecting dichroic surface 451 is totally reflected by a surface 453 constituting the prism 415a, and enters the reflection type liquid crystal element 409B for blue through the polarizing element 410B.

The green and red color light components transmitted through the blue reflecting dichroic surface 451 are incident on the dichroic surface 452, and the red color light component reflected by this surface is totally reflected by a surface 454 constituting the prism 415b, and enters the reflection type liquid crystal element 409R for red through the polarizing element 410R. On the other hand, the green color light component is transmitted through the dichroic surface 452 and enters the reflection type liquid crystal element 409G for green through the polarizing element 410G.

Respective color image lights modulated and reflected by the reflection type liquid crystal elements 409R, 409G and 409B are analyzed by the polarizing elements 410R, 410G and 410B, and thereafter again enter the color separating and synthesizing prism body 415, and travel in the respective prisms in a direction opposite to that during color separation and are color-synthesized, and are projected by the projection lens 412 as in the hitherto described embodiments.

The color separating and synthesizing prism body 415 used in the present embodiment, in contrast with the prism body 414 shown in FIG. 27, is such that on the red reflecting dichroic surface 452 as well, the incident angle and the angle of reflection of light are less than 45°, and the difference in the dichroic characteristic by the direction of polarization on that surface can be made small.

(Thirteenth Embodiment)

Figure 29:
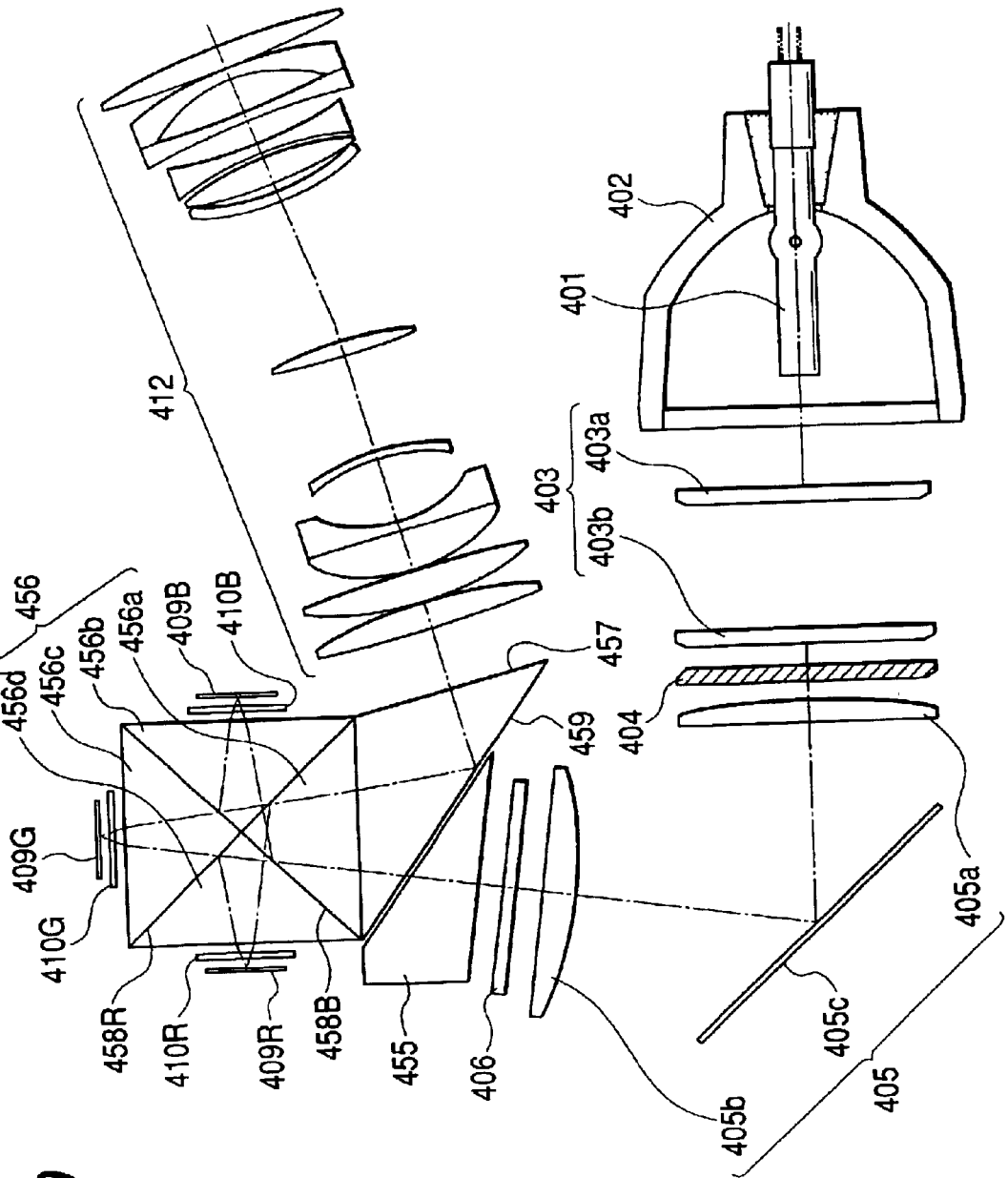
FIG. 29 shows the construction of a projection type image display apparatus which is a thirteenth embodiment of the present invention.

FIG. 29 shows the construction of a projection type image display apparatus which is a thirteenth embodiment of the present invention. In this embodiment, constituents common to those in the tenth embodiment are given the same reference characters as those in the tenth embodiment.

In the present embodiment, the optical path for the introduction of the illuminating light into the color separating and synthesizing optical system in the tenth embodiment and the introduction of the image lights from the color separating and synthesizing optical system into the projection lens are made opposite to each other.

In FIG. 29, the reference numeral 456 designates a cross dichroic prism having the function of a color separating and synthesizing optical system comprised of four prisms 456a, 456b, 456c and 456d, and it is the same as the cross dichroic prism 408 in the tenth embodiment shown in FIG. 24. A red reflecting dichroic surface 458R and a blue reflecting dichroic surface 458B are formed on the joined surfaces between adjacent ones of the prisms.

The reference numeral 457 denotes a light directing prism for directing image lights color-synthesized by the cross dichroic prism 456 to the projection lens 412, and the reference numeral 455 designates a correcting prism for causing the illuminating light to be transmitted through the light directing prism 457 and directing the illuminating light to the cross dichroic prism 456.

Again in the present embodiment, of the illuminating light emerging from the laminated phase element 406, red and blue color light components have a direction of polarization perpendicular to the plane of the drawing sheet of FIG. 29, and a green color light component has a direction of polarization parallel to the plane of the drawing sheet of FIG. 29. The illuminating light is transmitted through the correcting prism 455 and the light directing prism 457 and enters the cross dichroic prism 456.

In the cross dichroic prism 456, the red color light component is reflected by a red reflecting dichroic surface 458R, and the blue color light component is reflected by a blue reflecting dichroic surface 458B, and they enter the reflection type liquid crystal element 409R for red and the reflection type liquid crystal element 409B for blue through the polarizing elements 410R and 410B, respectively.

The green color light component is transmitted through the dichroic surfaces 458R and 458B, and enters the reflection type liquid crystal element 409G for green through the polarizing element 410G.

Respective color image lights modulated and reflected with their directions of polarization changed by the reflection type liquid crystal elements 409R, 409G and 409B again enter the cross dichroic prism 456, and travel in the prism in a direction opposite to that during color separation and are color-synthesized, and enter from a first surface of the light directing prism 457 and arrive at a second surface 459 thereof.

The image lights are incident on the second surface 459 at an angle equal to or greater than a critical angle and therefore are totally reflected by that surface, and have their direction changed and are projected by the projection lens 412.

In the above-described tenth to twelfth embodiments, the image lights transmitted through the gap between the light directing prism 457 and the correcting prism 411 are projected and therefore, to suppress any aberration caused there and obtain a good projected image, it is necessary to make the gap between the two members as narrow as possible and set it uniformly, and high assembly accuracy is required. In contrast, in the present embodiment, there is adopted a construction in which the image lights reflected by the light directing prism 457 are projected and therefore, there is not the creation of the aberration attributable to the above-mentioned gap, and the arrangement and setting of the two members can be done at such a degree of very loose accuracy as will not affect the illuminating light.

(Fourteenth Embodiment)

Figure 30B:
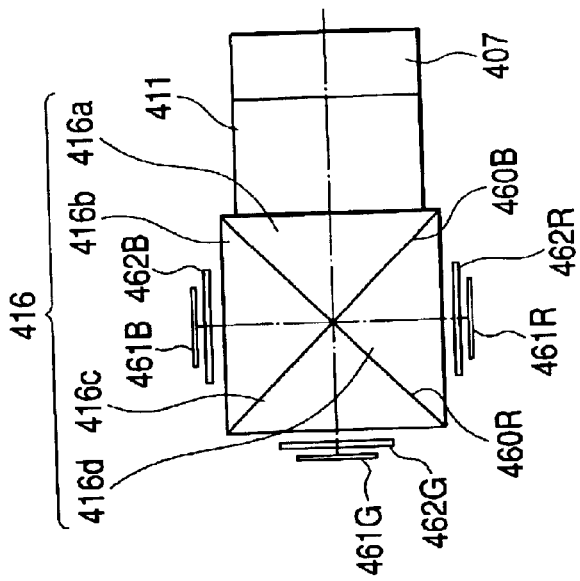
FIGS. 30A and 30B show the construction of a projection type image display apparatus which is a fourteenth embodiment of the present invention.
Figure 30A:
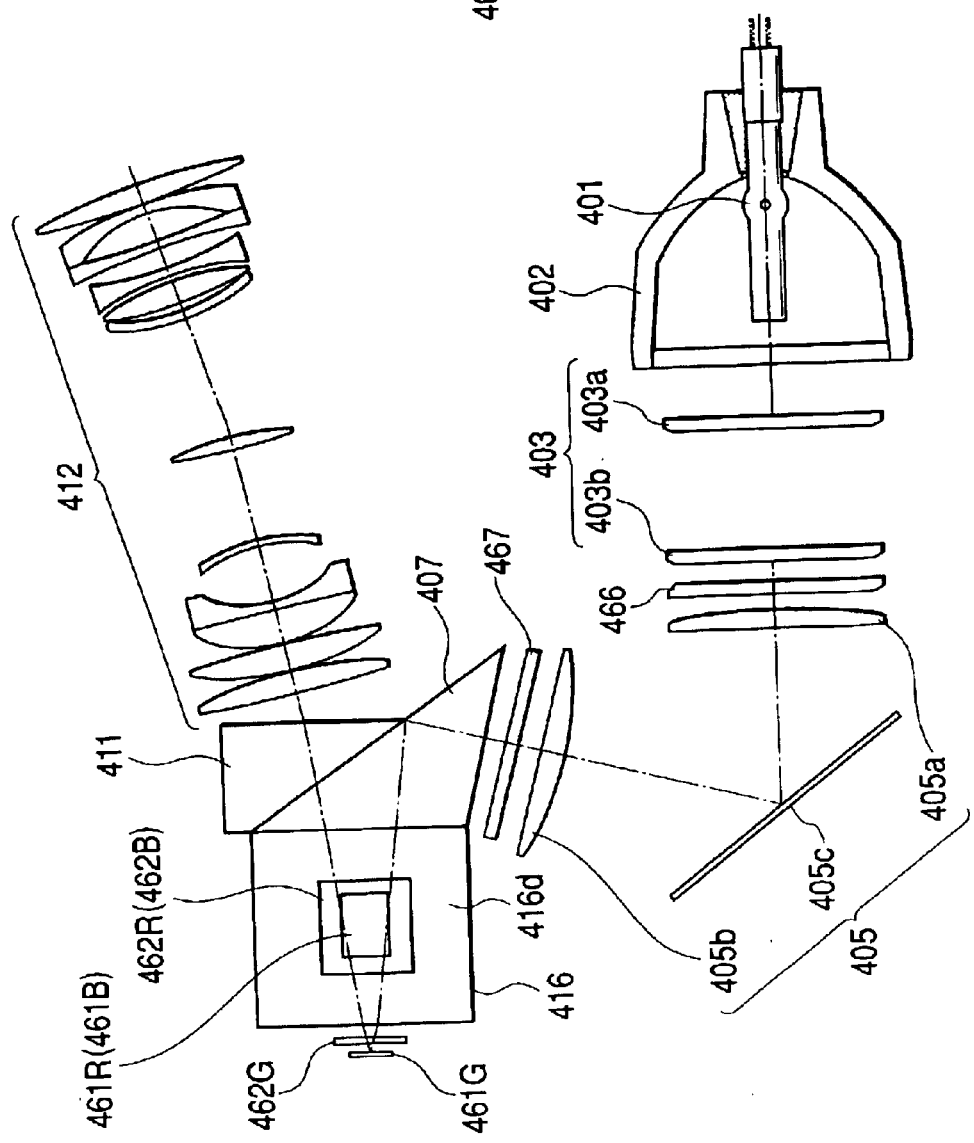

FIGS. 30A and 30B show the construction of a projection type image display apparatus which is a fourteenth embodiment of the present invention. In this embodiment, constituents common to those in the tenth embodiment are given the same reference characters as those in the tenth embodiment.

In FIGS. 30A and 30B, the reference numeral 416 designates a cross dichroic prism as a color separating and synthesizing optical system comprised of four prisms 416a, 416b, 416c and 416d, the reference numeral 466 denotes a polarizing conversion element, the reference numeral 467 designates a laminated phase element, and the reference characters 460R and 460B denote a red reflecting dichroic surface and a blue reflecting dichroic surface, respectively, in the cross dichroic prism 416. Also, the reference characters 461R, 461G and 461B designate reflection type liquid crystal elements for red, green and blue color lights.

Further, the reference characters 462R, 462G and 462B denote polarizing elements disposed correspondingly to the respective reflection type liquid crystal elements. FIG. 30B is a view of the surroundings of the cross dichroic prism 416 of FIG. 30A as they are seen from above them.

The present embodiment basically corresponds to the tenth embodiment shown in FIG. 24 in that the surroundings of the cross dichroic prism 408 including the reflection type liquid crystal elements 409R, 409G, 409B and the polarizing elements 410R, 410G, 410B, the polarizing conversion element 404 and the laminated phase element 406 are rotated by 90° about an axis passing through the centers thereof.

That is, the illuminating light emerging from the polarizing conversion element 466 is polarized light much including a component in a direction of polarization parallel to the plane of the drawing sheet of FIG. 30A, and the laminated phase element 467, when the polarized light parallel to the plane of the drawing sheet of FIG. 30A enters it, rotates only the direction of polarization of a green color light component by 90° and makes this component into polarized light perpendicular to the plane of the drawing sheet of FIG. 30A.

Also, the polarizing elements 462R and 462B are disposed so as to transmit therethrough polarized light in a direction perpendicular to the plane of the drawing sheet of FIG. 30B, and the polarizing element 462G is disposed so as to transmit therethrough polarized light parallel to the plane of the drawing sheet of FIG. 30B.

By the above-described construction, the red and blue color lights reflected and color-separated and synthesized by the dichroic surfaces 460R and 460B of the cross dichroic prism 416 become S-polarized lights with respect to those surfaces, and the green color light transmitted through and color-separated and synthesized by the dichroic surfaces 460R and 460B of the cross dichroic prism 416 become P-polarized lights with respect to those surfaces. Again by the present embodiment, as by the tenth embodiment, it is possible to reduce the deterioration of the quality of image attributable to the difference in cut wavelength due to the direction of polarization of the dichroic surfaces 460R and 460B.

Also, again in the present embodiment, as in the tenth embodiment, the projection lens 412 has plane symmetry with respect to the plane of the drawing sheet of FIG. 30A, but the present embodiment differs from the tenth embodiment in that color separation is effected in a direction intersecting with the symmetrical plane.

By doing so, the difference between the angle of incidence of the illuminating light during color separation onto the dichroic surfaces 460R and 460B and the angle of incidence of the illuminating light during color synthesis onto those dichroic surfaces becomes small as compared with that in the tenth embodiment, and it also becomes possible to reduce a problem attributable to the change in the cut wavelength by the angle of incidence onto the dichroic surfaces.

Generally, a condition for making small the difference between the angle of incidence onto the dichroic surface during color separation and the angle of incidence onto the dichroic surface during color synthesis is considered as follows from FIG. 31.

Figure 31:
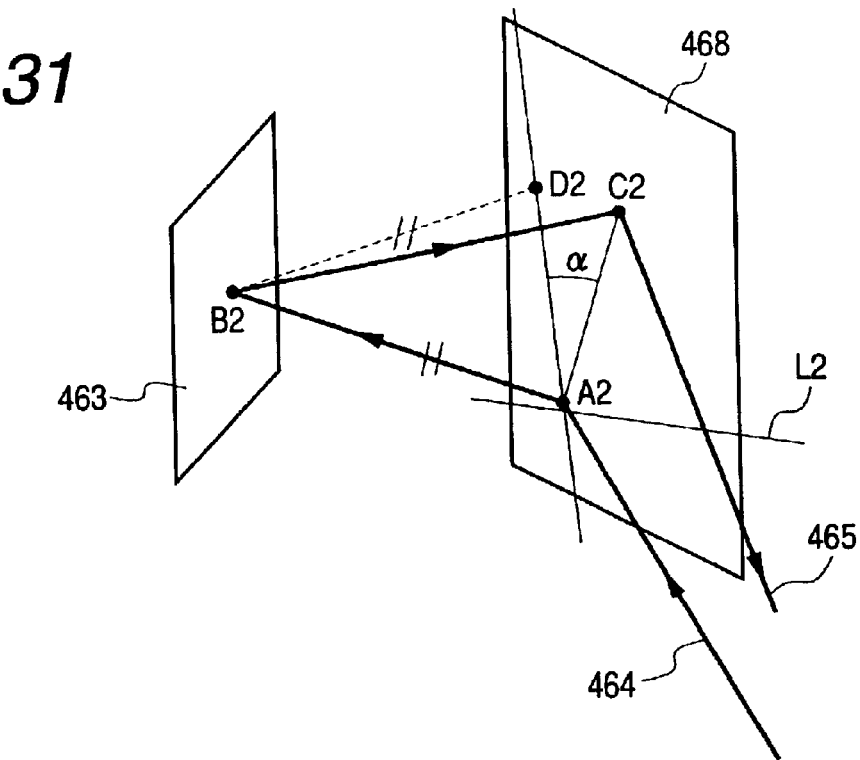
FIG. 31 is a typical view for illustrating the angle of incidence of light on the dichroic surface of a color separating and synthesizing optical system and a reflection type image display element in the fourteenth embodiment.

In FIG. 31, the reference numeral 468 designates a dichroic surface, the reference numeral 463 denotes a reflection type liquid crystal element, the reference numeral 464 designates illuminating light incident on the dichroic surface 468, and the reference numeral 465 typically indicates image light reflected by the dichroic surface 468.

Also, a point A2 is a point at which the illuminating light 464 is incident on the dichroic surface 468, a point B2 is a point at which the illuminating light 464 enters and is reflected by the reflection type liquid crystal element 463, and a point C2 is a point at which image light reflected by the reflection type liquid crystal element 463 and is again incident on the dichroic surface 468.

Now, when a point differing from a point A on the dichroic surface 468 which lies optically at the same distance as the point A2 as viewed from the point B2 is defined as D2, and a straight line on the dichroic surface 468 which passes through the point A2 and is orthogonal to a straight line A2D2 (a line linking A2 and D2 together) is defined as L2, to make small the difference between the angles at which the illuminating light 464 and the image light 465 are incident on the dichroic surface 468, it is necessary that the distance from the point C2 to the straight line A2D2 be smaller than the distance from the point C2 to the straight line L2.

This, in other words, is that the angle α formed between the straight line A2C2 and the straight line A2D2 satisfies $$\alpha < 45° \quad (3)$$

and further, desirably $$\alpha < 30°. \quad (4)$$

By setting the direction in which the illuminating light 464 is incident on the dichroic surface 468, the direction of the color separation and synthesis by the dichroic surface 468, and the direction of the plane of the reflection type liquid crystal element 463 so that these conditions may be satisfied, the reduction in quantity of light and efficiency attributable to the change in the cut wavelength of the dichroic surface 468 resulting from the difference between the angles of incidence of the illuminating light 464 and the image light 465 onto the dichroic surface 468 is relieved.

When a reflecting surface intervenes between the dichroic surface 468 and the reflection type liquid crystal element 463, the mirror image of the point B2 by this reflecting surface can likewise be considered.

(Fifteenth Embodiment)

Figure 32:
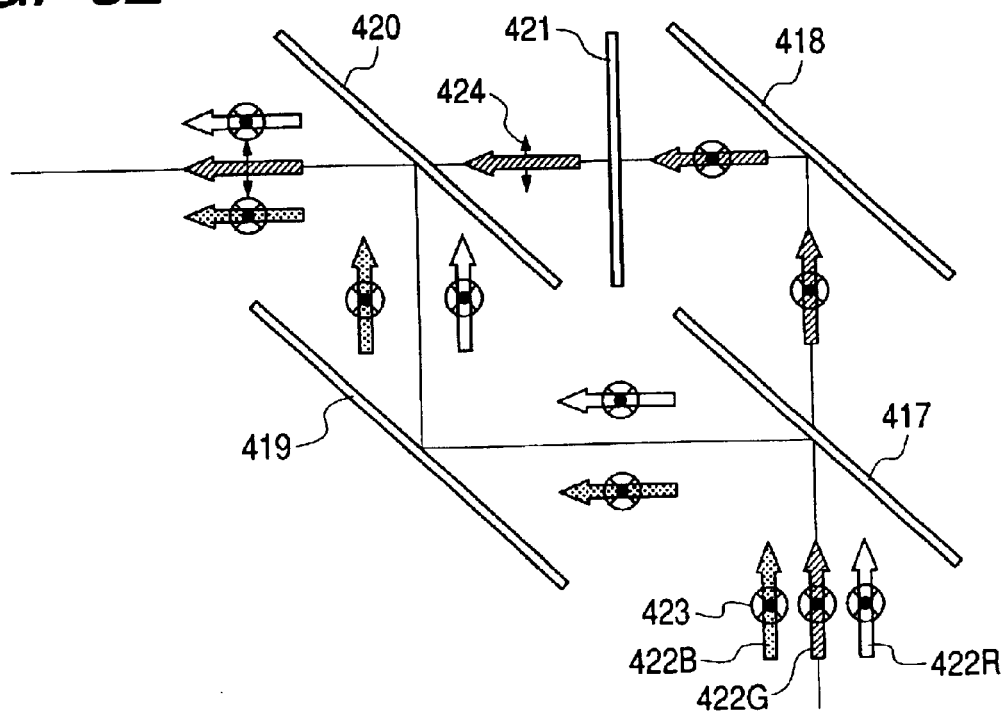
FIG. 32 shows the construction and optical action of a laminated phase element as a wavelength selective polarizing control mechanism which is a fifteenth embodiment of the present invention.

FIG. 32 shows the construction and optical action of a wavelength selective polarizing control mechanism in a projection type image display apparatus which is a fifteenth embodiment of the present invention.

While in the hitherto described embodiments, description has been made of a case where a laminated phase element is used to change only the direction of polarization of a predetermined color light component included in the illuminating light, similar action can also be realized by a wavelength selective polarizing control mechanism constituted by a combination of a dichroic mirror and a ½ wavelength plate as shown in FIG. 32.

In FIG. 32, the reference numerals 417 and 420 designate dichroic mirrors for reflecting red and blue color light components of white illuminating light, and transmitting a green color light component therethrough, the reference numerals 418 and 419 denote reflecting mirrors, and the reference numeral 421 designates a ½ wavelength plate for rotating polarized light perpendicular to the plane of the drawing sheet of FIG. 32 by 90° and making it into polarized light parallel to the plane of the drawing sheet of FIG. 32.

In FIG. 32, white arrow 422R represents the red color light component, hatched arrow 422G represents a green color light component, meshy arrow 422B represents the blue color light component, the reference numeral 423 designates polarized light perpendicular to the plane of the drawing sheet of FIG. 32, and the reference numeral 424 denotes polarized light parallel to the plane of the drawing sheet of FIG. 32.

The polarized light perpendicular to the plane of the drawing sheet of FIG. 32 which is incident on the dichroic mirror 417, i.e., white light S-polarized with respect to the dichroic mirror 417, is color-separated by the dichroic mirror 417, and the red and blue color light components are reflected thereby and the green color light component is transmitted therethrough.

The green color light component transmitted through the dichroic mirror 417 is reflected by the reflecting mirror 418, and has its direction of polarization changed by 90° by the ½ wavelength plate 421 and becomes P-polarized light, and is incident on the dichroic mirror 420.

The red and blue color light components reflected by the dichroic mirror 417 are reflected by the reflecting mirror 419 while remaining S-polarized lights, and are incident on the dichroic mirror 420. In the dichroic mirror 420, the green P-polarized light and the red and blue S-polarized lights are synthesized, and emerge as white light.

The wavelength selective polarizing control mechanism shown in FIG. 32 may be combined with a suitable reflecting mirror as required, and be inserted between the first lens 405a and the light directing prism 407, instead of, for example, the laminated phase element 406 shown in FIG. 24, whereby white illuminating light in which the direction of polarization of a predetermined color light component differs from the directions of polarization of the other color light components can be made to enter the color separating and synthesizing optical system.

(Sixteenth Embodiment)

Figure 33:
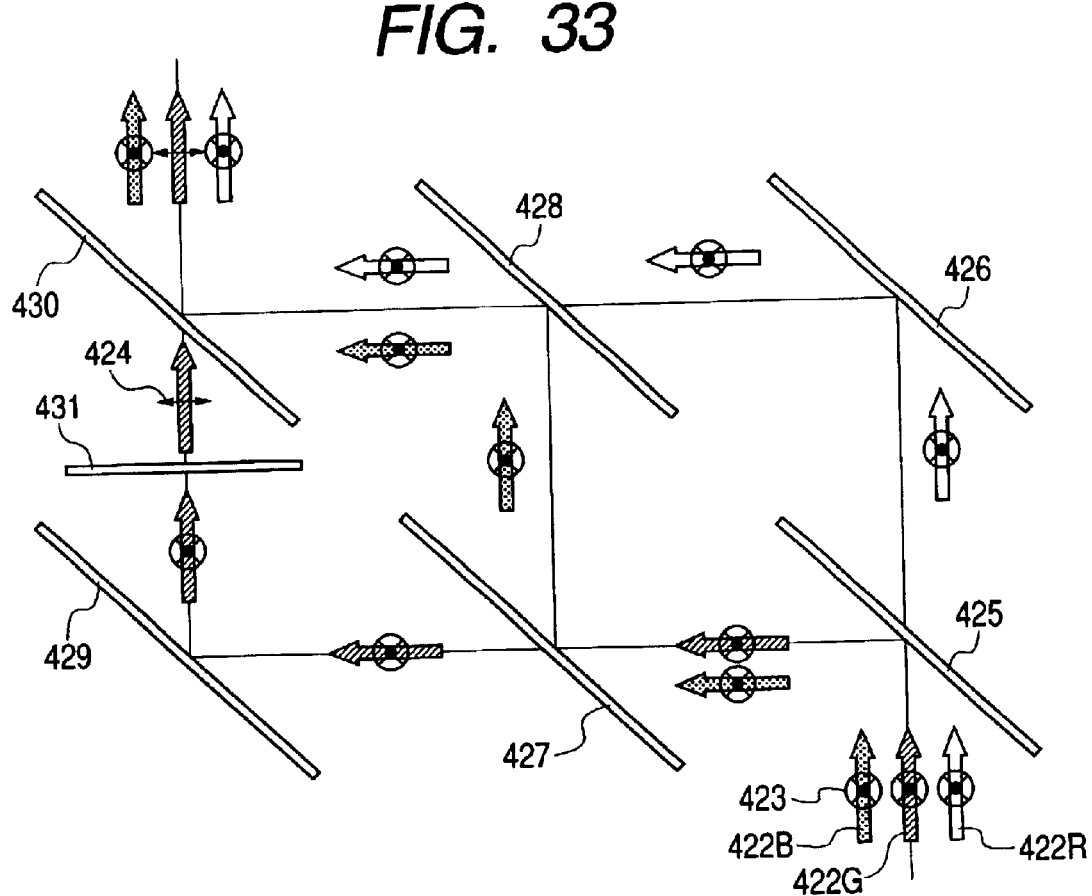
FIG. 33 shows the construction and optical action of a laminated phase element as a wavelength selective polarizing control mechanism which is a sixteenth embodiment of the present invention.

FIG. 33 shows the construction and optical action of a wavelength selective polarizing control mechanism in a projection type image display apparatus which is a sixteenth embodiment of the present invention.

This embodiment is one in which the wavelength selective polarizing control mechanism in the fifteenth embodiment shown in FIG. 32 is modified.

In the present embodiment, the same constituents as those in the fifteenth embodiment are given the same reference characters as those in the fifteenth embodiment.

In FIG. 33, the reference numeral 425 designates a dichroic mirror for transmitting the red color light component of white illuminating light therethrough, and reflecting the green and blue color light components, and the reference numerals 426 and 429 denote reflecting mirrors.

The reference numeral 427 designates a dichroic mirror for transmitting the green color light component therethrough, and reflecting the blue color light component, the reference numeral 428 denotes a dichroic mirror for transmitting the red color light component therethrough, and reflecting the blue color light component, and the reference numeral 430 designates a dichroic mirror for transmitting the green color light component therethrough, and reflecting the red and blue color light components. The reference numeral 431 denotes a ½ wavelength plate for making polarized light perpendicular to the plane of the drawing sheet of FIG. 33 into polarized light parallel to the plane of the drawing sheet of FIG. 33.

Again in the present embodiment, when the polarized light perpendicular to the plane of the drawing sheet of FIG. 33, i.e., white light S-polarized with respect to each dichroic mirror, is incident, it is subjected to color separation and synthesis and a change in the direction of polarization as shown in each optical path and finally, there is obtained white light comprising green P-polarized light and red and blue S-polarized lights synthesized.

(Seventeenth Embodiment)

Figure 34:
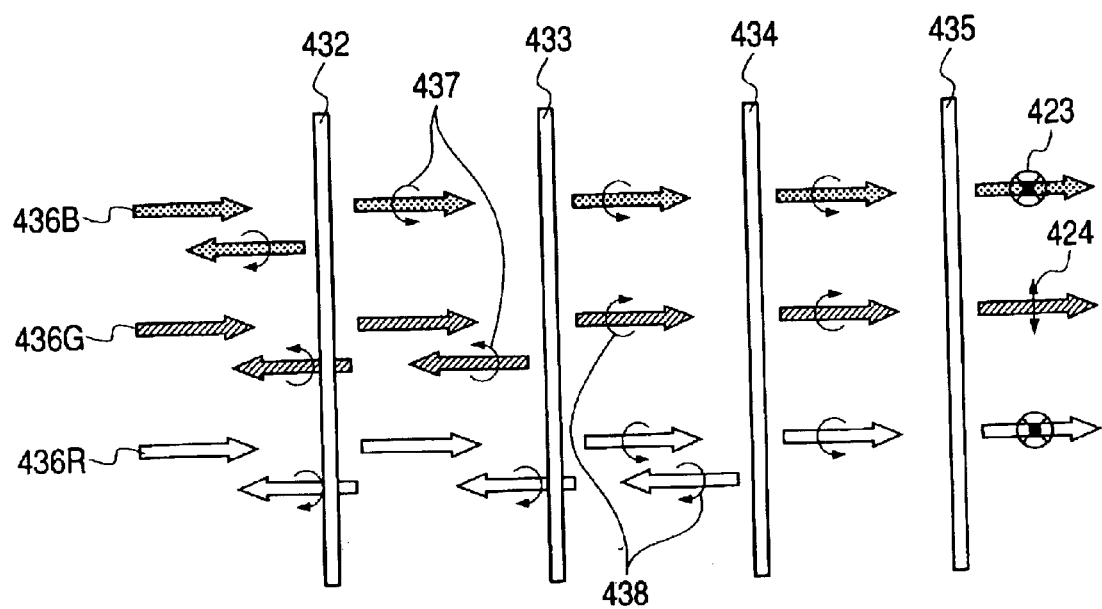
FIG. 34 shows the construction and optical action of a laminated phase element as a wavelength selective polarization control mechanism which is a seventeen embodiment of the present invention.

FIG. 34 shows the construction and optical action of a wavelength selective polarizing control mechanism in a projection type image display apparatus which is a seventeenth embodiment of the present invention.

The correspondence between various arrows and color light components, and symbols indicative of directions of polarization are the same as those in FIGS. 32 and 33.

In FIG. 34, the reference numeral 437 designates counterclockwise circularly polarized light, the reference numeral 438 denotes clockwise circularly polarized light, the reference numeral 432 designates' a cholesteric liquid crystal element for acting on the blue color light component to thereby transmit the counterclockwise circularly polarized light therethrough and reflect the clockwise circularly polarized light, the reference numeral 433 denotes a cholesteric liquid crystal element for acting on the green color light component to thereby transmit the clockwise circularly polarized light therethrough and reflect the counterclockwise circularly polarized light, and the reference numeral 434 designates a cholesteric liquid crystal element for acting on the red color light component to thereby transmit the counterclockwise circularly polarized light therethrough and reflect the clockwise circularly polarized light. The reference numeral 435 denotes a ¼ wavelength plate.

In the above-described construction, when non-polarized white light including red, green and blue color light components 436R, 436G and 436B enters from the left side in FIG. 34, white light comprising the green color light component having a direction of polarization parallel to the plane of the drawing sheet of FIG. 34 and the red and blue color light components having a direction of polarization perpendicular to the plane of the drawing sheet of FIG. 34 which are synthesized is finally obtained by the action of the cholesteric liquid crystal elements 432, 433, 434 and the ¼ wavelength plate 435.

While in FIG. 34, the respective cholesteric liquid crystal elements and the ¼ wavelength plate are shown as being arranged separately from one another, these can also be brought into close contact with one another to thereby form a filter.

Also, the circularly polarized light reflected by each cholesteric liquid crystal element is thereafter not reflected, but finally all the lights become rays travelling leftwardly and return to the incidence side in FIG. 34. It is also possible to return these lights to the light source by an optical path opposite to that of the illuminating light, and reflect than by a reflecting mirror and again utilize them as the illuminating light.

In the foregoing description, the disposition of the reflection type liquid crystal element for each color light is not restricted to that specifically shown in each embodiment, but can be suitably changed.

Also, while in the hitherto described embodiments, a reflection type liquid crystal element has been described as an example of the reflection type image display element, the present invention is not restricted thereto, but various reflection type image display elements can be used.

For example, use may be made of a minute mirror array modulation element having a plurality of minute mirrors and inclined with respect to a reference plane to thereby reflect illuminating light in a different direction and modulate it.

As described above, according to the present embodiment, design is made such that the main direction of polarization of a plurality of color light components separated by the color separating and synthesizing optical system and the main direction of polarization of a plurality of color lights synthesized by the color separating and synthesizing optical system become the same for each color and therefore, it is possible to reduce the deterioration of the quality of displayed image such as a reduction in contrast attributable to the difference in the characteristic for the direction of polarization during the color separation of the illuminating light and during the synthesis of a plurality of color lights in the color separating and synthesizing optical system.

Also, if a polarizing element for transmitting the main polarization direction component of each of the plurality of color lights therethrough is disposed between the color separating and synthesizing optical system and each reflection type image display element, the respective color lights modulated by the respective reflection type image display elements are analyzed before synthesized and therefore, the high contrast of a displayed image can be obtained.

The downsizing of the projection type image display can be achieved if in the color separating and synthesizing optical system, design is made such that the optical path of each color light separated and entering the reflection type image display element and the optical path of each color light emerging from the reflection type image display element and synthesized differ from each other, or when the trace line, in the illuminating optical system, the color separating and synthesizing optical system and the projection optical system, of a ray of light along the center line of an illuminating beam in the illuminating optical system is defined as the reference axis of the entire system, a reference axis in the color separating and synthesizing optical system (or the illuminating optical system) and a reference axis in the projection optical system are inclined with respect to a normal to the display surface of the projection type image display element.

Further, if between the illuminating optical system and the color separating and synthesizing optical system or between the color separating and synthesizing optical system and the projection optical system, there is provided a prism type light directing element for reflecting the illuminating light from the illuminating optical system or the image light from the color separating and synthesizing optical system at a reflectance of nearly 100%, it is possible to reduce the loss of the quantity of light and obtain a bright displayed image, as compared with a case where use is made of a polarizing beam splitter having wavelength dependency and angle dependency.

What is claimed is:

1. A projection type image display apparatus comprising:
   image display elements;
   an illuminating optical system for illuminating the image display elements with illuminating light from a light source; and
   a color separating and synthesizing optical system for separating the illuminating light from the illuminating optical system into a plurality of color lights, making the respective color lights enter the image display elements provided for the respective color lights, and synthesizing image lights of a plurality of colors emerging from said image display elements;
   a projection optical system for projecting and displaying the image lights synthesized by the color separating and synthesizing optical system;
   a light directing element disposed between the illuminating optical system and the color separating and synthesizing optical system, for reflecting the illuminating light from the illuminating optical system at a reflectance approximate to about 100%, directing it to the color separating and synthesizing optical system and transmitting there through the image lights from the color separating and synthesizing optical system to the projection optical system;

polarizing elements disposed between the color separating and synthesizing optical system and the image display elements for transmitting only a particular polarized component light there through; and an auxiliary optical element for refracting and transmitting there through the image lights emerging from the light directing element, said auxiliary optical element being disposed between the light directing element and the projection optical system with an air space provided relative to the light directing element, wherein the optical path of the illuminating light and the optical paths of the image lights in the light directing element and the color separating and synthesizing optical system differ from each other, and wherein the light directing element is formed into a wedge shape.

2. An apparatus according to claim 1, wherein the light directing element has a first surface on which the illuminating light is made to be incident, a second surface from which the illuminating light is made to emerge toward the color separating and synthesizing optical system and on which the image lights from the color separating and synthesizing optical system are made to be incident, and a third surface which reflects the illuminating light incident from the second surface toward the first surface at a reflectance approximate to about 100% and from which the image lights incident from the second surface are made to emerge toward the projection optical system.

3. An apparatus according to claim 2, wherein the incident angle of the illuminating light incident on the third surface in the light directing element and the incident angle of the image lights incident on the third surface differ from each other.

4. An apparatus according to claim 1, wherein the image display elements modulate and reflect the incident illuminating light and make it emerge as the image lights there from.

5. An apparatus according to claim 1, wherein the projection optical system is an eccentric optical system having at least one rotation-asymmetrical surface or a plurality of optical elements differing in rotation symmetry axis from one another.

6. An image display system comprising:
a projection type image display apparatus according to claim 1; and
an image information supplying apparatus for supplying the projection type image display apparatus with image information to be displayed.

7. An apparatus according to claim 1, wherein said light directing element internally reflects said illumination light.

8. A projection type image display apparatus comprising:
image display elements;
an illuminating optical system for illuminating said image display elements with illuminating light from a light source; and
a color separating and synthesizing optical system for separating the illuminating light from the illuminating optical system into a plurality of color lights, making the respective color lights enter image display elements provided for the respective color lights, and synthesizing image lights of a plurality of colors emerging from said image display elements;

a projection optical system for projecting and displaying the image lights synthesized by the color separating and synthesizing optical system;

a light directing element disposed between the illuminating optical system and the color separating and synthesizing optical system, for reflecting the illuminating light from the illuminating optical system at a reflectance approximate to about 100%, directing it to the color separating and synthesizing optical system and transmitting there through the image lights from the color separating and synthesizing optical system to the projection optical system;

polarizing elements disposed between the color separating and synthesizing optical system and the image display elements for transmitting only a particular polarized component light there through; and wherein the optical path of the illuminating light and the optical paths of the image lights in the light directing element and the color separating and synthesizing optical system differ from each other, and wherein the light directing element is disposed between the projection optical system and the color separating and synthesizing optical system, and the image lights synthesized by the color separating and synthesizing optical system pass through the light directing element and enter the projection optical system.

9. An apparatus according to claim 8, wherein the light directing element is formed into a wedge shape, and an auxiliary optical element for refracting and transmitting the illuminating light from the illuminating optical system there through is disposed between the light directing element and the illuminating optical system with an air space provided relative to the light directing element.

10. An image display system comprising:
a projection type image display apparatus according to claim 8; and
an image information supplying apparatus for supplying the projection type image display apparatus with image information to be displayed.

11. An apparatus according to claim 8, wherein said light directing element internally reflects said illumination light.

12. A projection type image display apparatus comprising:
image display elements;
an illuminating optical system for illuminating the image display elements with illuminating light from a light source; and
a color separating and synthesizing optical system for separating the illuminating light from the illuminating optical system into a plurality of color lights, making the respective color lights enter the image display elements provided for the respective color lights, and synthesizing image lights of a plurality of colors emerging from said image display elements;

a projection optical system for projecting and displaying the image lights synthesized by the color separating and synthesizing optical system;

a light directing element disposed between the illuminating optical system and the color separating and synthesizing optical system, for reflecting the illuminating light from the illuminating optical system at a reflectance approximate to about 100%, directing it to the color separating and synthesizing optical system and transmitting there through the image lights from the color separating and synthesizing optical system to the projection optical system; and wherein when the trace line, in the light directing element, the color separating and synthesizing optical system and the projection optical system, of a ray of light along the center line of an illuminating beam in the illuminating optical system is defined as the reference axis of the entire system, the reference axis in the color separating and synthesizing optical system and the reference axis in the projection optical system are inclined with respect to normals to the display surfaces of the image display elements, and a polarizing element disposed between the color separating and synthesizing optical system and the image display elements for transmitting only a particular polarized component light there through, wherein the light directing element is disposed between the projection optical system and the color separating and synthesizing optical system, and the image lights synthesized by the color separating and synthesizing optical system pass through the light directing element and enter the projection optical system.

13. An image display system comprising:
a projection type image display apparatus according to claim 12; and
an image information supplying apparatus for supplying the projection type image display apparatus with image information to be displayed.

14. An apparatus according to claim 12, wherein said light directing element internally reflects said illumination light.

15. A projection type image display apparatus comprising:
image display elements;
an illuminating optical system for illuminating the image display elements with illuminating light from a light source;
a color separating and synthesizing optical system for separating illuminating light from the illuminating optical system into a plurality of color lights, making the respective color lights enter image display elements provided for the respective color lights, and synthesizing image lights of a plurality of colors emerging from said image display elements;
a projection optical system for projecting and displaying the image lights synthesized by the color separating and synthesizing optical system;
a light directing element disposed between the illuminating optical system and the color separating and synthesizing optical system, for transmitting there through the illuminating light from the illuminating optical system at a reflectance approximate to about 100%, directing it to the color separating and synthesizing optical system and reflecting the image lights from the color separating and synthesizing optical system to the projection optical system; and
polarizing elements disposed between the color separating and synthesizing optical system and the image display elements for transmitting only a particular polarized component light there through;
wherein the optical path of the illuminating light and the optical paths of the image lights in the light directing element and the color separating and synthesizing optical system differ from each other, and wherein the light directing element is disposed between the projection optical system and the color separating and synthesizing optical system, and the image lights synthesized by the color separating and synthesizing optical system is reflected by the light directing element and enter the projection optical system.

16. An apparatus according to claim 15, wherein the light directing element has a first surface on which the illuminating light is made to be incident and which reflects the image lights at a reflectance approximate to about 100%, a second surface from which the illuminating light incident from the first surface is made to emerge toward the color separating and synthesizing optical system and on which the image lights from the color separating and synthesizing optical system are made to be incident, and a third surface from which the image lights incident from the second surface and reflected by the first surface are made to emerge toward the projection optical system.

17. An image display system comprising:
a projection type image display apparatus according to claim 15; and
an image information supplying apparatus for supplying the projection type image display apparatus with image information to be displayed.

18. An apparatus according to claim 15, wherein said light directing element internally reflects said image light.

19. A projection type image display apparatus comprising:
image display elements;
an illuminating optical system for illuminating the image display elements with illuminating light from a light source;
a color separating and synthesizing optical system for separating the illuminating light from the illuminating optical system into a plurality of color lights, making the respective color lights enter image display elements provided for the respective color lights, and synthesizing image lights of a plurality of colors emerging from said image display elements;
a projection optical system for projecting and displaying the image lights synthesized by the color separating and synthesizing optical system; and
a light directing element disposed between the illuminating optical system and the color separating and synthesizing optical system, for transmitting there through the illuminating light from the illuminating optical system at a reflectance approximate to about 100%, and directing it to the color separating and synthesizing optical system and reflecting the image lights from the color separating and synthesizing optical system to the projection optical system;
wherein when the trace line, in the light directing element, the color separating and synthesizing optical system and the projection optical system, of a ray of light along the center line of an illuminating beam in the illuminating optical system is defined as a reference axis of the entire system, the reference axis in the color separating and synthesizing optical system and the reference axis in the projection optical system are inclined with respect to normals to the display surfaces of the image display elements; and polarizing elements disposed between the color separating and synthesizing optical system and the image display elements for transmitting only a particular polarized component light there through, wherein the light directing element is disposed between the projection optical system and the color separating and synthesizing optical system, and the image lights synthesized by the color separating and synthesizing optical system is reflected by the light directing element and enter the projection optical system.

20. An image display system comprising:

a projection type image display apparatus according to claim 19; and an image information supplying apparatus for supplying the projection type image display apparatus with image information to be displayed.

21. An apparatus according to claim 19, wherein said light directing element internally reflects said image light.

* * * * *